(12) United States Patent
Damonte et al.

(10) Patent No.: US 11,741,411 B2
(45) Date of Patent: Aug. 29, 2023

(54) SYSTEM AND METHOD FOR SOFTWARE DEVELOPMENT INCLUDING COLUMN-BASED PROCESS EDITOR

(71) Applicant: ORACLE INTERNATIONAL CORPORATION, Redwood Shores, CA (US)

(72) Inventors: Nicolas Damonte, Redwood City, CA (US); Tomas Alabes, Foster City, CA (US); Juan Manuel Allo Ron, Foster City, CA (US); Fernando Alurralde Iturri, Foster City, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 17/992,615

(22) Filed: Nov. 22, 2022

(65) Prior Publication Data

US 2023/0080336 A1 Mar. 16, 2023

Related U.S. Application Data

(63) Continuation of application No. 16/657,843, filed on Oct. 18, 2019, now Pat. No. 11,531,947.
(Continued)

(51) Int. Cl.
*G06F 8/20* (2018.01)
*G06Q 10/0631* (2023.01)
(Continued)

(52) U.S. Cl.
CPC ......... *G06Q 10/06316* (2013.01); *G06F 8/20* (2013.01); *G06F 8/22* (2013.01);
(Continued)

(58) Field of Classification Search
CPC ...................................................... G06F 8/20
See application file for complete search history.

(56) References Cited

U.S. PATENT DOCUMENTS 7,685,527 B2 3/2010 Yan
7,707,563 B2 4/2010 Wei
(Continued)

OTHER PUBLICATIONS

Klinke, John, "August Release Update for Oracle Cloud Platform" Oracle®, Aug. 23, 2018 edited Sep. 27, 2018, 3 pages, retrieved on Jul. 2, 2019 from: <https://community.oracle.com/customerconnect/discussion/69745/august-release-update-for-oracle-cloud-platform>.
(Continued)

*Primary Examiner* — Jae U Jeon
(74) *Attorney, Agent, or Firm* — TUCKER ELLIS LLP

(57) ABSTRACT

In accordance with an embodiment, described herein are systems and methods for use with business process management (BPM) systems or environments, including software development tools for developing software applications that are associated with business processes (business process software applications, business process applications, process applications, or processes). In accordance with an embodiment, the system comprises a column-based process editor and graphical user interface, that can utilize a column-based format to model and display a process, for example a dynamic process, which can subsequently be deployed and executed within the system or environment. For example, the column-based process editor and graphical user interface can include various graphical elements to indicate configured properties of artifacts of a dynamic process. Interaction with the graphical elements enables users to review, edit, and/or remove particular properties associated with the dynamic process.

15 Claims, 71 Drawing Sheets

Related U.S. Application Data

(60) Provisional application No. 62/748,305, filed on Oct. 19, 2018, provisional application No. 62/748,306, filed on Oct. 19, 2018, provisional application No. 62/748,308, filed on Oct. 19, 2018, provisional application No. 62/748,310, filed on Oct. 19, 2018, provisional application No. 62/748,312, filed on Oct. 19, 2018, provisional application No. 62/748,313, filed on Oct. 19, 2018, provisional application No. 62/748,314, filed on Oct. 19, 2018, provisional application No. 62/748,316, filed on Oct. 19, 2018, provisional application No. 62/748,317, filed on Oct. 19, 2018, provisional application No. 62/748,318, filed on Oct. 19, 2018, provisional application No. 62/748,319, filed on Oct. 19, 2018, provisional application No. 62/748,320, filed on Oct. 19, 2018, provisional application No. 62/748,321, filed on Oct. 19, 2018, provisional application No. 62/748,323, filed on Oct. 19, 2018, provisional application No. 62/748,325, filed on Oct. 19, 2018, provisional application No. 62/748,326, filed on Oct. 19, 2018.

(51) Int. Cl.
  *G06F 8/34* (2018.01)
  *G06Q 10/10* (2023.01)
  *G06F 8/30* (2018.01)

(52) U.S. Cl.
  CPC ............... *G06F 8/313* (2013.01); *G06F 8/34* (2013.01); *G06Q 10/103* (2013.01)

(56) References Cited

U.S. PATENT DOCUMENTS

| | | | |
|---|---|---|---|
| 7,721,279 B1* | 5/2010 | Caufield | G06F 8/71 |
| | | | 717/169 |
| 8,392,013 B2 | 3/2013 | Thomson | |
| 8,938,714 B2 | 1/2015 | Hogg | |
| 10,037,197 B2 | 7/2018 | Barlette | |
| 10,135,936 B1 | 11/2018 | Venuraju | |
| 10,671,594 B2 | 6/2020 | Hu | |
| 11,531,947 B2 | 12/2022 | Damonte | |
| 2003/0018490 A1 | 1/2003 | Magers | |
| 2004/0143823 A1 | 7/2004 | Wei | |
| 2006/0123030 A1* | 6/2006 | Musteata | H04L 67/56 |
| 2006/0247805 A1 | 11/2006 | Thomson | |
| 2007/0240046 A1 | 10/2007 | Yan | |
| 2009/0319608 A1 | 12/2009 | Anil | |
| 2011/0004627 A1 | 1/2011 | Reca | |
| 2013/0103372 A1 | 4/2013 | Hogg | |
| 2014/0089207 A1 | 3/2014 | Manzano | |
| 2014/0282366 A1 | 9/2014 | Barletta | |
| 2015/0066573 A1 | 3/2015 | Damonte | |
| 2015/0074799 A1 | 3/2015 | Swink et al. | |
| 2015/0082271 A1 | 3/2015 | Damonte | |
| 2016/0063209 A1* | 3/2016 | Malaviya | G16H 50/50 |
| | | | 706/12 |
| 2016/0078079 A1 | 3/2016 | Hu | |
| 2016/0357826 A1* | 12/2016 | Raheja | G06F 16/9537 |
| 2017/0083012 A1* | 3/2017 | Murray | G05B 19/41885 |
| 2017/0191849 A1* | 7/2017 | Agam | G08G 1/148 |
| 2018/0074663 A1 | 3/2018 | Alabes | |
| 2018/0074674 A1 | 3/2018 | Alabes | |
| 2018/0074796 A1 | 3/2018 | Alabes | |
| 2018/0074815 A1 | 3/2018 | Alabes | |
| 2018/0075042 A1 | 3/2018 | Cruz | |
| 2018/0081642 A1 | 3/2018 | Alurralde Iturri | |
| 2018/0081791 A1 | 3/2018 | Alabes | |
| 2018/0081994 A1 | 3/2018 | Ron | |

OTHER PUBLICATIONS

Oracle®, "Using an OIC Integration in a Process Application", Copyright © 2018, 5 pages, retrieved Oct. 17, 2018 from: <https://docs.oracle.com/en/cloud/paas/integration-cloud/tutorial-use-integration/>.

Oracle®, "Using Processes in Oracle Integration Cloud", Copyright © 2017, 2018, 4 pages, retrieved Oct. 17, 2018 from: <https://docs.oracle.com/en/cloud/paas/integration-cloud/user-processes/work-integrations/>.

Oracle® Cloud, "Using Processes in Oracle Integration Cloud", E85489-09, Oct. 2018, Copyright © 2017, 2018, 565 pages.

Oracle® Cloud, "Using Oracle Process Cloud Service", E68292-14, Aug. 2018, Copyright © 2015, 2018, 559 pages.

Oracle® Cloud, "Using Processes in Oracle Integration", E85489-21, Jun. 2019, Copyright © 2017, 2019, 612 pages.

Oracle® Cloud, "Using Processes in Oracle Integration", E85489-16, Mar. 2019, Copyright © 2017,2019, 593 pages.

Oracle® Cloud, "What's New for Oracle Integration", E84902-36, Jun. 2019, Copyright© 2017, 2019, 68 pages.

Oracle® Cloud, "What's New for Oracle Process Cloud Service", E72231-11, Aug. 2018, Copyright © 2016, 2018, 9 pages.

* cited by examiner

| Application Home | TravelRequestForm | | TravelRequestForm | 🗐 🗐 🐾 ⚙ 🌐 |
|---|---|---|---|---|
| PALETTE | | | | |
| ☑ Dropdown | ☑ Text | | 🖨 print | |
| ○ Radio | ▭ TextArea | | Name | |
| ☑ Checkbox | 📄 Data | | ✎ | |
| 🗂 Section | ✉ EMail | | Date | |
| 🔁 Repeat | 💰 Money | | 📅 | |
| ▦ Tabs | 📞 Phone | | Total Amount | |
| ▭ Panel | ▦ Quantity | | 💲 | |
| ▦ Table | ▤ Number | | Purpose of Visit | |
| ○ Message | ☑ T/F | | ○ Internal Meeting | |
| 🔗 Link | 🖼 Image | | ○ Customer Visit | |
| ⚡ Trigger | | | ○ Training | |
| PROPERTIES | | | ○ Seminar | |
| Settings | Style | | | |
| Description | Edit the form to change this descri | | | |
| Element Name ⓘ | | | | |
| Save ☑ | Save PDF ☐ | | | |
| Printable ☑ | Decorated ☑ | | | |
| DATA SOURCES | | | | |
| ⊕ BusinessObjects ⊕ 🔍 | | | | |

*FIGURE 24*

DATA SOURCES

- BusinessObjects ⊕ 🔍
- CreditCheck ⊕
  - ssno ⊕
  - name ⊕
  - dob ⊕
  - phone ⊕
  - email ⊕

*FIGURE 26*

PROPERTIES

| Settings | Style |

Description [Edit this form to change this descri]

Element Name ⓘ

Save ☑    Save PDF ☐

Printable ☑    Decorated ☑

Configure Global Connector

(Connector Call)

Which connector do you want to call?

Connector  
COUNTRY_SERVICE ▼

Resource  
REGION ▼

Operation  
regions ▼

☐ Skip Upon Load ⓘ  
☐ Don't show loading spinner ⓘ  
☐ Ignore connector error ⓘ

Header Parameters  
regions  
Text ▼

Template Parameters  
something  
Text ▼

Where do you want to store the response data?  
globalResponse

SYSTEM AND METHOD FOR SOFTWARE DEVELOPMENT INCLUDING COLUMN-BASED PROCESS EDITOR

CLAIM OF PRIORITY

This application is a continuation of U.S. patent application titled "SYSTEM AND METHOD FOR SOFTWARE DEVELOPMENT INCLUDING COLUMN-BASED PROCESS EDITOR", application Ser. No. 16/657,843, filed Oct. 18, 2019; which claims the benefit of priority to U.S. Provisional Patent Application No. 62/748,305, filed Oct. 19, 2018; U.S. Provisional Patent Application No. 62/748,306, filed Oct. 19, 2018; U.S. Provisional Patent Application No. 62/748,308, filed Oct. 19, 2018; U.S. Provisional Patent Application No. 62/748,310, filed Oct. 19, 2018; U.S. Provisional Patent Application No. 62/748,312, filed Oct. 19, 2018; U.S. Provisional Patent Application No. 62/748,313, filed Oct. 19, 2018; U.S. Provisional Patent Application No. 62/748,314, filed Oct. 19, 2018; U.S. Provisional Patent Application No. 62/748,316, filed Oct. 19, 2018; U.S. Provisional Patent Application No. 62/748,317, filed Oct. 19, 2018; U.S. Provisional Patent Application No. 62/748,318, filed Oct. 19, 2018; U.S. Provisional Patent Application No. 62/748,319, filed Oct. 19, 2018; U.S. Provisional Patent Application No. 62/748,320, filed Oct. 19, 2018; U.S. Provisional Patent Application No. 62/748,321, filed Oct. 19, 2018; U.S. Provisional Patent Application No. 62/748,323, filed Oct. 19, 2018; U.S. Provisional Patent Application No. 62/748,325, filed Oct. 19, 2018; and U.S. Provisional Patent Application No. 62/748,326, filed Oct. 19, 2018; each of which above applications are herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

Embodiments disclosed herein are generally related to systems and methods for software development and execution, and business process management systems or environments, and are particularly directed to software development tools for use in developing and managing software applications associated with business processes.

BACKGROUND

Business process management systems or environments enable the design, development, and management of software applications that implement business processes. A typical business process management system may provide a design-time environment, that enables a software developer to develop and test business process software applications; and a runtime environment, that enables use and management or monitoring of such business process software applications.

For example, a design-time environment may provide graphical tools for designing business processes, rules, and forms (e.g., web forms to interact with end-users); together with a test environment for refining business process software applications, prior to their use in production; while a runtime environment may allow a business user to execute a business process application; view, complete, reassign, and delegate tasks; share documents and collaborate with others within a team; and/or track process flows, view detailed audit trails, troubleshoot, or fix processes.

Such business process management systems or environments enable line-of-business managers and process designers—who may not be experienced software developers—to build and customize business process software applications in a collaborative manner. However, a non-intuitive or complicated design-time tool can lead to inefficiencies during the software development process, and result in a slower time to production.

SUMMARY

In accordance with an embodiment, described herein are systems and methods for use with business process management (BPM) systems or environments, such as Oracle Process Cloud Service (Oracle Process, Process Cloud Service, PCS), including software development tools for developing software applications that are associated with business processes (generally referred to herein as business process software applications, business process applications, process applications, or processes).

In accordance with an embodiment, the system comprises a column-based process editor and graphical user interface, that can utilize a column-based format to model and display a process, for example a dynamic process, which can subsequently be deployed and executed within the system or environment. For example, the column-based process editor and graphical user interface can include various graphical elements to indicate configured properties of artifacts of a dynamic process. Interaction with the graphical elements enables users to review, edit, and/or remove particular properties associated with the dynamic process.

In accordance with an embodiment, the column-based process editor can display, within its graphical user interface, the various stages of different tasks that are associated with a business process, in a multi-column-based format. The business process management system can receive input, e.g., from a condition editor, that specifies a condition to be satisfied with respect to a particular stage or activity of a business process represented in the column-based process editor. The system can then bind the condition to a stage or activity of the process, as represented in the column-based process editor.

As another example, in accordance with an embodiment, the business process management system can add, in response to the receiving an input, a sequential stage marker to a business process, as represented in the column-based process editor. The sequential stage marker can be, for example, a graphical indicator (e.g., an icon) displayed on or about the process represented in the column-based process editor.

In this manner, the use of a column-based process editor enables the editing of a model underlying a dynamic process, in a natural and intuitive manner.

BRIEF DESCRIPTION OF THE DRAWINGS

FIG. 17 illustrates an example of a graphical user interface or screenshot of an example display of a column-based process editor, including a graphical representation of a dynamic process, in accordance with an embodiment.

FIG. 18 illustrates an example of a graphical user interface or screenshot of an example display of a column-based process editor, including a graphical representation of a dynamic process, in accordance with an embodiment.

FIG. 19 illustrates an example of a graphical user interface or screenshot of an example display of a column-based process editor, including a graphical representation of a dynamic process, in accordance with an embodiment.

FIG. 22 illustrates an integration development user interface, in accordance with an embodiment.

FIG. 24 illustrates an example form designer of a business process management system, in accordance with an embodiment.

FIG. 25 illustrates an example of a properties editor, in accordance with an embodiment.

FIG. 26 illustrates an example of a data source pane, in accordance with an embodiment.

FIG. 30 illustrates an example of a form designer with an example form, in accordance with an embodiment.

FIG. 42 illustrates an example of grouped badge indicators, in accordance with an embodiment.

FIG. 46 further illustrates an example of a web form event analyzer, in accordance with an embodiment.

FIG. 47 illustrates an example of a global connector configuration user interface, in accordance with an embodiment.

FIG. 60 further illustrates an example of a system for supporting decision model and notation service integration, in accordance with an embodiment.

FIG. 66 further illustrates an example of a user interface for integrating a process cloud service with an integration cloud service, in accordance with an embodiment.

DETAILED DESCRIPTION

Figure 1:
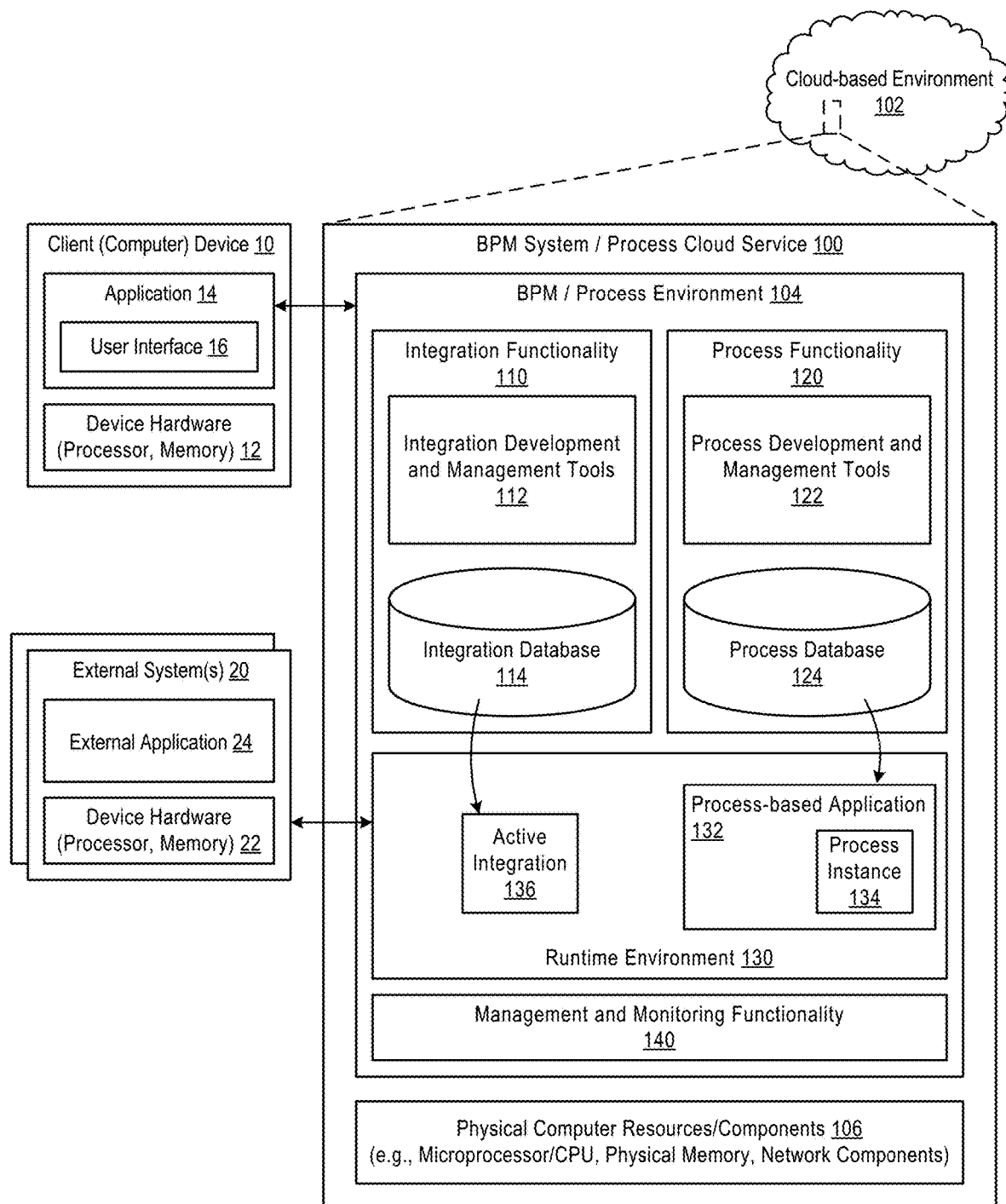
FIG. 1 illustrates an example of a business process management system, in accordance with an embodiment.

The foregoing, together with additional embodiments and features thereof will become apparent upon referring to the following description including specification, claims, and accompanying drawings.

In the following description, for purposes of explanation, specific details are set forth in order to provide a thorough understanding of various embodiments of the invention. However, it will be apparent that various embodiments can be practiced without these specific details. The following description including specification, claims, and accompanying drawings are not intended to be restrictive.

For the purposes of this discussion, in accordance with an embodiment, a computing environment can generally be a collection of computing resources used to perform one or more tasks involving computer processing. A computer can be a processor in communication with a memory. A computing resource can be a component, mechanism, or capability or quantities thereof of a computing environment, including, but not limited to, processors, memories, software applications, user input devices, and output devices, servers, and so on.

In accordance with an embodiment, an enterprise computing environment can be a collection of computing resources of an organization used to perform one or more tasks involving computer processing. An example enterprise computing environment includes various computing resources distributed across a network, and can further include private and shared content on intranet web servers, databases, files on local hard discs or file servers, email systems, document management systems, portals, and so on. In other examples, the enterprise computing environment can be a cloud-based environment, which provides server-side environments for enterprise tasks. Such server-side or cloud-based environments can be accessible to users via, for example, a client application or browser.

In accordance with an embodiment, enterprise software can be a set of computer code that is adapted to facilitate implementing an enterprise-related process or operation, such as managing enterprise resources, managing customer relations, and so on. In accordance with various embodiments, the terms "enterprise software" and "enterprise application" can be employed interchangeably herein. However, an enterprise application can include one or more enterprise software modules or components, such as user interface software modules or components.

Certain embodiments described herein are applicable for development, deployment, and implementation of process-based software applications. A process-based software application can be a software application (referred to herein in some embodiments as an application) definable by one or more sequences of steps, also generally referred to as process elements or software activities. The terms "process element," "flow element," "software element," and "software process element" can be employed interchangeably herein to refer to any step, e.g., event, activity, gateway, sub-process, and so on. A sequence of steps of a process-based software application can be generally referred to as a process flow.

In accordance with an embodiment, process flows are often modeled and illustrated via swim lanes in a graphical user interface (GUI) display screen. Process applications are often implemented via composite applications that can leverage different web services for different process steps.

In accordance with an embodiment, a software system can be a collection of computing resources implementing machine-readable instructions, i.e., computer code. Accordingly, the term "software system" can refer to a software application, and, depending upon the context in which the term is used, can further refer to the accompanying computer(s) and associated computing resources used to run the software application.

Business Process Management

As described above, business process management (BPM) systems or environments, such as Oracle Process Cloud Service (Oracle Process, Process Cloud Service, PCS), enable the design, development, and management of software applications that implement business processes.

A typical business process management system provides a design-time environment (e.g., Oracle Process Composer), that enables a software developer to develop and test business process software applications; and a runtime environment (e.g., Oracle Process Workspace), that enables use and management or monitoring of such business process software applications. Such business process management systems or environments enable line-of-business managers and process designers—who may not be experienced software developers—to build and customize business process software applications in a collaborative manner.

However, a non-intuitive or complicated design-time tool can lead to inefficiencies during the software development process, and result in a slower time to production.

Business Process Management System (Process Cloud Service)

FIG. 1 illustrates an example of a business process management system, in accordance with an embodiment.

As illustrated in FIG. 1, in accordance with an embodiment, the business process management (BPM) system can be provided as a process cloud service, (PCS) 100, in a cloud-based computing environment 102. In accordance with an embodiment, the business process management system/process cloud service can include physical computer resources or components 106 (e.g., microprocessor/CPU, physical memory, network components), an operating system (not shown), and one or more BPM/process environment(s) 104.

In accordance with an embodiment, the BPM/process environment provides a platform where entities (e.g., clients, organizations) can, for example, integrate applications, automate processes, develop applications, and/or analyze results.

For example, in accordance with an embodiment, the BPM/process environment enables entities/clients to connect cloud and/or on-premises applications, model and automate business processes, develop web and mobile software applications, collect metrics about a business, and/or obtain real-time analytics.

In accordance with an embodiment, the BPM/process environment can include an interface (e.g., a command line interface, web-based interface, graphical user interface) that enables access by a client (computer) device 10 having a device hardware 12, a client application 14, and a graphical user interface 16. In one an example embodiment, the client application can be a web browser that provides a web-based graphical interface generated by the BPM/process environment.

In accordance with an embodiment, the BPM/process environment provides an integration functionality 110 that entities (e.g., clients, organizations) to connect various software applications.

For example, in accordance with an embodiment, the integration functionality enables users to select applications to integrate, configure connection details for each application, and map data between the applications. Such applications can be cloud-based applications implemented in the cloud-based environment, or another network environment.

In accordance with an embodiment, the applications can also include on-premises applications. For example, external system(s) 20 (e.g., computing systems) can include device hardware 22 and an external application 24, which can be connected to other applications using the integration functionality.

In accordance with an embodiment, the integration functionality can include integration development and management tools 112, that enable users (for example, via client device 10) to create, manage, and monitor integrations, which can be stored in an integrations database 114.

In accordance with an embodiment, the BPM/process environment provides a process functionality 120 that enables users to design, automate, and manage business processes.

For example, in accordance with an embodiment, the process functionality enables users to create process applications, which can include modeling a process flow, creating web forms, and creating data objects for process data. In particular, the process functionality 120 can include, within a design-time environment, process development and management tools 122 that enable users to develop, manage, and monitor process applications, which can be stored in a process database 124.

In accordance with an embodiment, BPM/process environment can include a runtime environment 130, which enables deployment and execution of process applications and integrations.

For example, in accordance with an embodiment, an integration definition, stored in an integration database, can be activated and deployed to the runtime environment as an active integration 136. Similarly, a process definition can be deployed from the process database, to the runtime environment, as a process application 132, which can be associated with one or more process instance(s) 134.

In accordance with an embodiment, a process instance is a particular execution of the process application with specific data. For example, if the process application models a loan approval process, then a particular process instance may correspond to a particular loan application submitted by a loan applicant.

In accordance with an embodiment, the BPM/process environment can provide a management and monitoring functionality 140 that enables a user (e.g., an administrator) to control integration and/or process instances.

For example, in accordance with an embodiment, the management and monitoring functionality can enable the administrator to define user roles, configure privileges, create and configure instances in the environment, monitor instance usages, review instance logs, and other administrative tasks that may be typical for customers of a platform service such as the business process management system/process cloud service.

Figure 2:
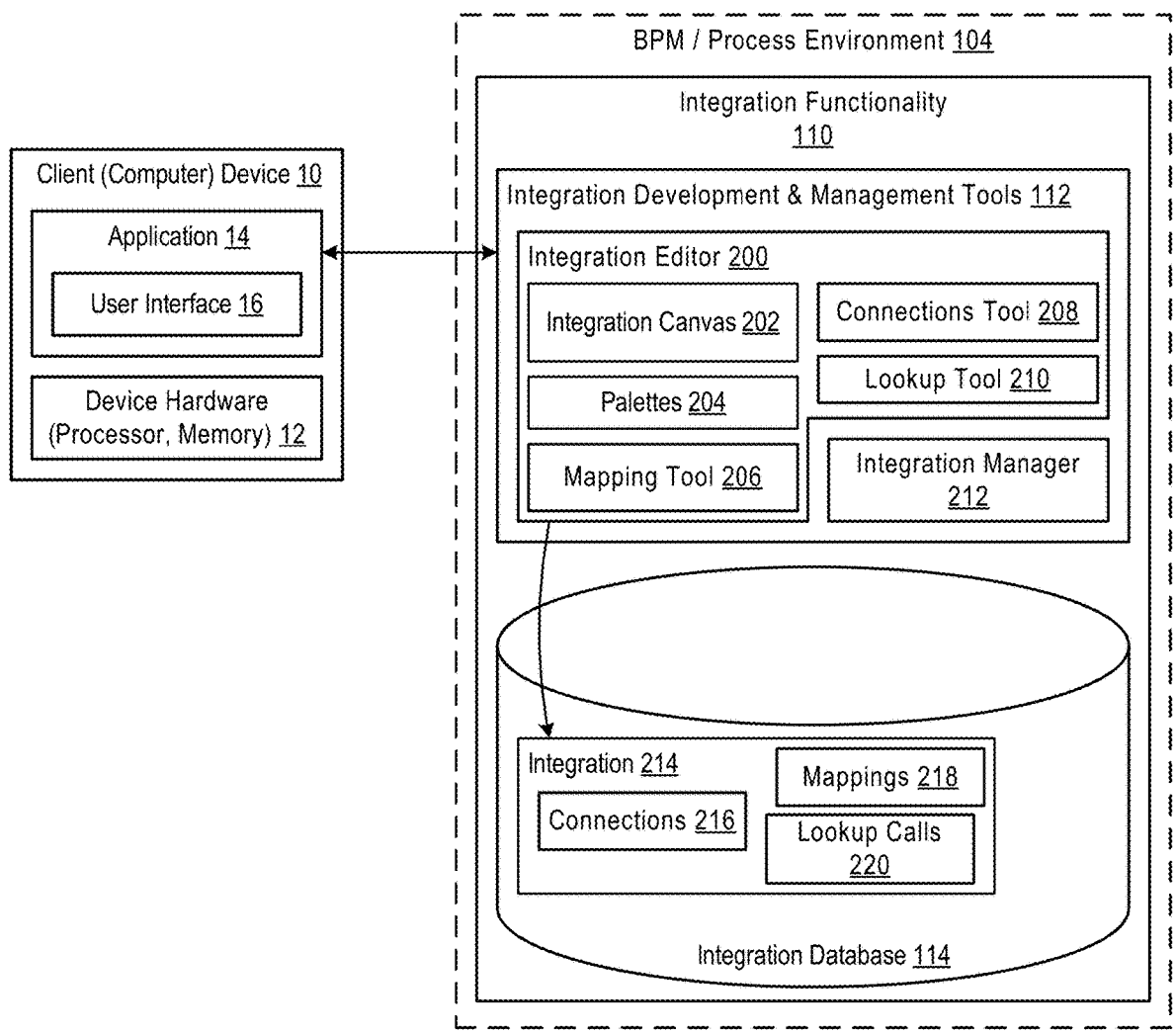
FIG. 2 further illustrates an example of a business process management system, in accordance with an embodiment.

FIG. 2 further illustrates an example of a business process management system, in accordance with an embodiment.

As described above, in accordance with an embodiment, an integration defines connectivity between applications, which can be cloud-based applications, on-premises applications, or other application services that a user may wish to connect. In accordance with an embodiment, integration development and management tools can include an integration editor 200 that can received instructions from, for example, users (for example, via client device 10 for example) in order to create and/or edit integrations.

In accordance with an embodiment, the integration editor can include an integration canvas 202 and palette(s) 204 that provide a graphical development environment that can be accessed, for example, by users. For example, in accordance with an embodiment, palettes can include various graphical elements associated with integration components. A user can select elements from the palettes, and add them to the canvas (via a drag-and-drop, for example). Elements placed on the canvas can be edited and/or configured with other tools such as a mapping tool 206, a connections tool 208, and/or a lookup tool 210.

In accordance with an embodiment, an integration between two applications can include a connection associated with each application. A connection can be a source (trigger) or a target (invoke) connection. A source connection typically corresponds to an application providing data, and a target connection is associated with an application receiving data.

In accordance with an embodiment, connections can be based on adapters, and the BPM/process environment can provide a set of pre-defined adapters for particular cloud-based applications or common endpoints. Using the connections tool, connections for an integration can be configured to enable connectivity. In accordance with an embodiment, data is obtained and sent to applications via configured connections of an integration.

In accordance with an embodiment, an integration includes a data map that links data fields between applications having different data structures. The mapping tool enables one or more data fields from a first application (e.g., a source) to one or more data fields of another application (e.g., a target). The mapping tool can be provide as a visual mapper that enables mapping by dragging a source element of a first data structure to a target element of a second data structure.

In accordance with an embodiment, lookups can be created to account for different representations of similar data across applications. For example, a first application can use a first set of country codes to represent countries, while another application can use a second, different set of country codes for the same countries. The lookup tool can be used to define a lookup to translate the different representations of similar data. The lookup can be accessed in a mapping via a lookup function call, so that mapped data is translated during communication between applications.

As illustrated in FIG. 2, in accordance with an embodiment, integrations can be stored in the integration database. In accordance with an embodiment and described above, an integration, such as integration 214, can include connections 216, mappings 218, and lookup calls 220.

In accordance with an embodiment, an integration manager 212 enables users to activate integrations, deactivate integrations, delete integrations, clone integrations, and monitor integrations.

For example, in accordance with an embodiment, the integration manager can provide metrics associated with integrations such as, but not limited to, a number of message processed by an integration, a success rate for messages, usage metrics of connections, or a number of failed messages.

Figure 3:
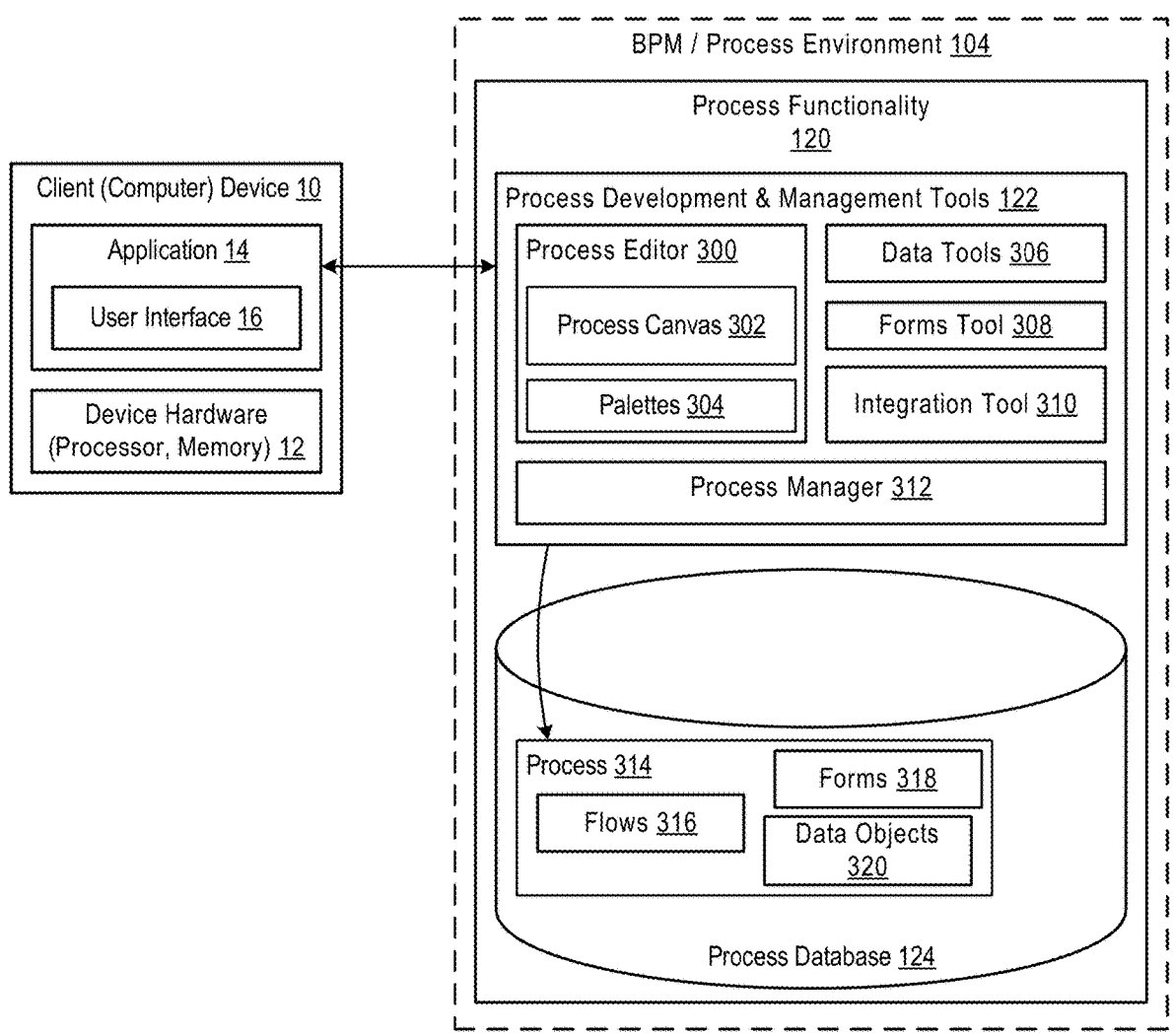
FIG. 3 illustrates an example of process functionality within a business process management system, in accordance with an embodiment.

FIG. 3 illustrates an example of process functionality within a business process management system, in accordance with an embodiment.

As described above, in accordance with an embodiment, a process application implements tasks or activities of a business process. The tasks can include human tasks or automated tasks. The process functionality can include functionality associated with business process model and notation (BPMN) to define process flows and application behavior.

In accordance with an embodiment, the process development and management tools can include a process editor 300 that can accept instructions from users (for example, via client device 10) to create and/or edit process applications. In particular, the process editor can include a process canvas 302 and palette(s) 304 that provide a graphical development environment for users to define process flows.

For example, in accordance with an embodiment, palettes can include various graphical elements associated with flow components. Flow components can also be referred to as process components, process elements, flow elements, process nodes, process flow nodes, flow nodes, or nodes.

In accordance with an embodiment, flow components can include gateway components that include process elements for splitting a process path into two or more process paths, or merging two or more process paths into a single process path. Components can also be associated with human task components that represent user tasks or interactions. Generally, in accordance with an embodiment, with process applications, a human task relates to the system operation of receiving and processing user input, which can be provided by the user during execution of the process task. Process elements can also be associated with particular events.

For example, in accordance with an embodiment, if a trigger condition is satisfied and/or a previous task is completed, the process flow can include event components representing automated tasks, such as alerts or notifications. Process components can also include sequence elements that connect other process elements described. Sequence elements can have directionality, and define flow paths between and among flow components.

In accordance with an embodiment, a user can select flow components from the palettes and add them to the canvas (via drag-and-drop, for example) to define a process flow. For example, a user can drag one or more task process components to canvas and connect the task process components with sequence components to create a flow path between the tasks.

In accordance with an embodiment, process development and management tools can include data tools 306, forms tool 308, and integration tool 310 to configure other aspects of a process application. Data tools enable users to define business types, create data objects, define input and output, and generally develop how data is stored, manipulated, and used in the process application. For example, data objects can represent concepts or objects modeled in process applications such as, but not limited to, tickets, requests, employees, documents, orders, invoices, and the like.

In accordance with an embodiment, a forms tool enables users to define interfaces such as web forms. In one example, web forms can provide the user interface for human tasks of a process application. A web form can also provide a start point that launches an instance of the process application.

In accordance with an embodiment, an integrations tool enables connecting the process application to other application via an integration as described above. For example, a task of a process flow can be triggered by a message processed through an integration, or an outcome of a task can be sent to another application via an integration.

As illustrated in FIG. 3, in accordance with an embodiment, process applications can be stored in a process database. In accordance with an embodiment and described above, a process application, such as process 314, can include process flow(s) 316, forms 318, and data objects 320.

In accordance with an embodiment, process manager 312 enables users to deploy and monitor process applications.

Figure 4:
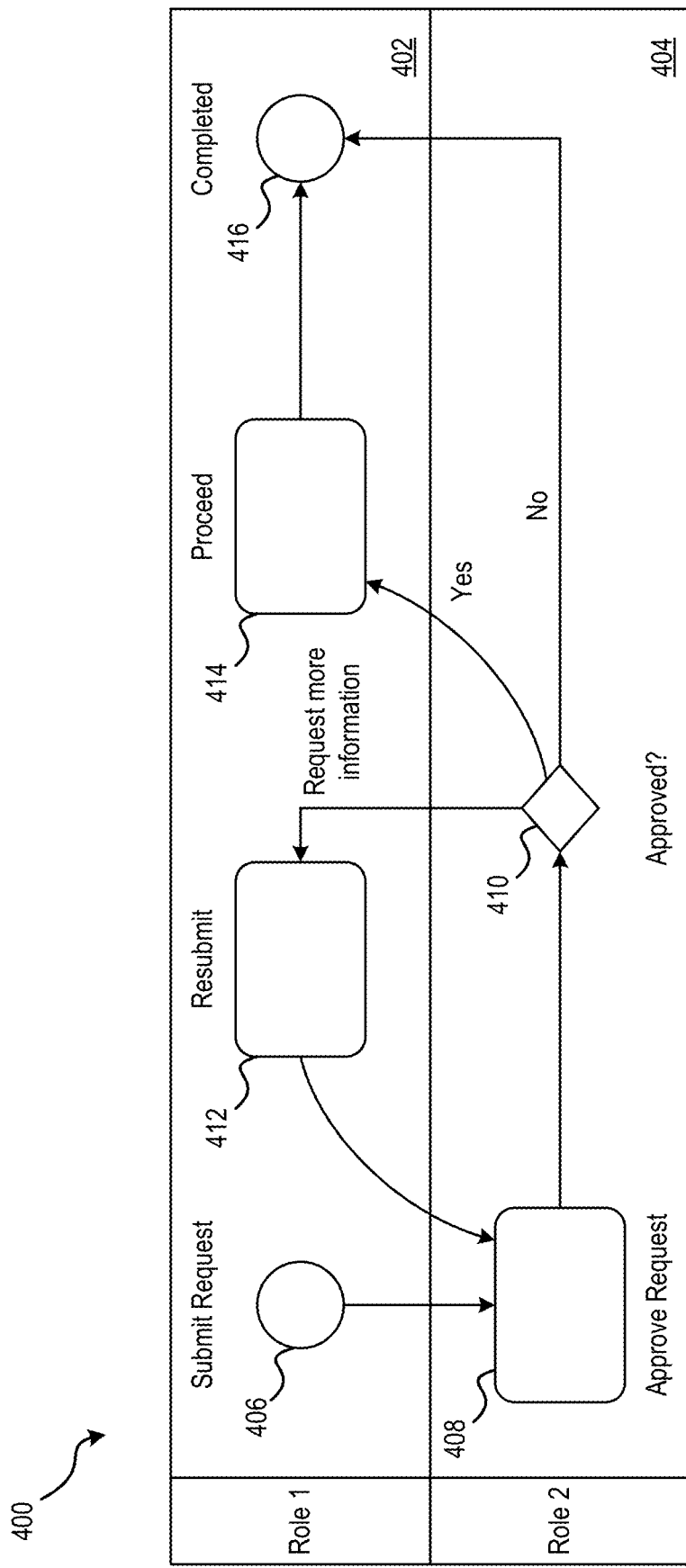
FIG. 4 illustrates an example representation of a business process, in accordance with an embodiment.

FIG. 4 illustrates an example representation of a business process, in accordance with an embodiment.

As illustrated in FIG. 4, in accordance with an embodiment, a process flow 400 can be created, for example, using process editor 300. In this example, the process flow includes a swim lane 402 assigned to "role 1" and a swim lane 404 assigned to "role 2". Swim lanes are associated with roles (e.g., actors) such that process components in a swim lane are carried out or otherwise associated with assigned role.

As further illustrated in FIG. 4, in accordance with an embodiment, the process flow defines an approval process, which begins with a start process component 406, where a requestor (e.g., "role 1") submits a request (e.g., for a travel expense). The request is communicated to an approver (e.g., "role 2") associated with a task 408 (e.g., a human or an automated task) for approving the request. The process flow includes a gateway element 410 that branches the flow path based on an outcome of the approve task.

For example, in accordance with an embodiment, if more information is needed, then gateway element branches to a resubmit task 412 assigned to the requestor. If the request is approved, the gateway element flows to a task 414 notifying the requestor to proceed with the requested action (e.g., book the travel). If the request is not approved, the process flow terminates at an end task 416.

As further illustrated in FIG. 4, in accordance with an embodiment, the process flow also proceeds to the end task following approval and notification of approval.

Column-Based Process Editor

Generally described, in accordance with an embodiment, a dynamic process (e.g., a dynamic business process) organizes and/or automates unpredictable, e.g., business processes.

For example, in accordance with an embodiment, a business process can require expert knowledge or input from participants or can have variable circumstances. A dynamic process can be utilized to model such a business process, since a dynamic process need not follow a structure or sequential path. In contrast to structured processes, dynamic processes are adaptable. For example, with a dynamic process, certain tasks can or may not be performed, given a situation, and outcomes can vary across instances.

In accordance with an embodiment, the system comprises a column-based process editor that can utilize a column-based format to model and display a process, for example a dynamic process. The column-based process editor can provide a graphical environment (e.g., a graphical user interface (GUI)) for use in creating and configuring dynamic processes, which can subsequently be deployed and executed within a BPM environment.

In accordance with an embodiment, the graphical environment can include various graphical elements (e.g., notation icons) to indicate configured properties of artifacts of a dynamic process. Interaction with the graphical elements launch integrated GUI elements, enabling users to review, edit, and/or remove particular properties.

In accordance with an embodiment, the column-based process editor can display, within its graphical user interface, the various stages of different tasks that are associated with a business process, in a multi-column-based format. The business process management system can receive input, e.g., from a condition editor, that specifies a condition to be satisfied with respect to a particular stage or activity of a business process represented in the column-based process editor. The system can then bind the condition to a stage or activity of the process, as represented in the column-based process editor.

As another example, in accordance with an embodiment, the business process management system can add, in response to the receiving an input, a sequential stage marker to a business process, as represented in the column-based process editor. The sequential stage marker can be, for example, a graphical indicator (e.g., an icon) displayed on or about the process represented in the column-based process editor.

In this manner, in accordance with an embodiment, the use of a column-based process editor enables the editing of a model underlying a dynamic process, in a natural and intuitive manner.

Figure 5:
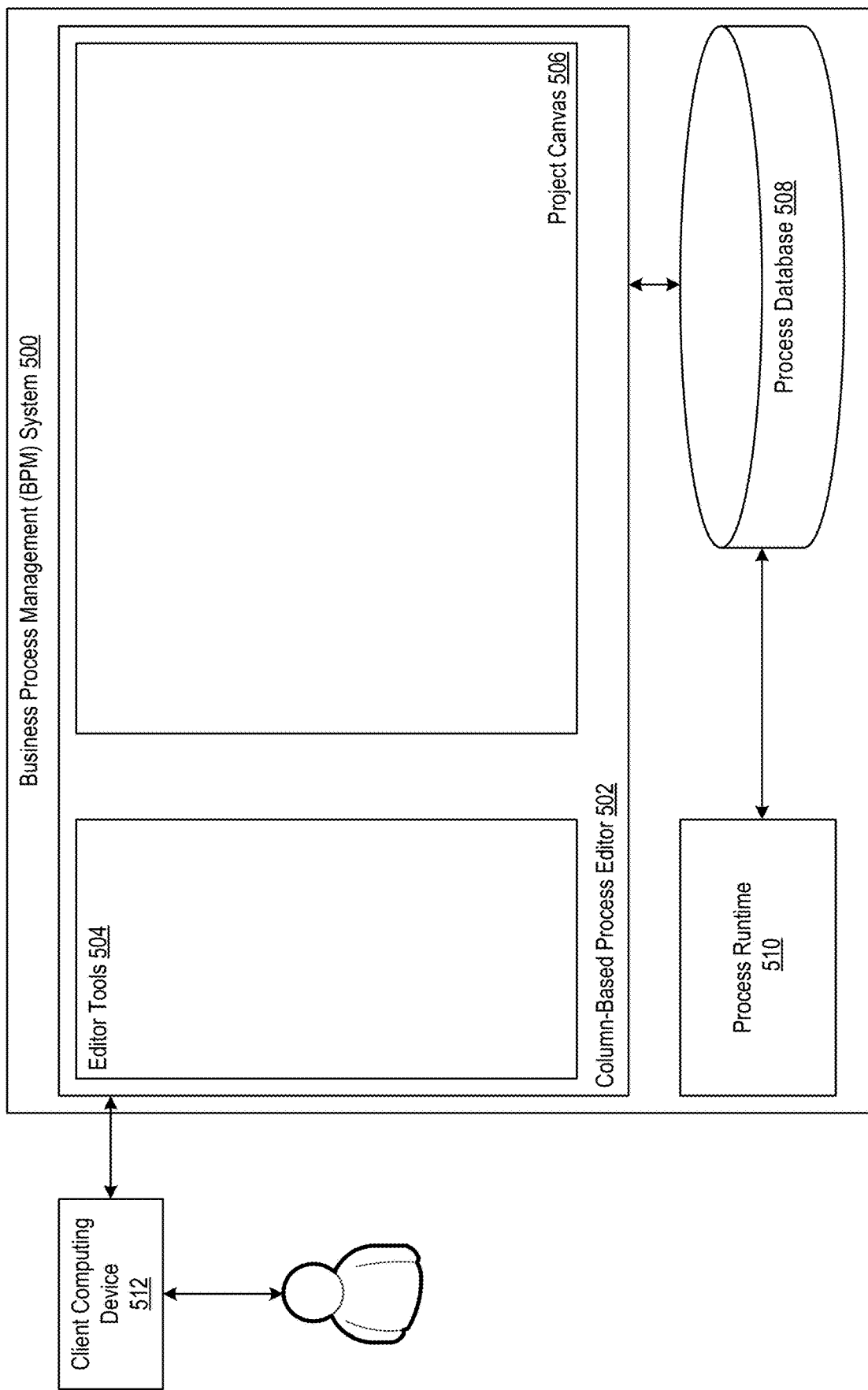
FIG. 5 illustrates an example of a column-based process editor, for use with a business process management system, in accordance with an embodiment.

FIG. 5 illustrates an example of a column-based process editor, for use with a business process management system, in accordance with an embodiment.

In general, in accordance with an embodiment, the column-based process editor provides a graphical representation of a dynamic process that includes process tasks organized into column corresponding to one or more stages of the process.

In accordance with an embodiment, some stages (and tasks within stages) can be performed in parallel, sequentially, or some other order as defined by properties configured within the editor. Accordingly, the editor enables tasks to be generally organized into column-based stages, and stages/tasks have configurable properties that determine availability (e.g., available to be performed), to account for an unpredictable nature of the underlying business process modeled and automated by the dynamic process.

As illustrated in FIG. 5, in accordance with an embodiment, a business process management (BPM) system 500 can host a column-based process editor 502, a process database 508, and a process runtime 510.

In accordance with an embodiment, the business process management system can be included in, provided by, or implemented as business process management system/process cloud service as described above; and can be provided as a server-based or cloud-based system accessible to users via a client computing device 512.

In accordance with an embodiment, the column-based process editor can create process information that defines a dynamic process, including properties, execution (e.g., ordering) conditions, activation/termination criteria, assigned roles, and the like. The process information can be stored in process database 508 along with associated data (e.g., supporting web forms, data objects, documents). The process data and associated data can be deployed to the process runtime and executed as one or more instances of the dynamic process.

In accordance with an embodiment, the column-based process editor can generate a graphical representation of a dynamic process, which can be displayed (for example, at client computing device 512) along with various user interface elements to facilitate creation and configuration of the dynamic process. For example, the column-based process editor can include a project canvas 506 for providing the graphical representation of the dynamic process, and editor tools 504 (e.g., user interface elements) to facilitate creation and configuration the dynamic process and constituent parts.

Figure 6:
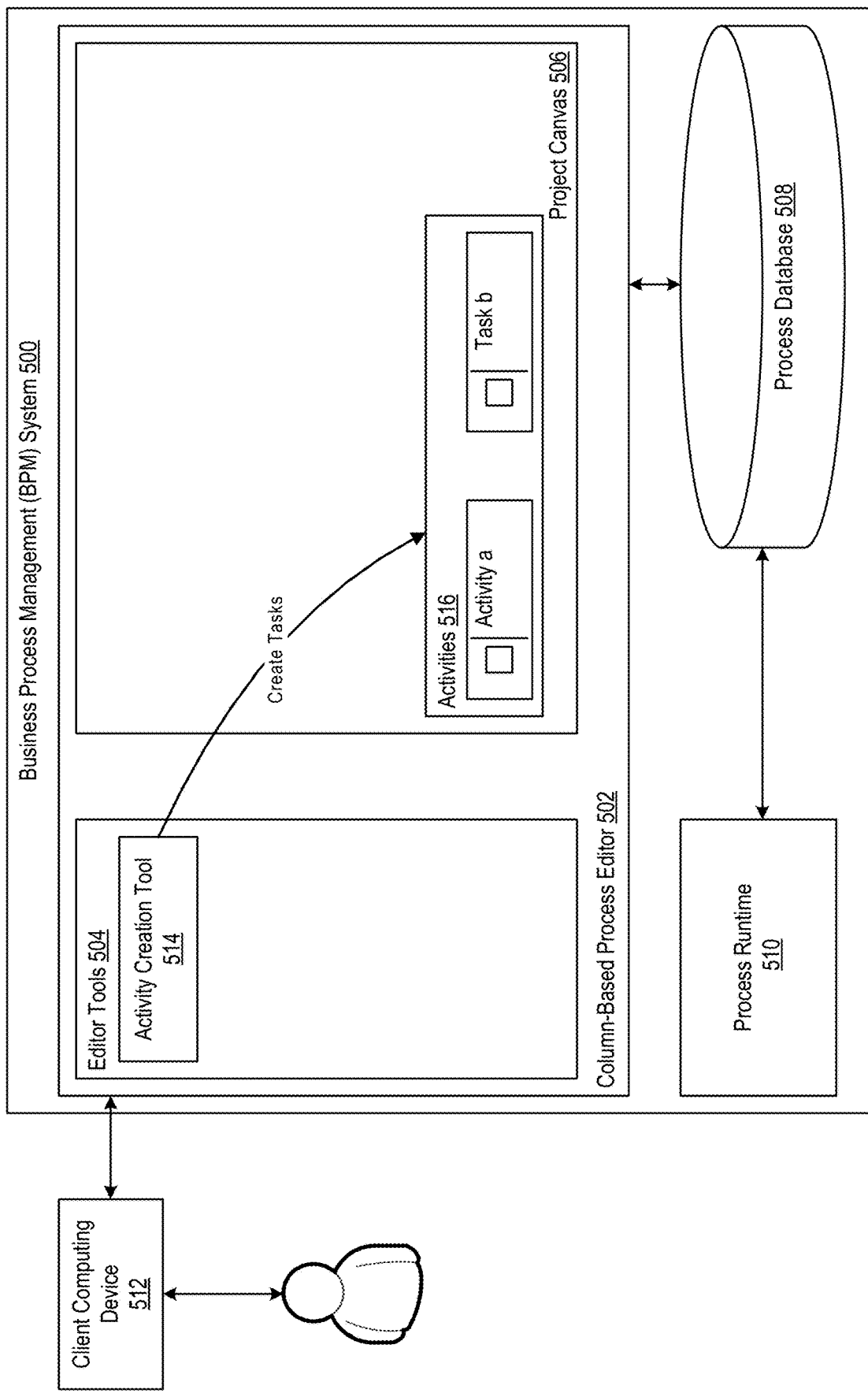
FIG. 6 further illustrates the use of a column-based process editor, in accordance with an embodiment.

FIG. 6 further illustrates the use of a column-based process editor, in accordance with an embodiment.

As illustrated in FIG. 6, in accordance with an embodiment, the editor tools can include an activity creation tool 514 for creating activities or tasks of the dynamic process. The terms "activity" or "task" can be used interchangeably herein. In accordance with an embodiment, activities or tasks can be divided into various types.

For example, in accordance with an embodiment, a human task represents an activity where a process participating performs an action such as filing out a form or providing other input. A process task represents a structured process invoked to complete or more actions within the dynamic process. A service task represents an external service invoked during execution of the dynamic process. The external service or application can be invoked via an integration as described above, in which case the task can be referred to as an integrations task. A milestone represents a sub-goal or checkpoint within the dynamic process. Accordingly, the milestone may not be associated with a specific action or actions to be performed, but rather are defined to track progress of the dynamic process.

As further illustrated in FIG. 6, in the example illustrated, the user can utilize the activity creation tool to create tasks such as "Activity a" and "Task b". In accordance with an embodiment, the created tasks are illustrated in an Activities 516 section of the project canvas. These tasks can be considered global tasks, which are always available to be performed. More specifically, global tasks can be associated with a state (e.g., an availability state) that is dependent on a state of the dynamic process. Global tasks are independent of stages, which are described below.

Figure 7:
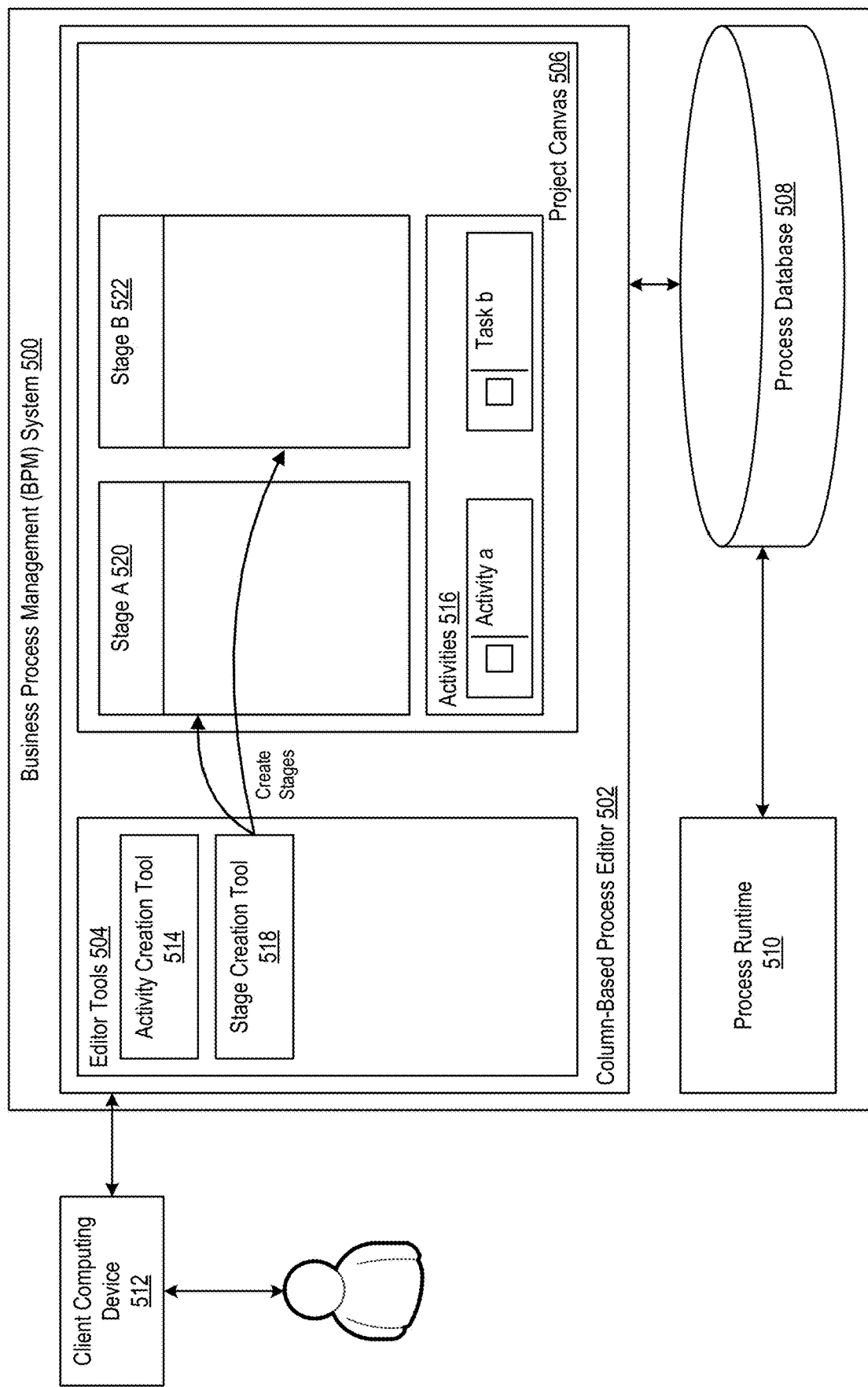
FIG. 7 further illustrates the use of a column-based process editor, in accordance with an embodiment.

FIG. 7 further illustrates the use of a column-based process editor, in accordance with an embodiment.

As illustrated in FIG. 7, in accordance with an embodiment, editor tools can include a stage creation tool 518 for creating stages of the dynamic process.

For example, as illustrated in the example of FIG. 7, "Stage A" 520 and "Stage B" 522 can be created via a stage creation tool 518, and illustrated in the project canvas as columns. In one aspect, stages are segments into which a process is divided, and act as containers for logical groupings of tasks. Stages can execute in parallel, or particular stages can activate upon occurrence of an event.

Figure 8:
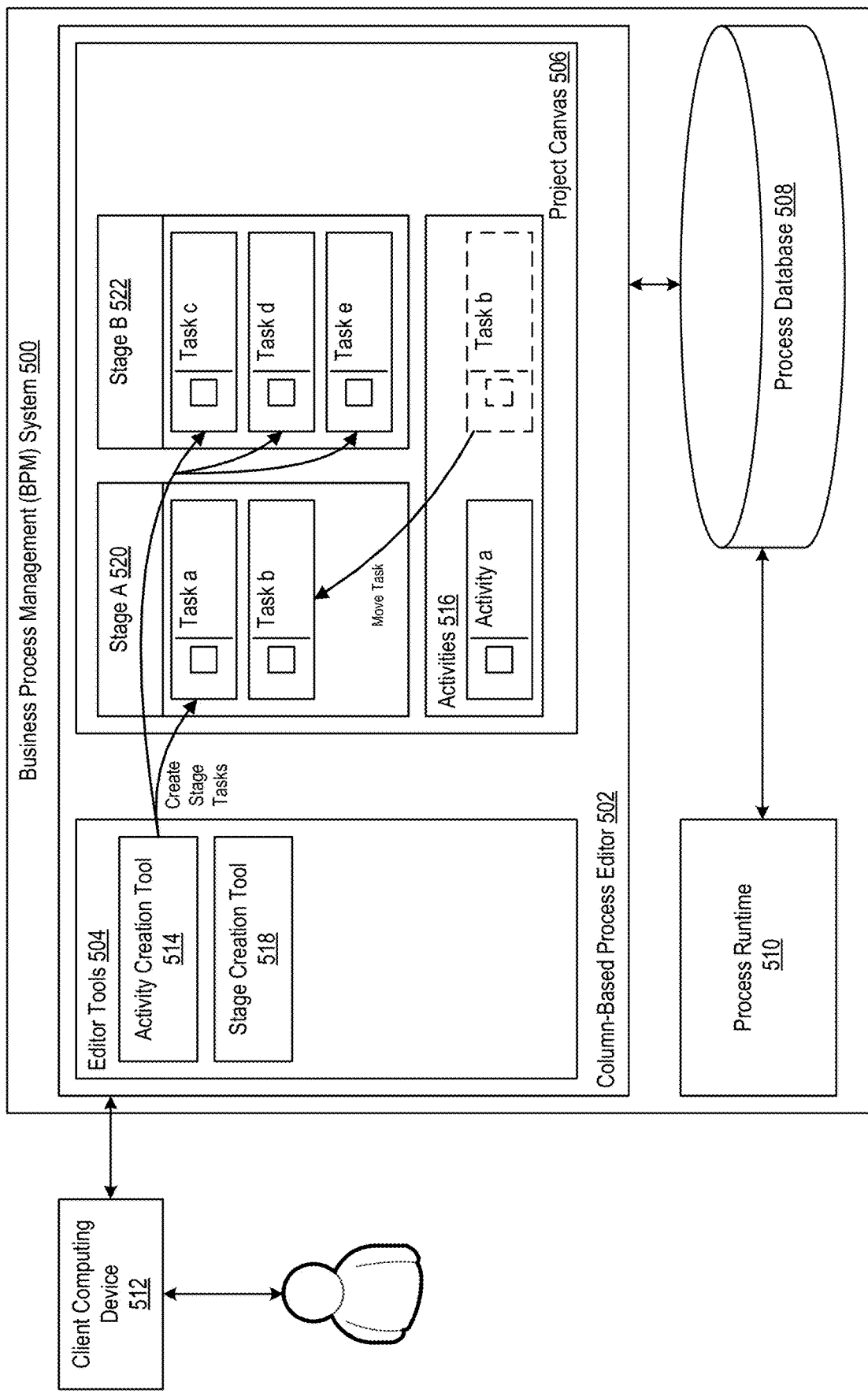
FIG. 8 further illustrates the use of a column-based process editor, in accordance with an embodiment.

FIG. 8 further illustrates the use of a column-based process editor, in accordance with an embodiment.

As illustrated in FIG. 8, in accordance with an embodiment, the activity creation tool can be utilized by the user to create tasks within, in this example, "Stage A" and "Stage B". For example, "Task a" can be created within "Stage A" and "Task c" through "Task-e" can be created within "Stage B" as illustrated. When contained within a stage, activation or availability of a task can be dependent on a state of the containing stage. For example, when a stage is activated and available, containing tasks can also become available.

In accordance with an embodiment, a graphical representation (e.g., illustrated in project canvas 506), which can be created by the column-based process editor and displayed on client computing device, can be interactive. For example, "Task b" can be moved (e.g., via drag-and-drop) from "Activities' to "Stage A" as illustrated. Upon completion of this move, "Task b" transitions from being a global task to a task contained with "Stage A".

Figure 9:
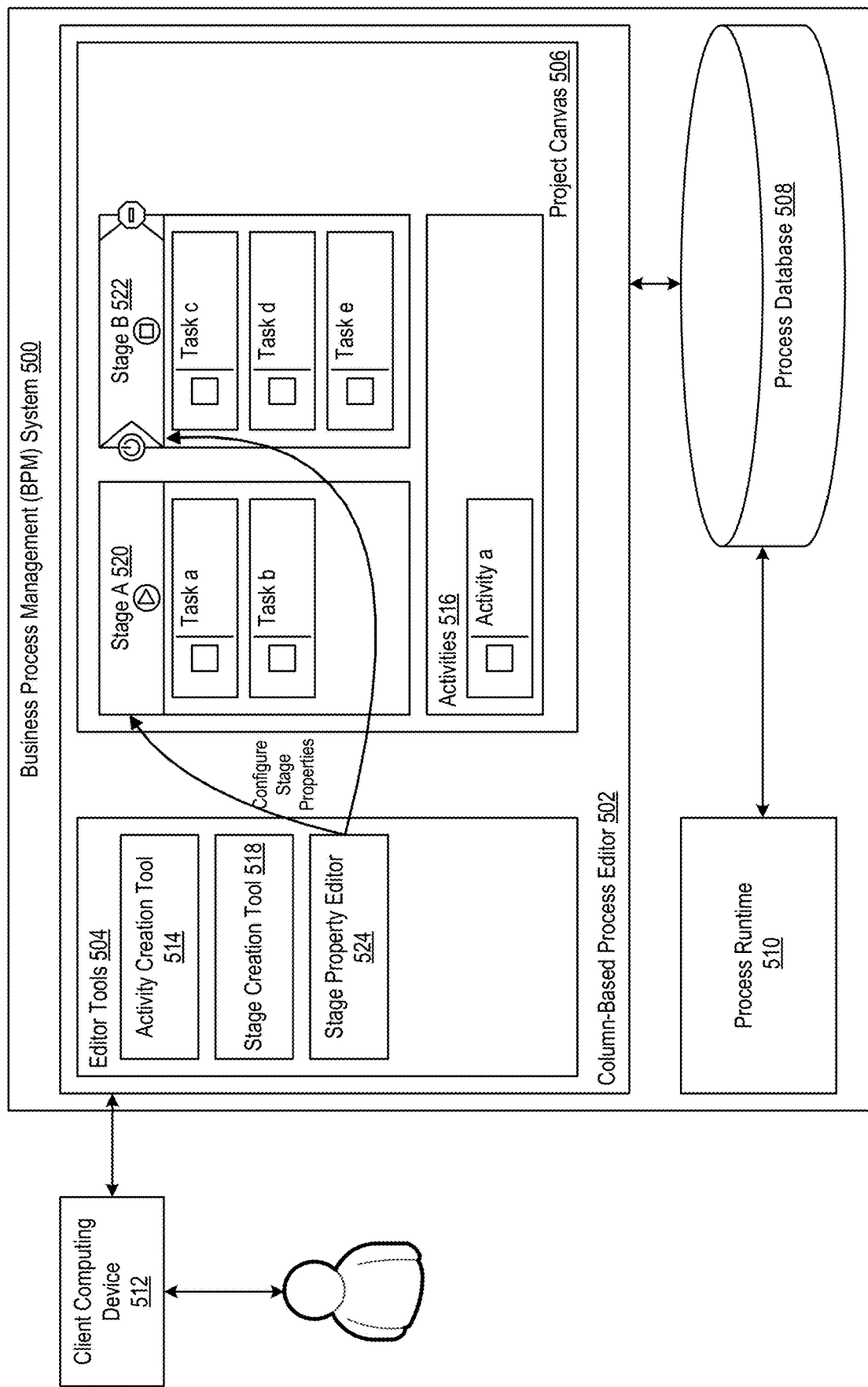
FIG. 9 further illustrates the use of a column-based process editor, in accordance with an embodiment.

FIG. 9 further illustrates the use of a column-based process editor, in accordance with an embodiment.

As illustrated in FIG. 9, in accordance with an embodiment, the editor tools includes a stage property editor 524 for configuring properties, such as conditions, markers, roles, and other attributes (e.g., name and/or description) associated with stages.

In accordance with an embodiment, an example of a configurable property of a stage, are markers. Markers can be configured to control transitions of a stage between states. For example, markers to indicate that a stage is manually-activated and/or auto-completes can be configured with the stage property editor. When a manually-activated marker is enabled, the stage can transition from available to enabled, but is activated (e.g., transitions to an active state) with explicit input from a user (e.g., process participant).

In accordance with an embodiment, an auto-complete marker, if enabled, causes a stage to transition automatically from an active state to a complete state if no activities within the stage are active. These markers can in turn cause state transitions in tasks contained with the stage. For example, a stage transitioning to an active state via manual activation can cause tasks contained therein to also transition to an active state.

In accordance with an embodiment, other markers can indicate not only control a transition of a state of a stage, but can also influence states of other parts of the dynamic process, such as a state of the process itself. For example, a stage can be marked as required or repeatable. A required marker indicates that the stage must be executed in order for the process to complete. A repeatable marker indicates that execution can repeat (subject to a condition, in some embodiments).

In accordance with an embodiment, as illustrated in FIG. 9, enabled markers can be indicated by icons. For example, FIG. 9 depicts "Stage A" as being manually-activated as indicated by the circular icon containing a triangle. "Stage B" has an auto complete marker enabled, as indicated by the circular icon containing a square.

In accordance with an embodiment, gate transitions, either controlled with markers or occurring as defaults, can be gated with conditions that can also be configured with the stage property editor.

In accordance with an embodiment, such conditions can include enablement conditions, activation conditions, and/or termination conditions. Conditions can be based on an event (e.g., state of another part of the process) or based on data (e.g., a stage having a manually-activated marker can be configured with enablement conditions to define a trigger controlling transition of the stage from an available state to an enabled state. When the manually-activated marker is disabled, an activation condition can be configured to control transition of the stage from an available state to an active state. When an enablement or activation condition is configured, a notation icon can be displayed in conjunction with the stage. In FIG. 9, for example, "Stage B" is configured with an activation condition as indicated by the power symbol icon on the left side.

In accordance with an embodiment, a termination condition defines a condition, which causes termination of a stage without execution being complete. When set, the termination condition is denoted by the termination decorator (e.g., an octagonal icon), as illustrate, for example in FIG. 9.

Figure 10:
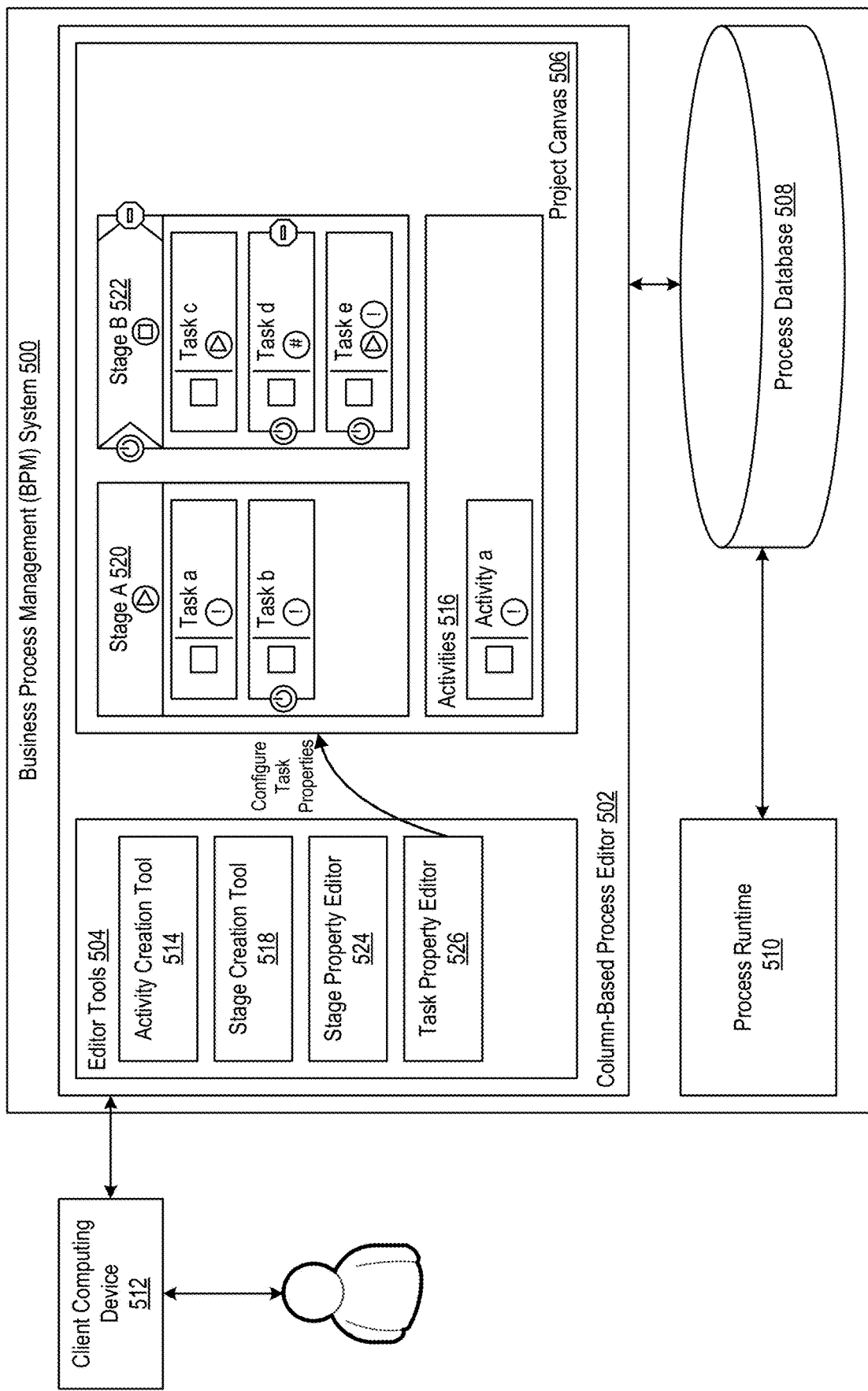
FIG. 10 further illustrates the use of a column-based process editor, in accordance with an embodiment.

FIG. 10 further illustrates the use of a column-based process editor, in accordance with an embodiment.

As illustrated in FIG. 10, in accordance with an embodiment, the editor tools includes a task property editor 526 for configuring properties, such as conditions, markers, roles, and other attributes (e.g., name and/or description) associated with tasks. The types of properties available are similar to those configurable on stages. In the example of FIG. 10, "Activity a"; and "Task a", "Task b", and "Task e" are configured to have a required marker enabled (e.g., denoted by the exclamation point). "Task b", "Task d", and "Task e" have activation conditions configured. "Task c" and "Task e" have manually-activated markers enabled. "Task d" is configured with a termination condition.

Figure 11:
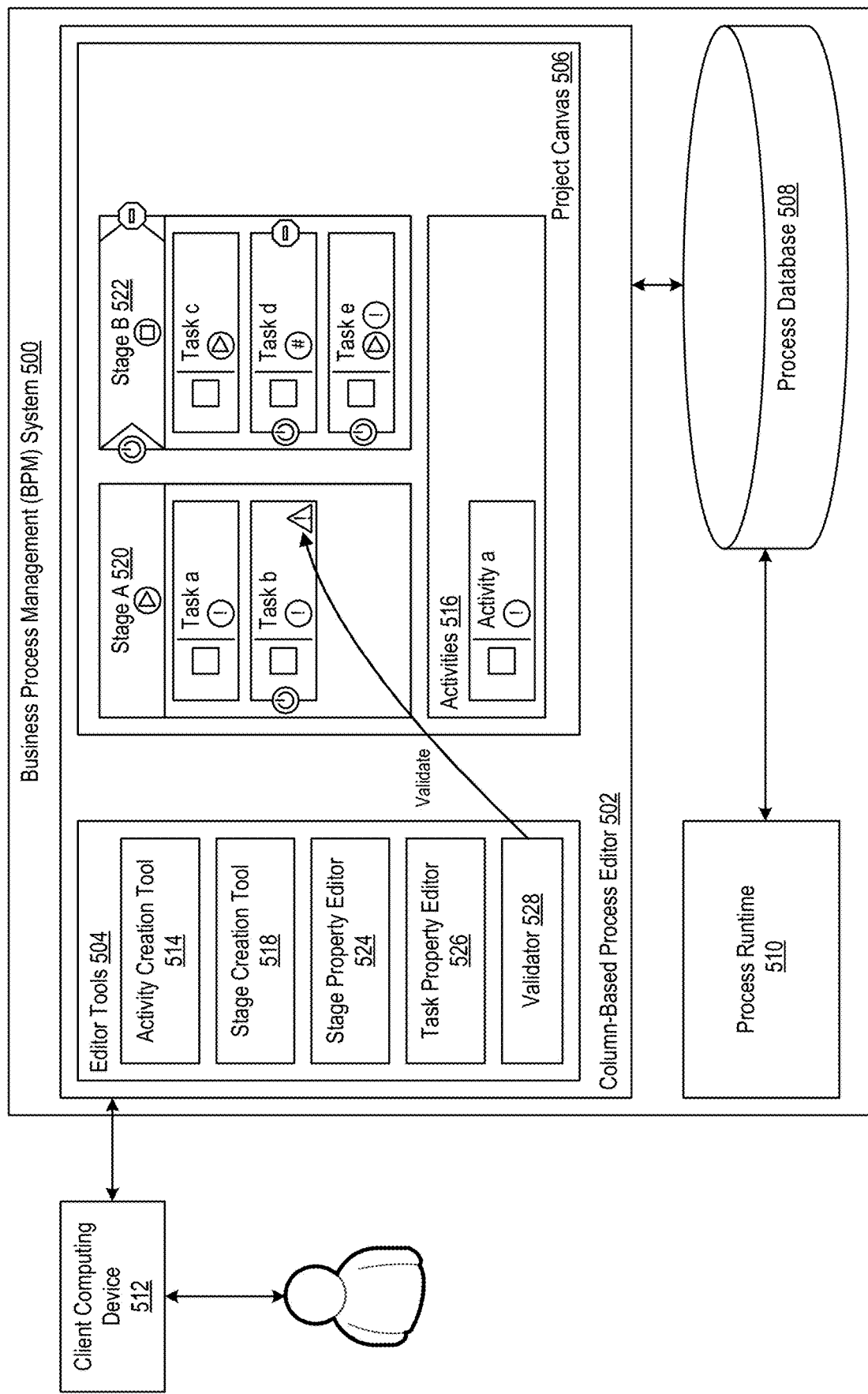
FIG. 11 further illustrates the use of a column-based process editor, in accordance with an embodiment.

FIG. 11 further illustrates the use of a column-based process editor, in accordance with an embodiment.

As illustrated in FIG. 11, in accordance with an embodiment, the column-based process editor can include a validator 528. The validator can evaluate properties for stages and tasks and identify warnings or errors based on configured properties. A notation icon can be displayed on the graphical representation of the dynamic process to indicate the presence of a validation warning or error, as illustrated in the example of FIG. 11. In accordance with an embodiment, interacting with the notation icon can invoke the appropriate editor tool to fix the property or properties associated with the validation concern.

Figure 12:
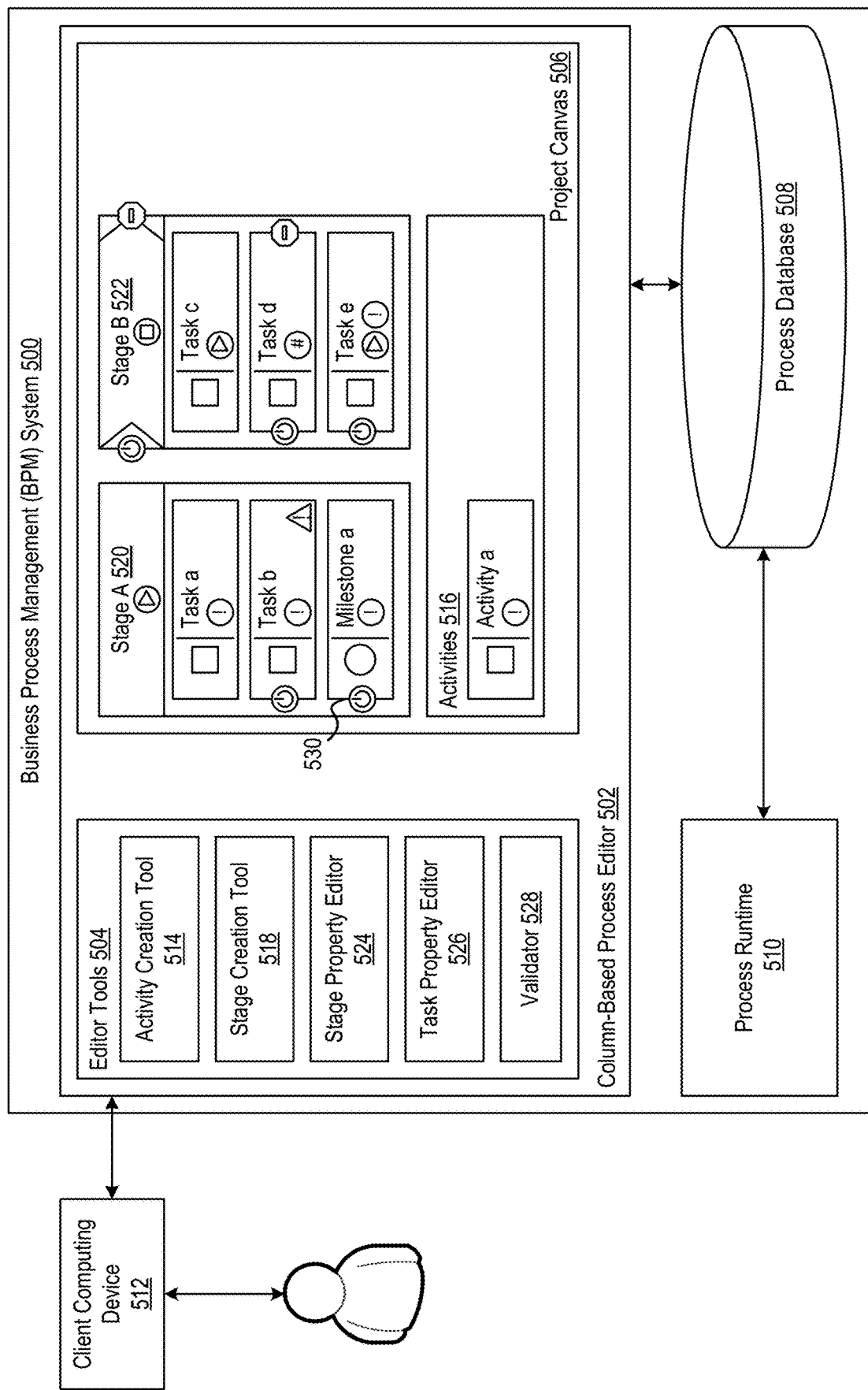
FIG. 12 further illustrates the use of a column-based process editor, in accordance with an embodiment.

FIG. 12 further illustrates the use of a column-based process editor, in accordance with an embodiment.

As described above, in accordance with an embodiment, a milestone can be a type of task. In accordance with an embodiment, FIG. 12 illustrates an example wherein "Milestone a" is added to "Stage A". Milestones, like tasks and stages, can be configured to enable markers and create activation conditions, such as activation condition 530. In an example, an activation condition defines conditions upon which the milestone is deemed reached.

Figure 13:
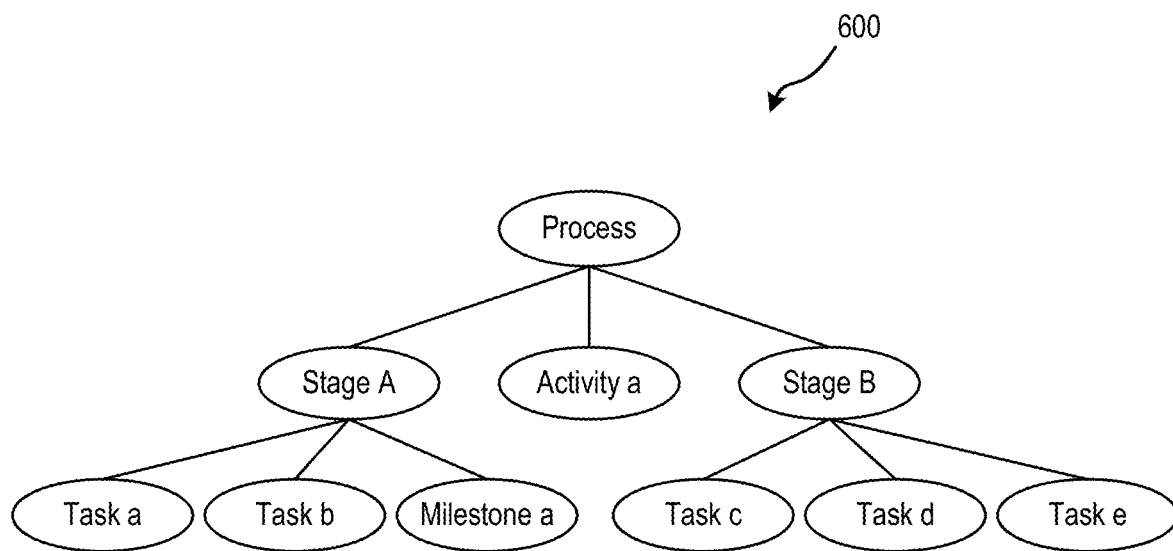
FIG. 13 illustrates an example process hierarchy for a dynamic process developed with a business process management system, using a column-based process editor, in accordance with an embodiment.

FIG. 13 illustrates an example process hierarchy 600 for a dynamic process developed with a business process management system, using a column-based process editor, in accordance with an embodiment.

In accordance with an embodiment, a process hierarchy defines a hierarchy of parts of a dynamic process such as stages and tasks. The process hierarchy can correspond to the dynamic process, for example as illustrated in FIG. 12.

In accordance with an embodiment, a process hierarchy can be represented as a tree where the root is the dynamic process. In the illustrated example, the first level children of the process are "Stage A", "Stage B", and 'Activity a" (described above as a global task). Tasks contained within a stage are children of the stage in the process hierarchy. Accordingly, "Task a", "Task b", and "Milestone a" are children of "Stage A". "Task c", "Task d", and "Task e" are children of "Stage B".

In accordance with an embodiment, the process hierarchy facilitates determining state transitions. For example, a state of a particular node of a process hierarchy depend on the state of its parents and/or the respective states of any children.

In a dynamic process, a role identifies and describes a process participant. A role, once created in the column-based process editor, can be assigned to a task. A role can be created at various levels relative to the process hierarchy. In general, roles cascade down from root to leaf. Accordingly, a role defined at the process level (e.g., root) is available in all stages and tasks. For example, a role define in "Stage A" may not be available in "Stage B" (and children thereof), but is available to "Task a" and "Task b".

Figure 14:
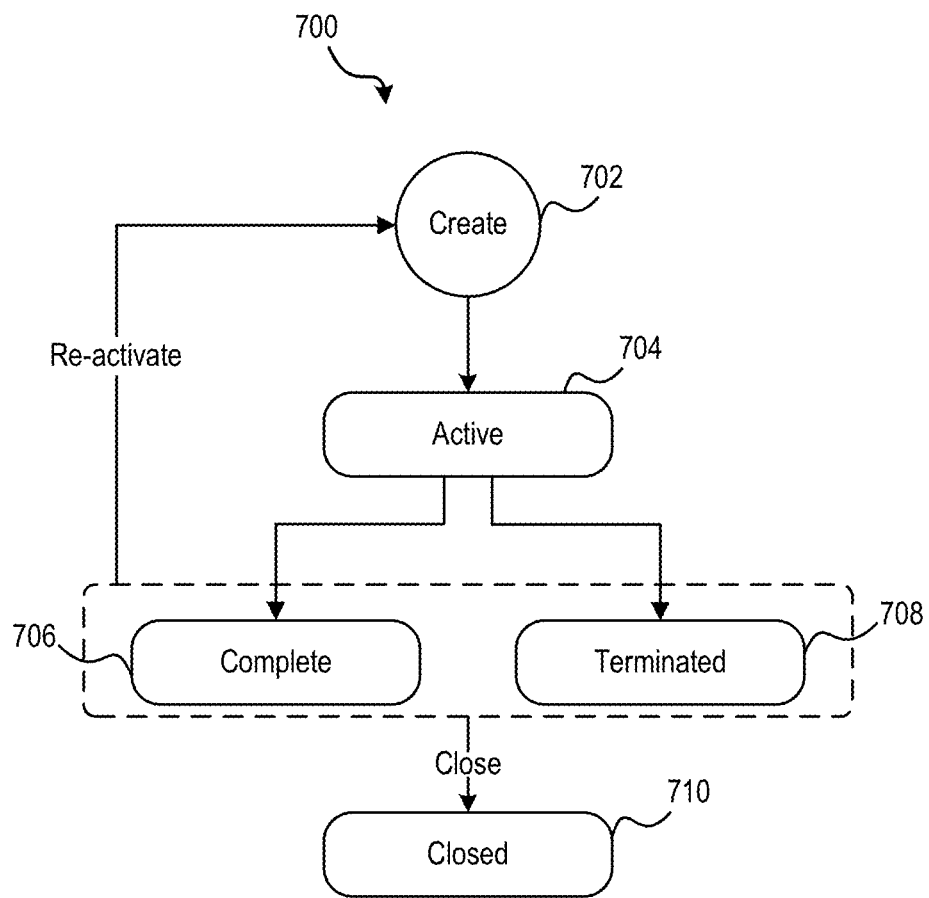
FIG. 14 illustrates an example state diagram associated with or representative of a dynamic process, as developed with a business process management system, in accordance with an embodiment.

FIG. 14 illustrates an example state diagram 700 of a dynamic process, as developed with a business process management system, in accordance with an embodiment.

As illustrated in FIG. 14, in accordance with an embodiment, a dynamic process is created or instantiated at 702 and transitions to an active state 704. In the active state, all stages and global activities within the dynamic process are also instantiated and enter an available state. From the active state, the process can transition into a complete state 706 or a terminated state 708. The process enters the terminated state when a termination condition, if defined, is fulfilled. The process can enter the complete state when all stage and activities contained therein are completed, terminated, or disabled. A completed or terminated process can be re-activated and return to the active state. The process can also transition to a closed state 710, which removes the process instance from the runtime.

In accordance with an embodiment, a graphical user interface as described above can be used in combination with a stage/task state machine for use in supporting dynamic processes, and enabling the use of the column-based dynamic editor. Upon creation, a stage/task can become available when an element it is contained in becomes active. A stage/task becomes enabled when any of its entry criteria is fulfilled. While an enabled task can prevent the containing stage from completion, disabling contained tasks is one way of making a stage completable. When a stage/task becomes active, its actual work can be performed. In order for a stage/task to become active, an active condition can be met, or, depending upon a marker, such as a manually-activated marker, the stage can be manually-activated, if the marker condition resolves to true, or automatically activated if it resolves to false. A system can fail to initiate, activate, or complete the stage/task. A completed transition can trigger when stages/tasks complete (e.g., when the work is completed). For a stage, such a transition can trigger when all contained stage/task are either completed, terminated, or disabled. An exit/termination can trigger when a stage/task exit criteria are met.

Figure 15:
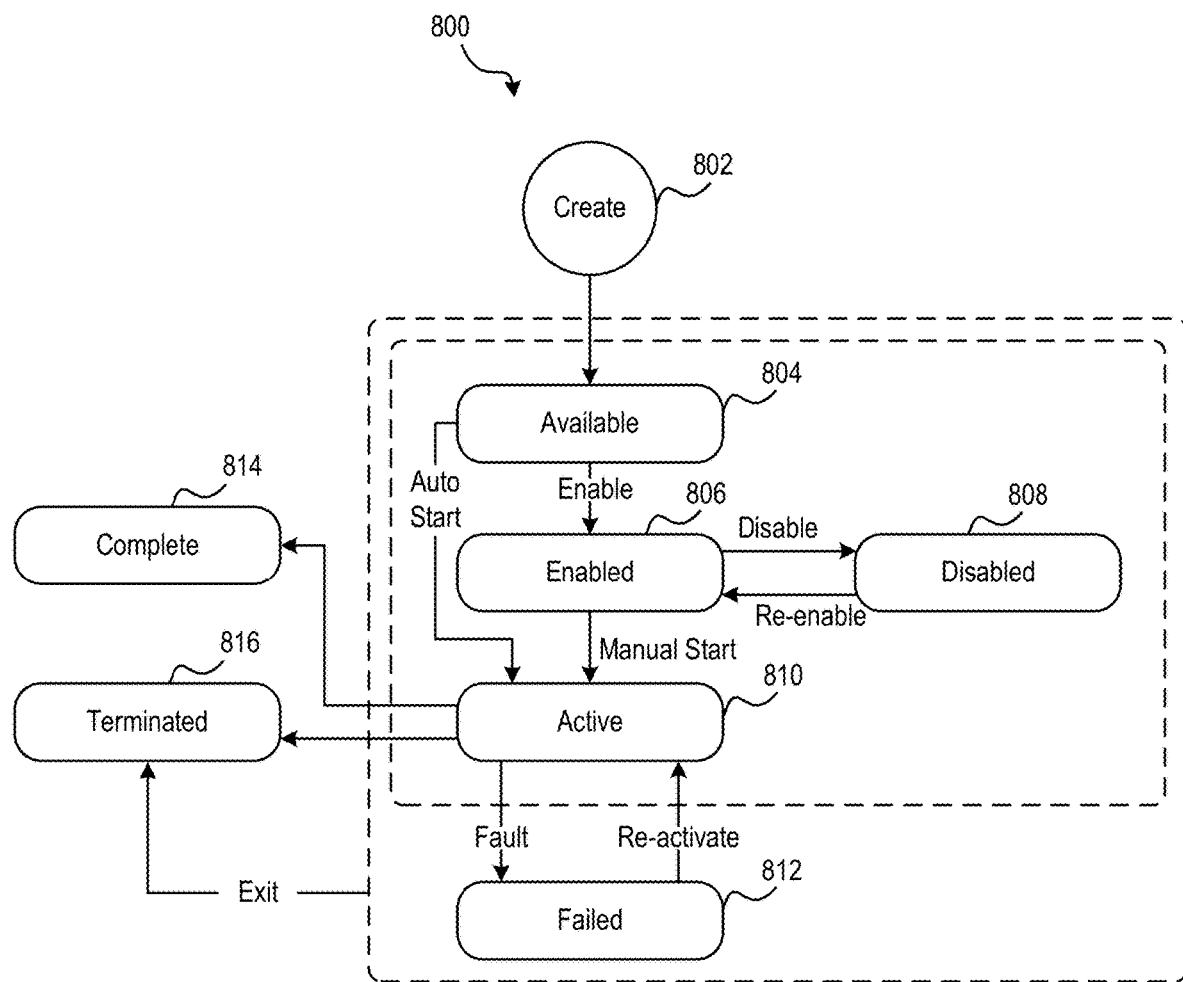
FIG. 15 illustrates an example state diagram associated with or representative of a stage or task of a dynamic process, as developed with a business process management system, in accordance with an embodiment.

FIG. 15 illustrates an example state diagram 800 of a stage or task of a dynamic process, as developed with a business process management system, in accordance with an embodiment.

As illustrated in FIG. 15, in accordance with an embodiment, a stage or task is instantiated or created at 802 and enters an available state 804. From the available state, the stage or task can enter an enabled state 806 when a manually-activated marker is configured. From the enabled state, a user can disable the stage or task so that it transitions to a disabled state 808, which will skip it execution in a process instance. The stage or task can be re-enabled to return to the enabled state. From the enabled state, the stage or task can be manually started thereby entering an active state 810. If the manually-activated marked is not configured, the stage or task can transition from the available state to the active state (subject to any activation conditions defined).

In accordance with an embodiment, from the active state, a fault causes a transition to a failed state 812. Recovery from the fault can return the stage or process to the active state. In the active state, execution of the stage or task occurs. Upon normal completion of the stage or task, a transition from the active state to a complete state 814 occurs. A task enters the complete state when execution has finished. A stage enters the complete station when all tasks contained within the stage are completed, terminated, or disabled. The stage or task can also transition to a terminated stage 816 when its termination condition is met or a parent (e.g., stage or process) is terminated. A terminated stage or task can be removed from the runtime.

Figure 16:
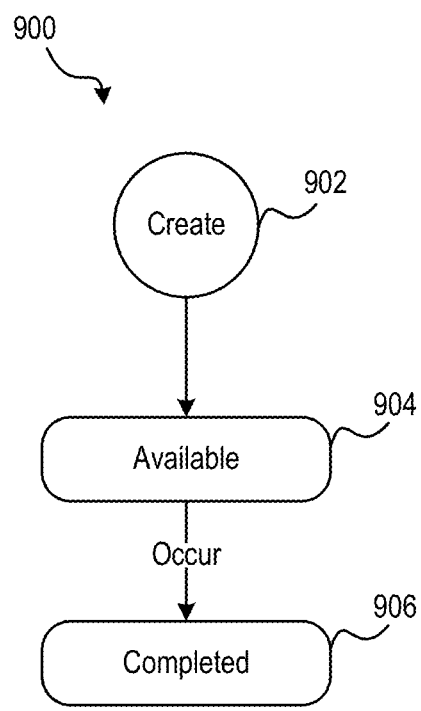
FIG. 16 illustrates an example state diagram associated with or representative of a milestone of a dynamic process, as developed with a business process management system, in accordance with an embodiment.

FIG. 16 illustrates an example state diagram 900 of a milestone of a dynamic process, as developed with a business process management system, in accordance with an embodiment.

As illustrated in FIG. 16, in accordance with an embodiment, a milestone is instantiated or created at 902 transitions to an available state 904. When the milestone is within a stage, the transition to the available state occurs when the stage becomes active. When the milestone is global, the transition to the available state occurs when the process is instantiated. From the available state, the milestone can transition to a completed state 906 when its completion condition is met.

Figure 17:
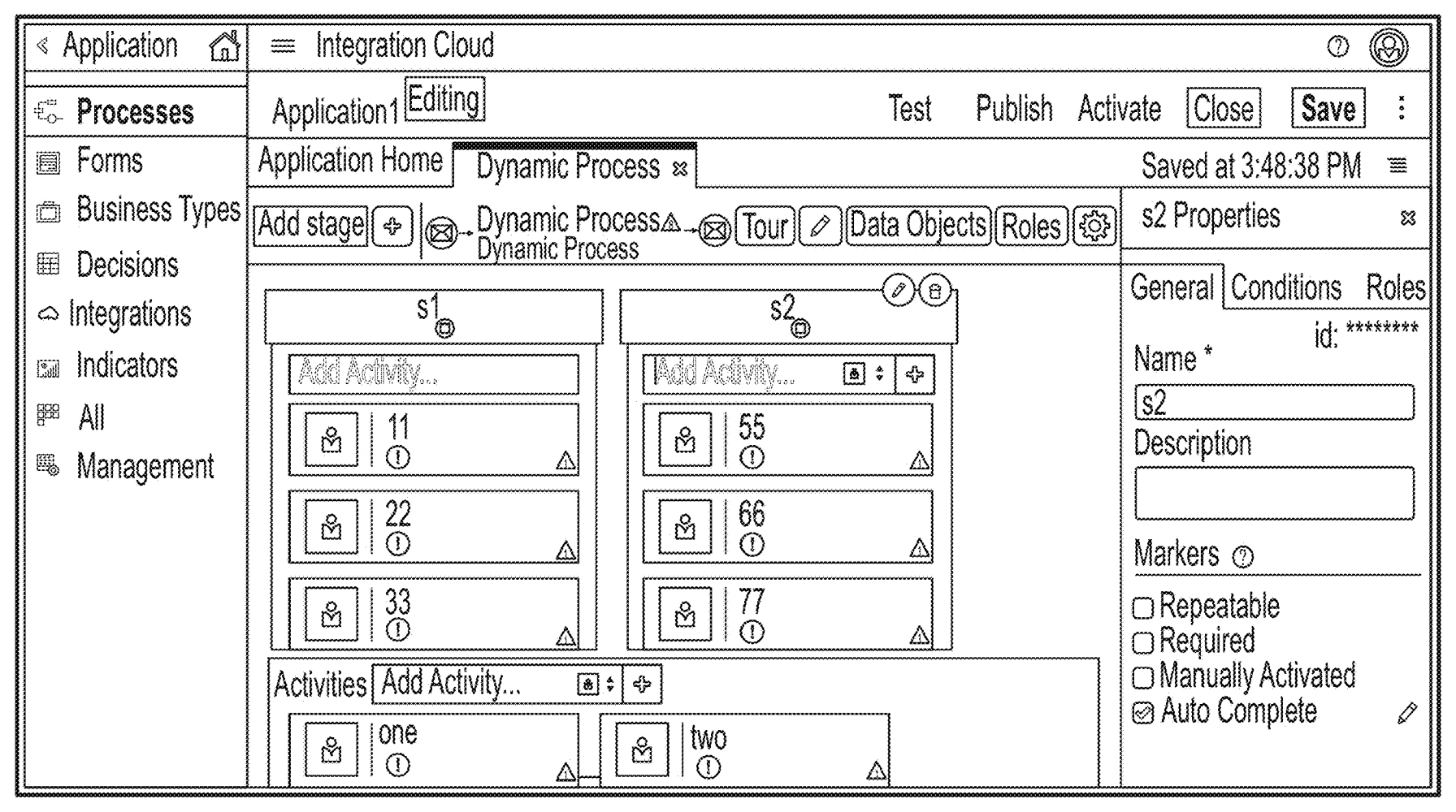
Figure 18:
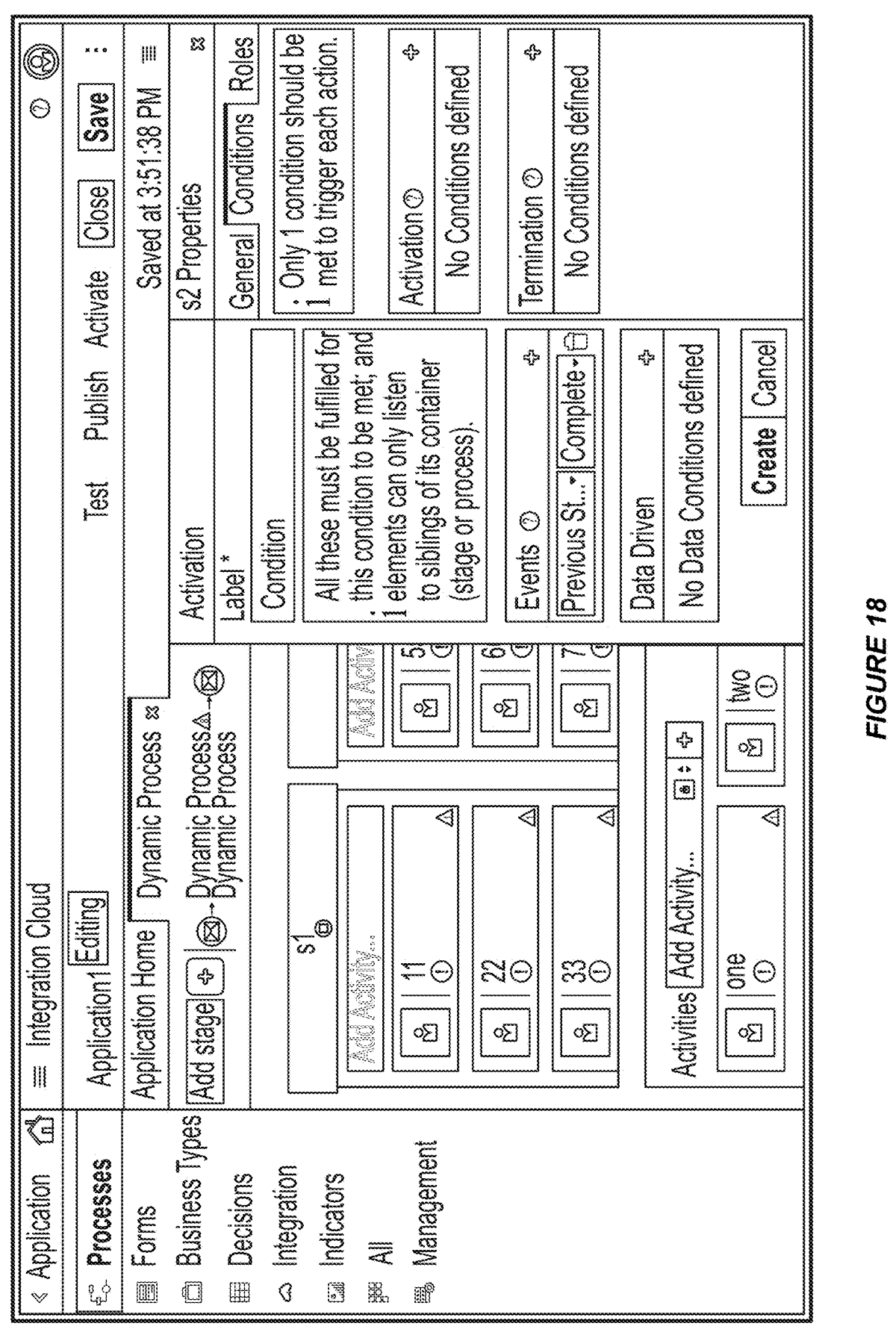
Figure 19:
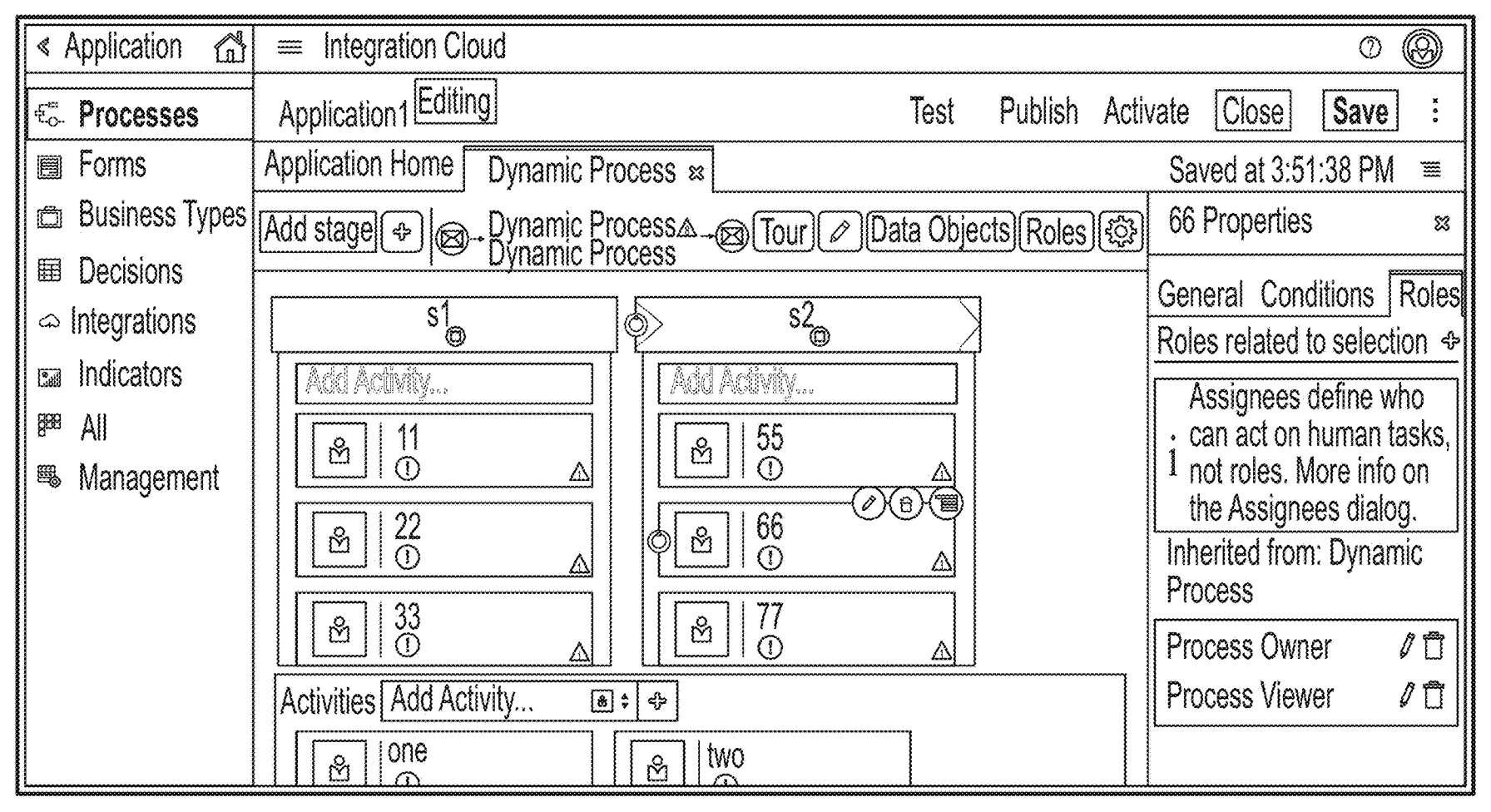

FIGS. 17-19 illustrate examples of a graphical user interface or screenshot of an example display of a column-based process editor, including a graphical representation of a dynamic process, in accordance with an embodiment.

As illustrated in FIGS. 17-19 in accordance with an embodiment, a business process management (BPM) system, such as Oracle Process Cloud Service, can include a business process editor that provides a graphical user interface, and represents stages of a business process as columns within the graphical user interface.

For example, in accordance with an embodiment and the illustrated example, the first stage of a business process can be represented by a column labeled "s1"; and the second stage of a business process can be represented by a column labeled "s2." Within the different stages, the system can display activities (e.g., "activity 11", "activity 22", "activity 33", "activity 55", or "activity 66"). The column-based process editor can include graphical indicators such as, for example:

A sequential stage marker, that can be activated when a previous stage has been completed or can be triggered by any event specified by the user;

An activation criteria marker, that includes a graphical indicator showing that a stage or activity is activated or enabled when an event specified by the user occurs; and/or A termination criteria marker, that includes a graphical indicator showing that a business process, stage, or activity is terminated when any event specified by the user occurs.

A conditions tab, when selected by a user, can provide an area for user activation of conditions. The conditions can specify a logic and/or rules that the system can apply to the stages and the activities within the various stages.

For example, an activation event could be applied, e.g., to the second stage labeled "s2".

As another example, an activation criteria marker can be added, such that the "s2" column now includes a proprietary activation criteria marker (in this example indicated by a power icon in the upper left area of the second stage column).

This, along with a graphical indicator (in this example, chevrons) at the top left and right corners of the column can be used to indicate, in this example, that a previous stage or activity must be completed before the second stage will activate.

A roles tab enables developers to define who can act on particular tasks.

The above are provided by way of example; in accordance with other embodiments the graphical user interface can include other types of tabs, icons, or other graphical indicators.

Figure 20:
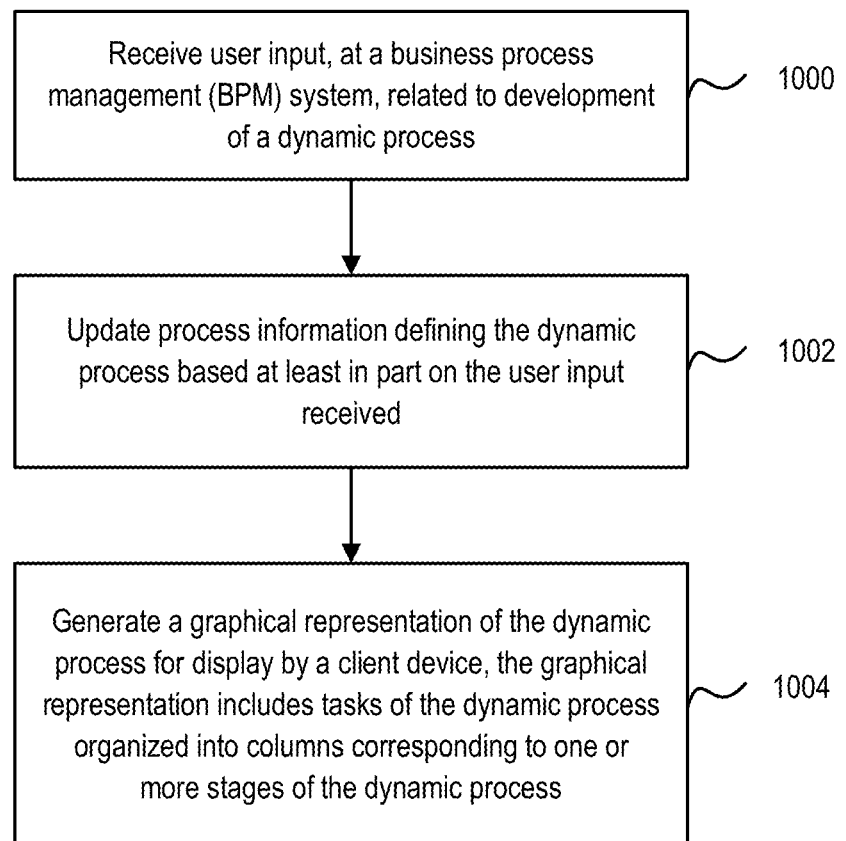
FIG. 20 is a flow chart of a process illustrating development of a dynamic process with a column-based process editor, for use with a business process management system, in accordance with an embodiment.

FIG. 20 is a flow chart of a process illustrating development of a dynamic process with a column-based process editor, for use with a business process management system, in accordance with an embodiment.

In accordance with an embodiment, the method illustrated in FIG. 20 can be implemented, for example, by a business process management system or process cloud service as described above.

As illustrated in FIG. 20, in accordance with an embodiment, at step 1000, user input is received at a business process management system. The user input is associated with development of a dynamic process. At step 1002, process information (e.g., stored in a process database of the business process management system), that defines the dynamic process, is updated based at least in part on the user input received. At step 1004, a graphical representation of the dynamic process is generated, for display by a client device.

Column-Based Process Editor Palette

In accordance with an embodiment, the system can include a column-based process editor palette that can expose implemented process components (such as connectors). This can provide assistance with discoverability of components, while simplifying the experience to business users, by hiding complexities of the implementation. Leveraging the ability to pre-load implemented components means the business process management system can provide ready-made components to be used as building blocks for user applications.

Figure 21:
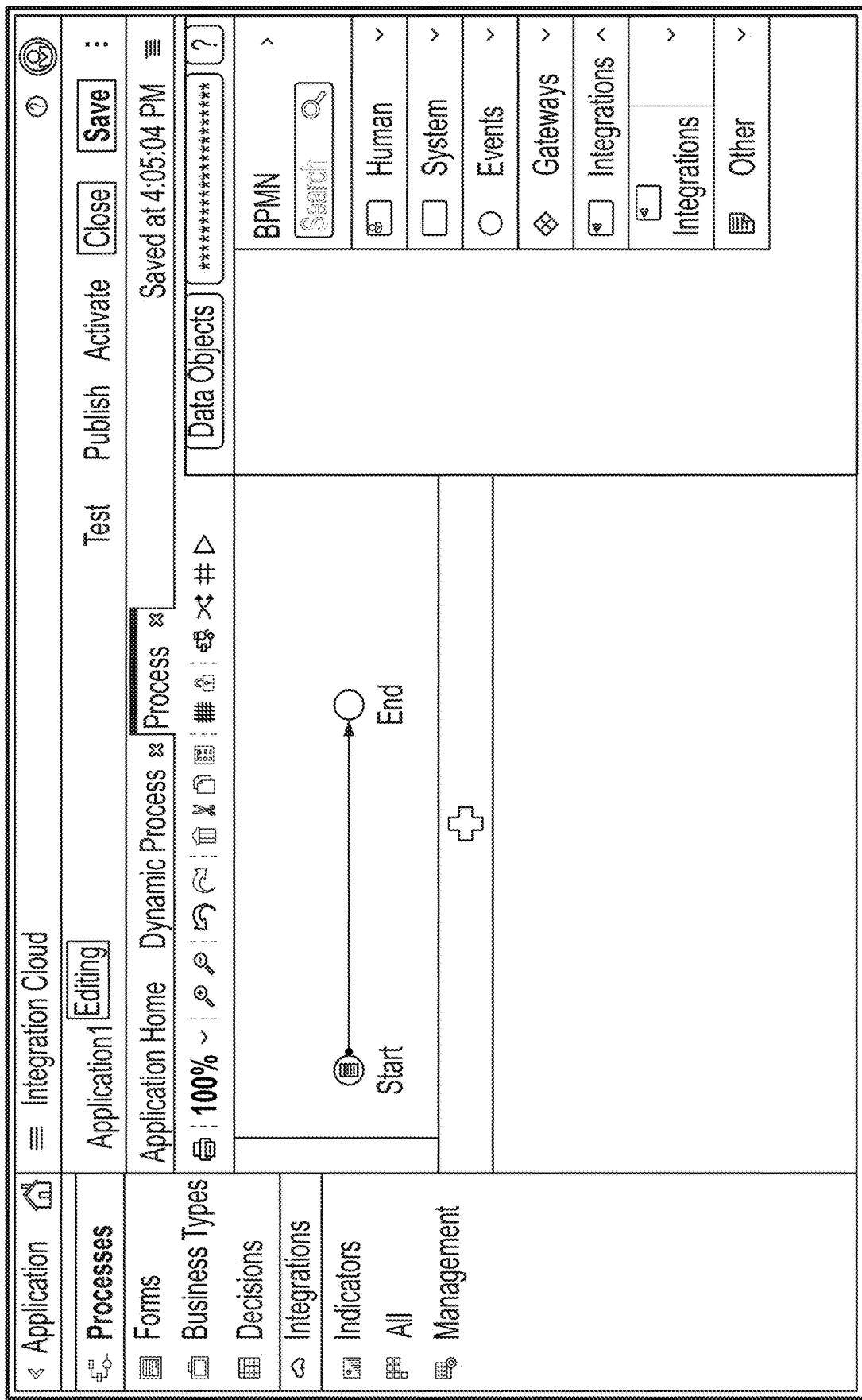
FIG. 21 illustrates an example of a process editor, including a dynamic editor palette, in accordance with an embodiment.

FIG. 21 illustrates an example of a process editor, including a dynamic editor palette, in accordance with an embodiment.

As illustrated in FIG. 21, in accordance with an embodiment, the process editor can include a canvas on which the process is visually laid out, and a column-based process editor palette (outlined).

In accordance with an embodiment, the business process management system can build the column-based process editor palette based on the type of process that is indicated in the process editor. For example, if the process will include an integration with a third party service (e.g., a web service), and connectors (generally referred to as "integrations" in the process editor) have been defined, then the business process management system can dynamically build the palette to include the defined connectors, or integrations, in the palette. This enables a user of the business process management system to intuitively drag-and-drop the integration onto the canvas, to include the integration in the process.

Figure 22:
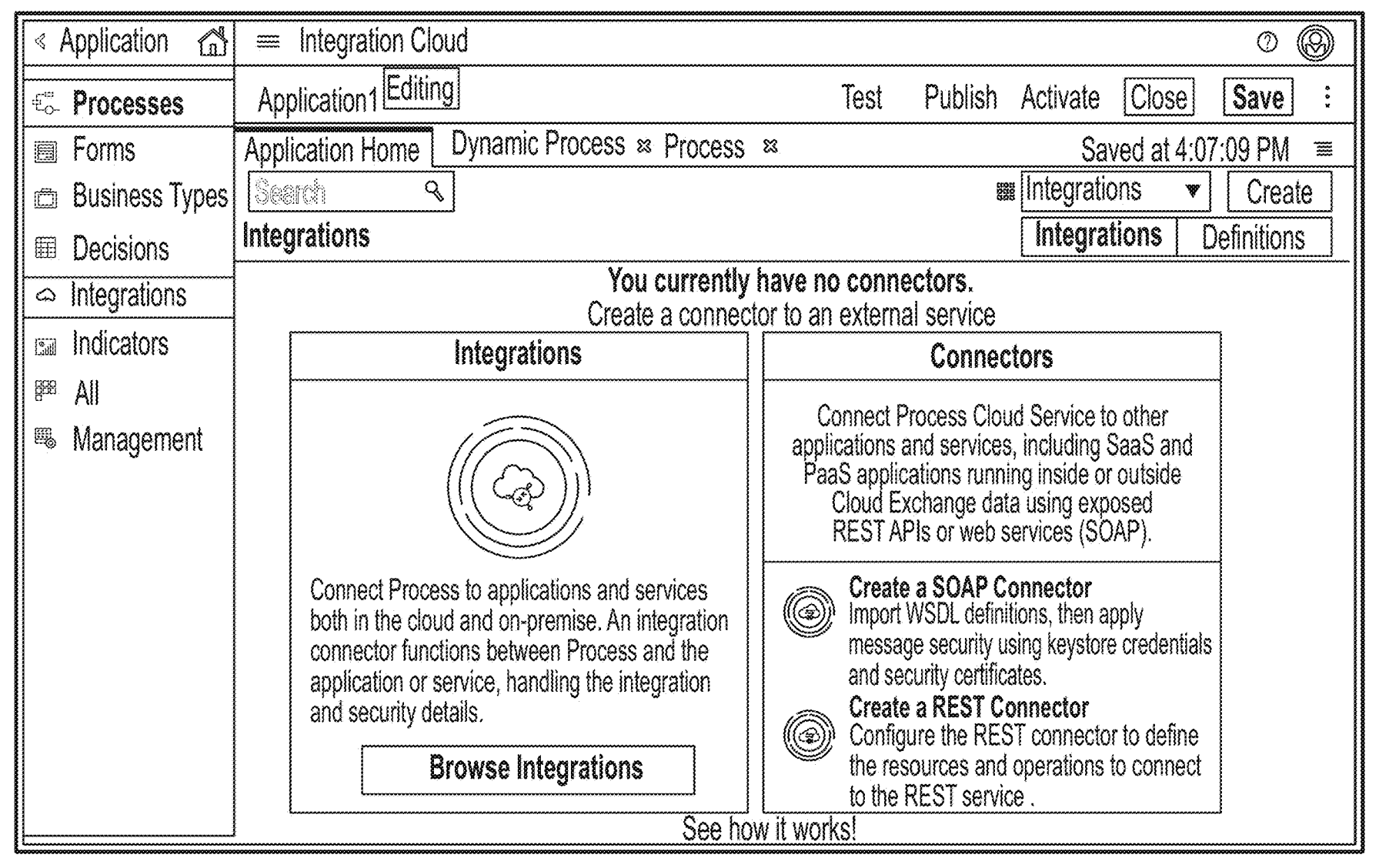

FIG. 22 illustrates an integration development user interface, in accordance with an embodiment.

As illustrated in FIG. 22, in accordance with an embodiment, different integrations and connections can be configured with third party services. The business process management system can include such integrations in a dynamic palette when the system determines that the process being developed may require one or more integrations.

Figure 23:
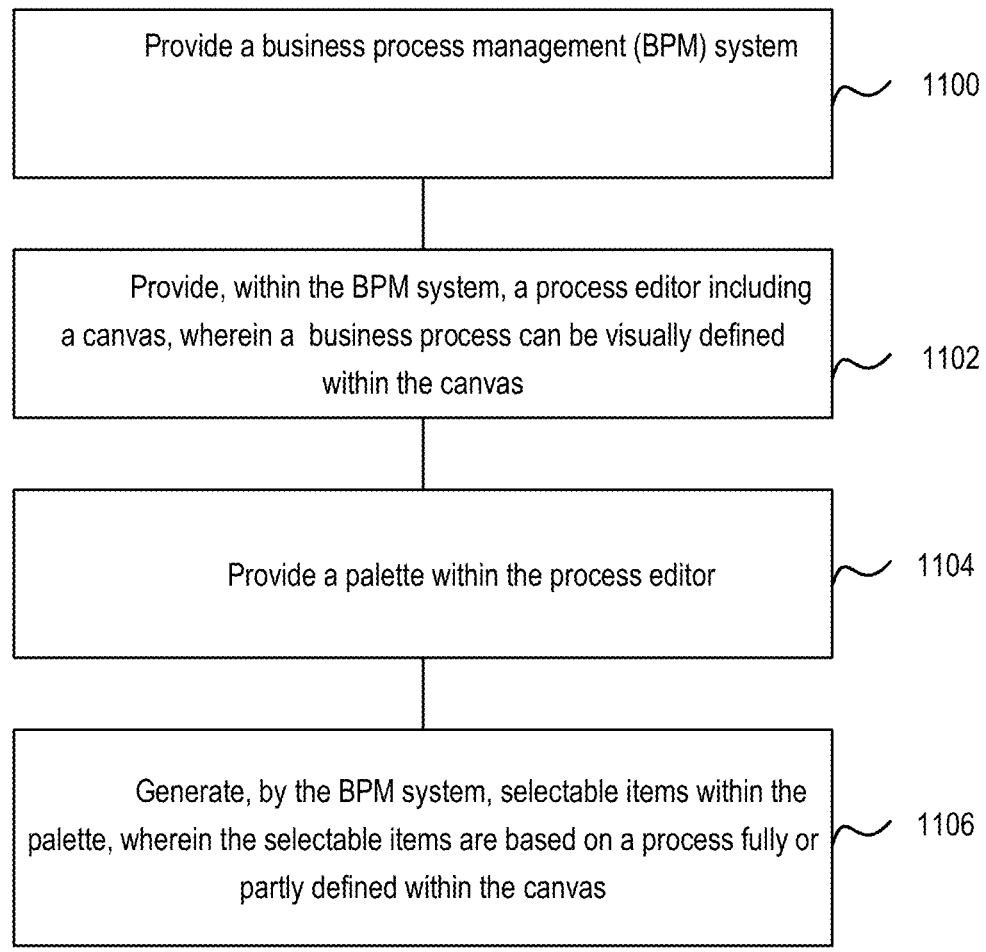
FIG. 23 is a flow chart of a process for providing a column-based process editor palette in a business process management environment, in accordance with an embodiment.

FIG. 23 is a flow chart of a process for providing a column-based process editor palette in a business process management environment, in accordance with an embodiment.

As illustrated in FIG. 23, in accordance with an embodiment, a first step 1100 includes providing a business process management system. A next step 1102 includes providing, within the business process management system, a process editor, including a canvas, wherein a business process can be visually defined within the canvas. A next step 1104 includes providing a palette within the process editor. A next step 1106 includes generating, by the business process management system, selectable items within the palette, wherein the selectable items are based on a process fully or partly defined within the canvas.

Forms (Web Forms)

In accordance with an embodiment, forms can be used to define the user interface that enables end users to interact with a particular business process application. This enables process analysts to design the way users interact with a business process, and also define the underlying data structure required by the application.

In accordance with an embodiment, forms can be based on standards, including XHTML, CSS, and JavaScript, which ensures compatibility across multiple platforms and browsers. At a basic level, a form can be, for example, an XHTML file. However, an example business process management systems can include a form designer that enables creation and design of a form without interacting directly with the XHTML code. Further, the form editor can facilitate customizations to the appearance and behavior of forms.

FIG. 24 illustrates an example form designer of a business process management system, in accordance with an embodiment.

As illustrated in FIG. 24, in accordance with an embodiment, the form designer can enable such design activities as adding basic form controls to a basic form; customizing the appearance and layout of a form; or creating form rules that define the behavior of the controls on a basic form.

In accordance with an embodiment, the basic designer can be displayed as a tabbed pane within the business process management system. For example the form designer tab can be provided as a child tab under a home area for the parent process application being designed. The forms designer can be divided into several areas, each area including a function that facilitates form design. The form designer areas can include, e.g., a forms component palette; a forms toolbar, a forms canvas, a properties editor, and a data source area.

In accordance with an embodiment, the component palette can contain the controls a user can add to the form to define how a user interacts with the process application. Form controls can be added to a form, e.g., by dragging the control from the palette to the form canvas. In an example form designer, controls can be dragged-and-dropped above, below, to the left, and to the right of most existing controls that have been previously placed on the form canvas. If no previous controls have been added to the form designer canvas, then a control can automatically be placed at the top of the form canvas.

FIG. 25 illustrates an example of a properties editor, in accordance with an embodiment.

As illustrated in FIG. 25, an example property editor enables a user to define the properties of a form or form control. When a control in a form is activated, e.g., by clicking the form, the properties area can display the properties of the control so they can be viewed and edited. The properties editor can include tabbed panes that display the properties of the form or form control grouped by function.

FIG. 26 illustrates an example of a data source pane, in accordance with an embodiment.

As illustrated in FIG. 26, in accordance with an embodiment, a data source pane can display the list of data elements that can be incorporated into a form. From the data source pane, a user can generate basic form controls based on all the data elements in a business object, or the user can generate form controls based on specific data elements.

In accordance with an embodiment, a form designer of a business process management system can include one or more controls that can be added to (e.g., dragged-and-dropped onto) a form canvas: Input Control Fields, Selection Control Fields, Group Controls.

In accordance with an embodiment, input controls enable users enter data (text, dates, numbers, and so on) into a form. Input controls can also automatically prevent users from entering the wrong data types. For example, if a user enters letters into a number control, the form can display a warning or error message. Such validation can be configured to happen automatically.

In accordance with an embodiment, the various types of user controls can be included in a form designer of a business process management system. For example, a form designer can include a text control that lets users enter text and is primarily intended for short, one-line entries; a TextArea control that lets users enter any text and is designed for longer, multi-line submissions; a date control that lets users enter information such as a date, time or date plus time (depending on the specifics of the date control); an email form control that lets users enter a valid Email address; a money form control that lets users enter money amounts in, e.g., U.S. currency denominations; and a phone form control that lets users enter a phone number using a defined format. The examples above are meant to be illustrative and not limiting of the types of input controls available in a form designer.

In accordance with an embodiment, selection controls enable users to select from a list of several options. Selection controls include, but are not limited to: drop down boxes; radio buttons; multiple-choice check boxes; true or false (Boolean) check boxes.

In accordance with an embodiment, group controls enable a designer to group other controls (e.g., selection controls and input controls) to organize forms based on the types of information required by the grouped controls. Group controls can include: form sections; tabs; panels; tables; and/or repeats.

Easy Web Forms

In accordance with an embodiment, a form designer of a business process management system can be arranged to enable intuitive adding and manipulation of the controls used in the form.

Figure 27:
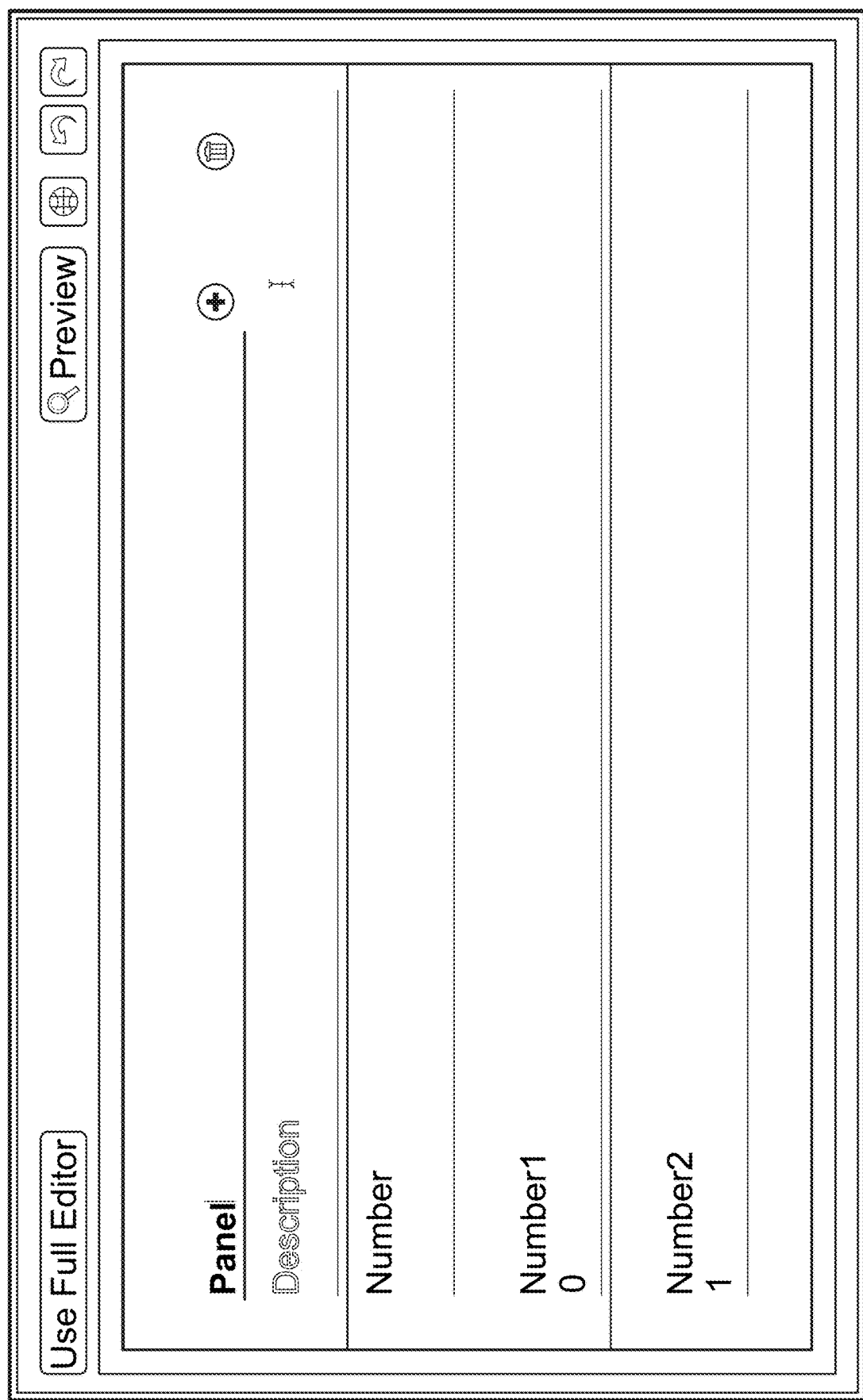
FIG. 27 illustrates an example of a form designer of a business process management system that includes interactive controls on the form designer canvas for adding other conventional controls to the form designer canvas, in accordance with an embodiment.

FIG. 27 illustrates an example of a form designer of a business process management system that includes interactive controls on the form designer canvas for adding other conventional controls to the form designer canvas, in accordance with an embodiment.

For example, in accordance with an embodiment, the form designer depicted includes an addition button that enables a designer to choose the form control to be added to the form. The depicted form designer also includes a delete button that enables the designer to remove the control from the canvas. Further, the depicted form designer includes editable fields on the added control to add, e.g., a description.

Figure 28:
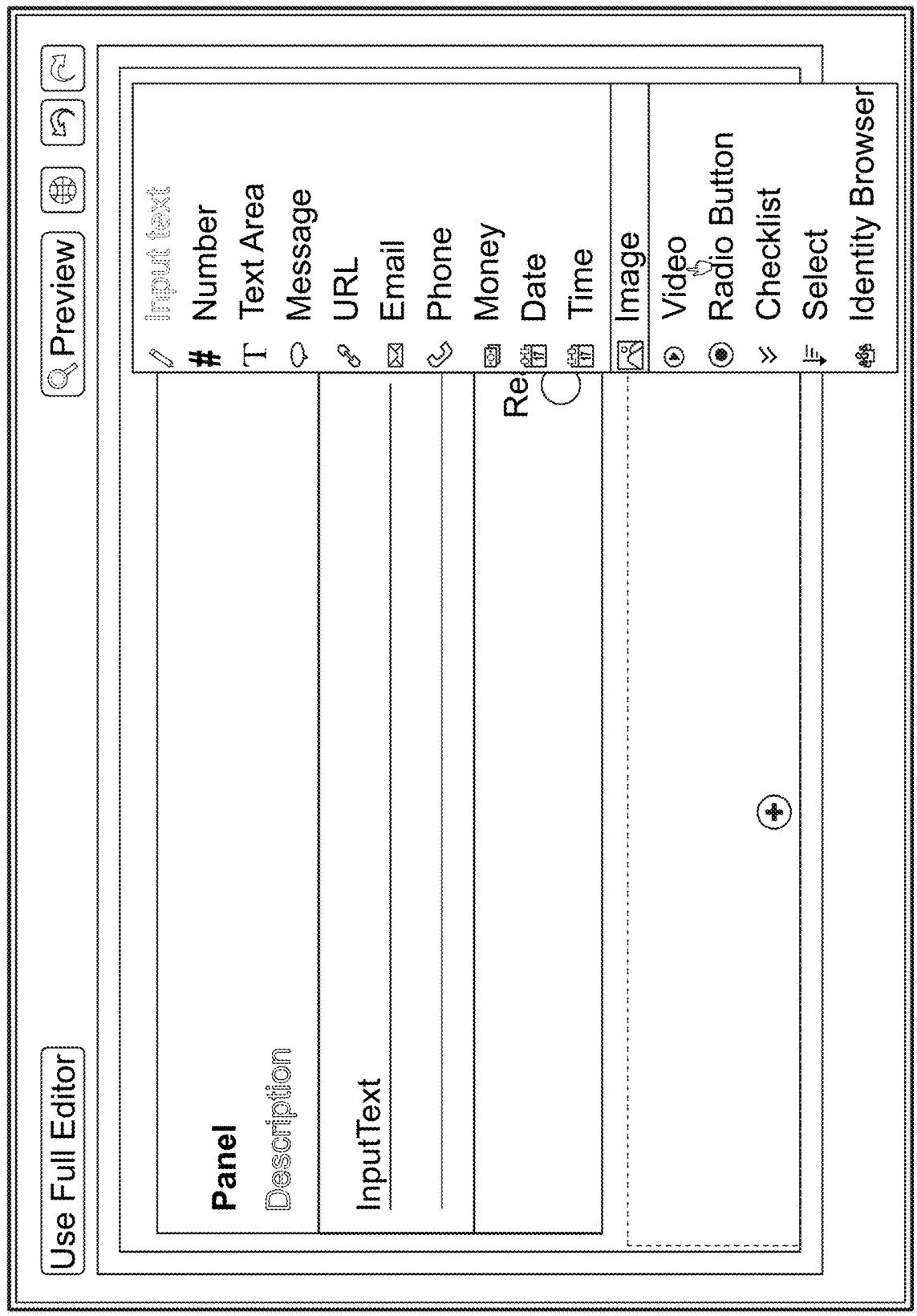
FIG. 28 illustrates an example of a form designer including a control type selector, in accordance with an embodiment.

FIG. 28 illustrates an example of a form designer including a control type selector, in accordance with an embodiment.

As illustrated in FIG. 28, in accordance with an embodiment, when the addition button is activated by a designer (indicating a request to add a control to the form), a control type selector is displayed. The control type selector enables the designer to select the type of control to add to the form being developed. For example, as illustrated in FIG. 28, a text input control has been added to the form by selecting the text area input control from the displayed control type selector.

Figure 29:
FIG. 29 illustrates an example of a form designer including property controls, in accordance with an embodiment.

FIG. 29 illustrates an example of a form designer including property controls, in accordance with an embodiment.

As illustrated in FIG. 29, in accordance with an embodiment, after a control type has been selected and added to the form designer canvas, a number of property controls can be provided on the selected control itself. These property controls can be used to set the properties of the selected control type. For example, the number input control depicted in FIG. 29 can include a minimum and a maximum value, a read-only toggle, and a required toggle. When activated by a user, these secondary controls can adjust or set the properties of the selected control.

In accordance with an embodiment, property controls that have been identified as the most commonly used controls can be included on the selected control, itself. However, the property controls are not limited to those depicted, but can include the properties of the controls listed above, and any properties of any controls, in accordance with an embodiment.

In accordance with an embodiment, a preview button can enable a render function of the business process management system. The render function can render the form being developed in a number of different devices and formats. For example, the render function can show a rendering of the form on a mobile device, on a tablet, from within a browser.

In accordance with an embodiment, a "Use Full Editor" button can change the user interface of the form designer back to a conventional form designer user interface (for example, the form designer illustrated in FIG. 24).

Web Form Multi-Presentation

In accordance with an embodiment, the system can support web form multi-presentation. Sometimes responsive user interfaces are not enough for different screen devices, or the target persona is so different, or the logic to maintain dynamic behavior is complex and difficult to maintain. In such situations, web form multi-presentations can be useful.

In accordance with an embodiment, the system provides the ability of defining multiple user interfaces (presentations) for the same form (data). The user interface presentation can be selected based on device, data, or be static. The presentations can be mixed-and-matched to create maintainable and scalable forms by fostering composition. The systems and methods also allow for importing form presentations as a reference, or copy the form by attaching the controls directly to the form, to enable both reusability and customization.

Figure 30:
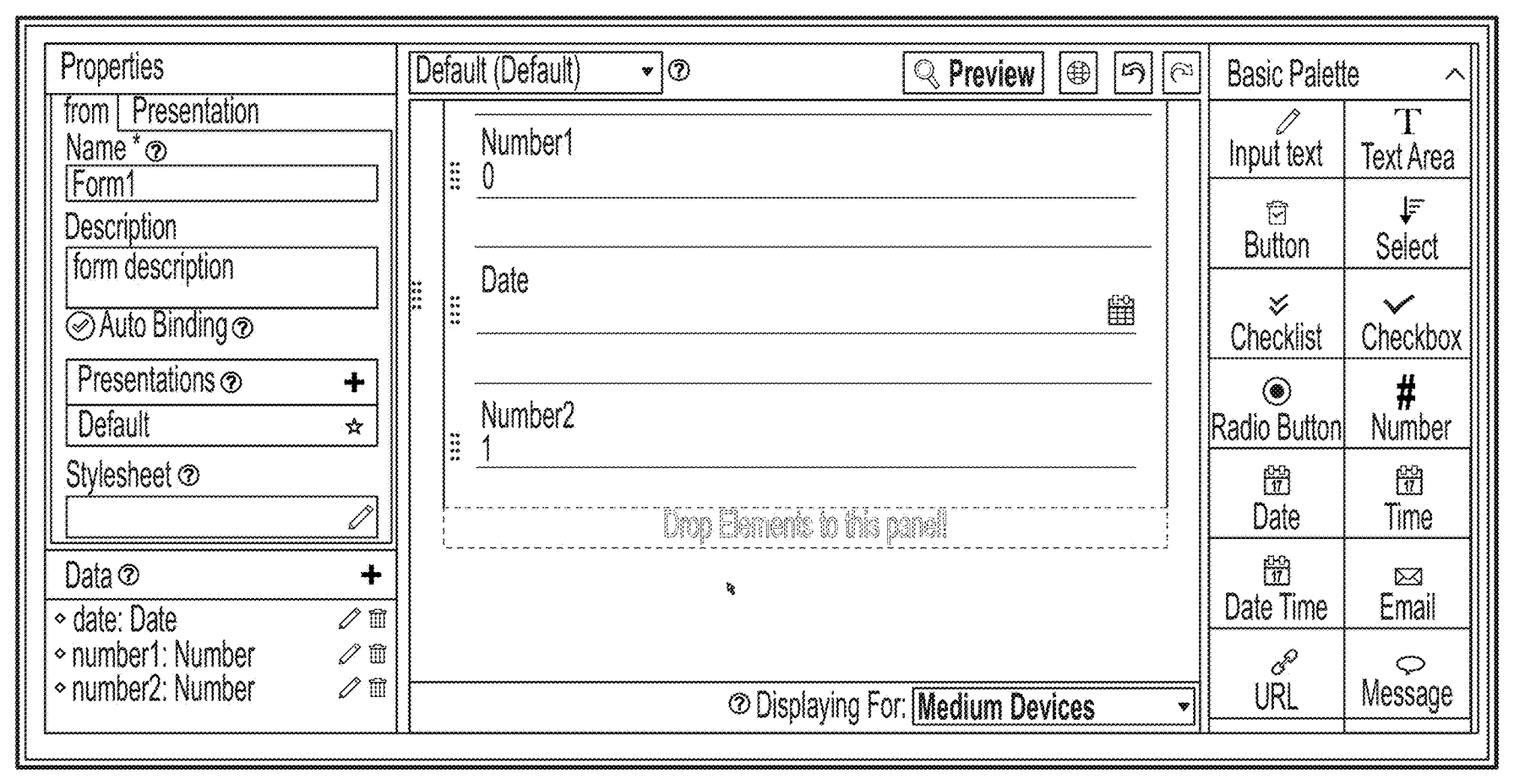

FIG. 30 illustrates an example of a form designer with an example form, in accordance with an embodiment.

As illustrated in FIG. 30, in accordance with an embodiment, the form comprises a number, a date, and/or another number. The system enables the creation of a different user interface based upon the form. For example, the form can represent a form where users can input data.

Figure 31:
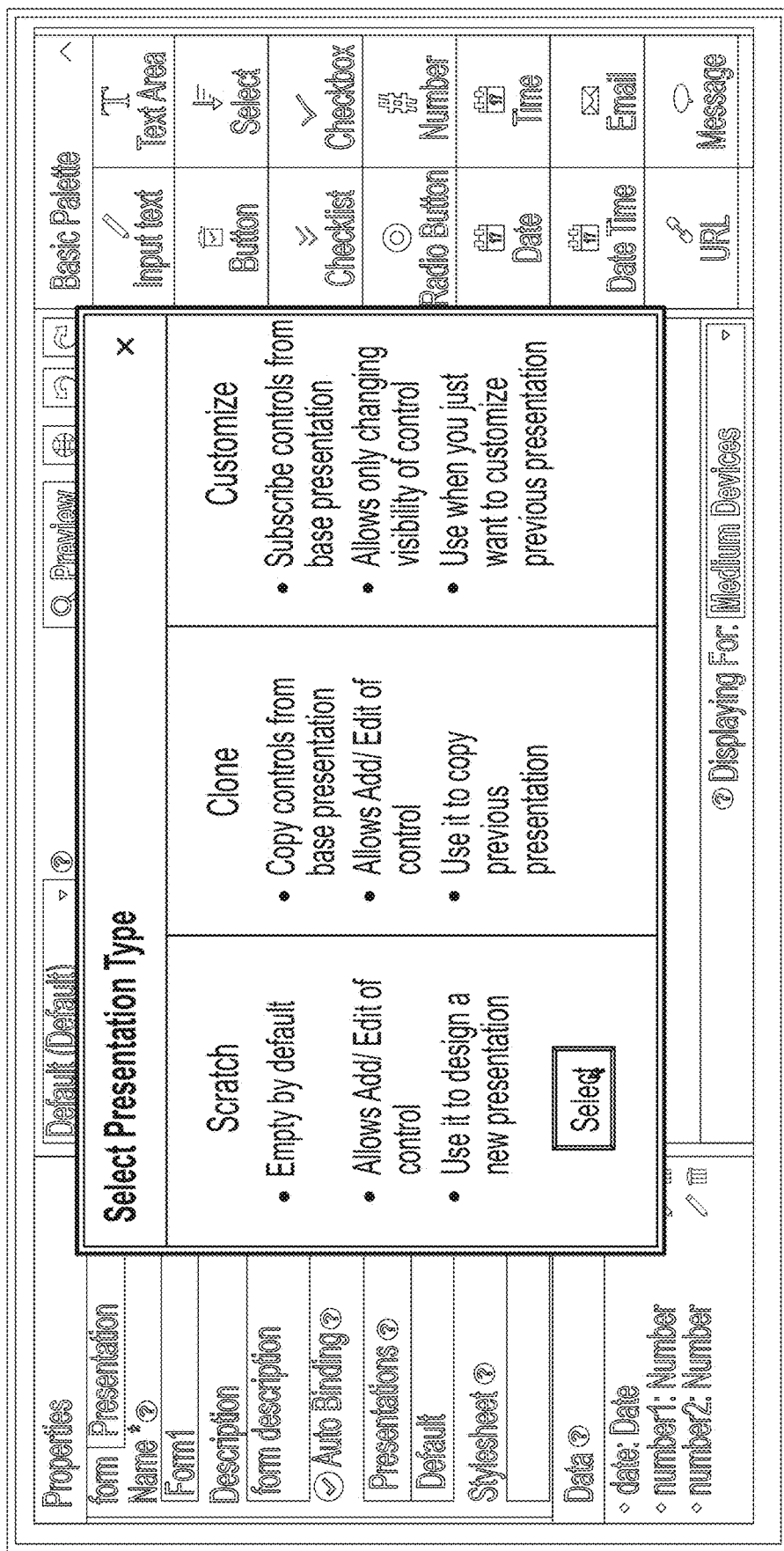
FIG. 31 illustrates an interface for use in web form multi-presentation, in accordance with an embodiment.

FIG. 31 illustrates an interface for use in web form multi-presentation, in accordance with an embodiment.

As illustrated in FIG. 31, in accordance with an embodiment, the systems and methods can support the creation of a plurality of presentations for the web form. In the depicted embodiment, the additional presentation can be created for a reviewer.

Figure 32:
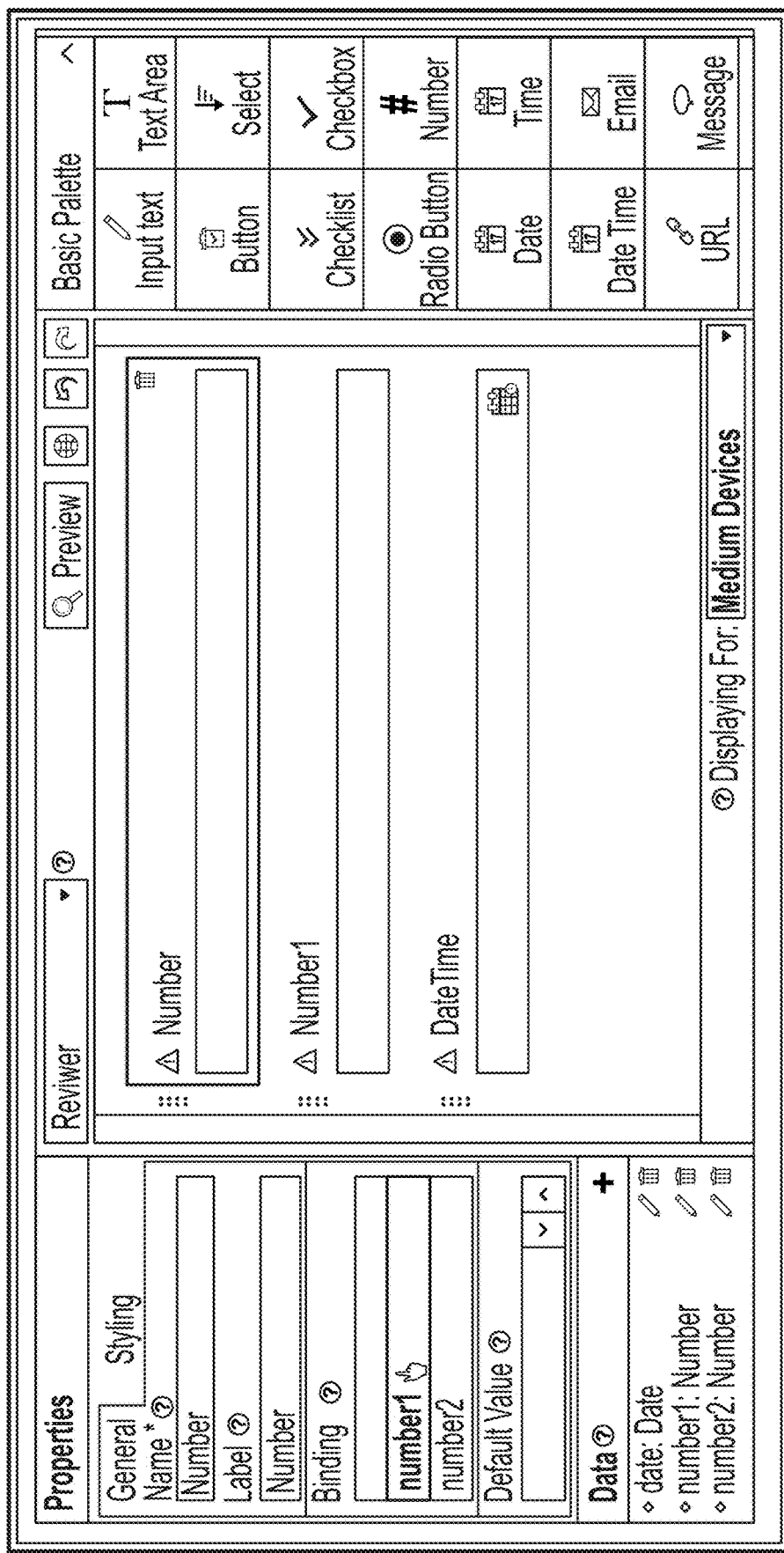
FIG. 32 further illustrates an interface for use in web form multi-presentation, in accordance with an embodiment.

FIG. 32 further illustrates an interface for use in web form multi-presentation, in accordance with an embodiment.

As illustrated in FIG. 32, in accordance with an embodiment, the creation panel for the additional presentation of the web form illustrates the additional presentation having two numbers and the date, but in a different order than that of the parent web form (of FIG. 30). The multi-presentation of the web form can support drag-and-drop functionality, as well as bindings of the new presentation to the data associated with the original web form (for example, of FIG. 30). This is illustrated in the left column of the interface where the number values in the display can be bound to "number1" and "number2" of the original web form.

Figure 33:
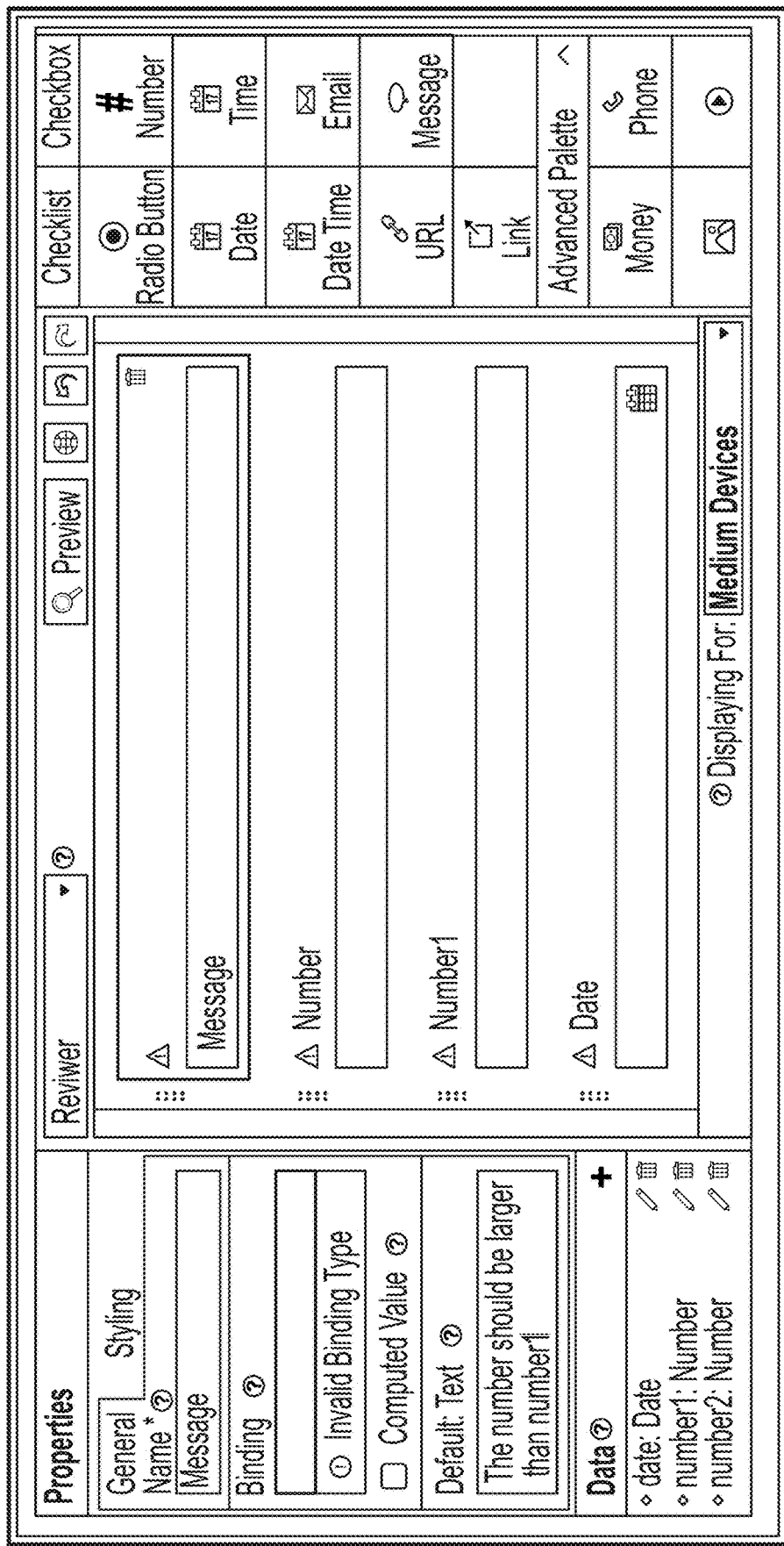
FIG. 33 further illustrates an interface for use in web form multi-presentation, in accordance with an embodiment.

FIG. 33 further illustrates an interface for use in web form multi-presentation, in accordance with an embodiment.

As illustrated in FIG. 33, in accordance with an embodiment, the creation panel for the additional presentation of the web form (for example, of FIG. 30) illustrates that additional information can be added to the additional presentation for the web form. In the depicted embodiment, the additional information comprises a message indicating that the number should be larger than "number1".

In accordance with an embodiment, the multiple presentations for web forms can be utilized by, for example, different users for different purposes. For example, in the depicted embodiment, the first presentation for the web form can be used by a user form data input, while the additional presentation can be utilized by a reviewer to review the data entered by the first user. In such embodiments, restrictions can be applied to certain presentations, such as the reviewer's presentation being restricted to read only so that the reviewer does not accidentally alter the data inputted in the first presentation.

Web Form Event-Based Declarative Rules Editor

In accordance with an embodiment, a form designer of a business process management system can be arranged to enable a user of the form designer to apply rules and/or logic to form controls.

Figure 34:
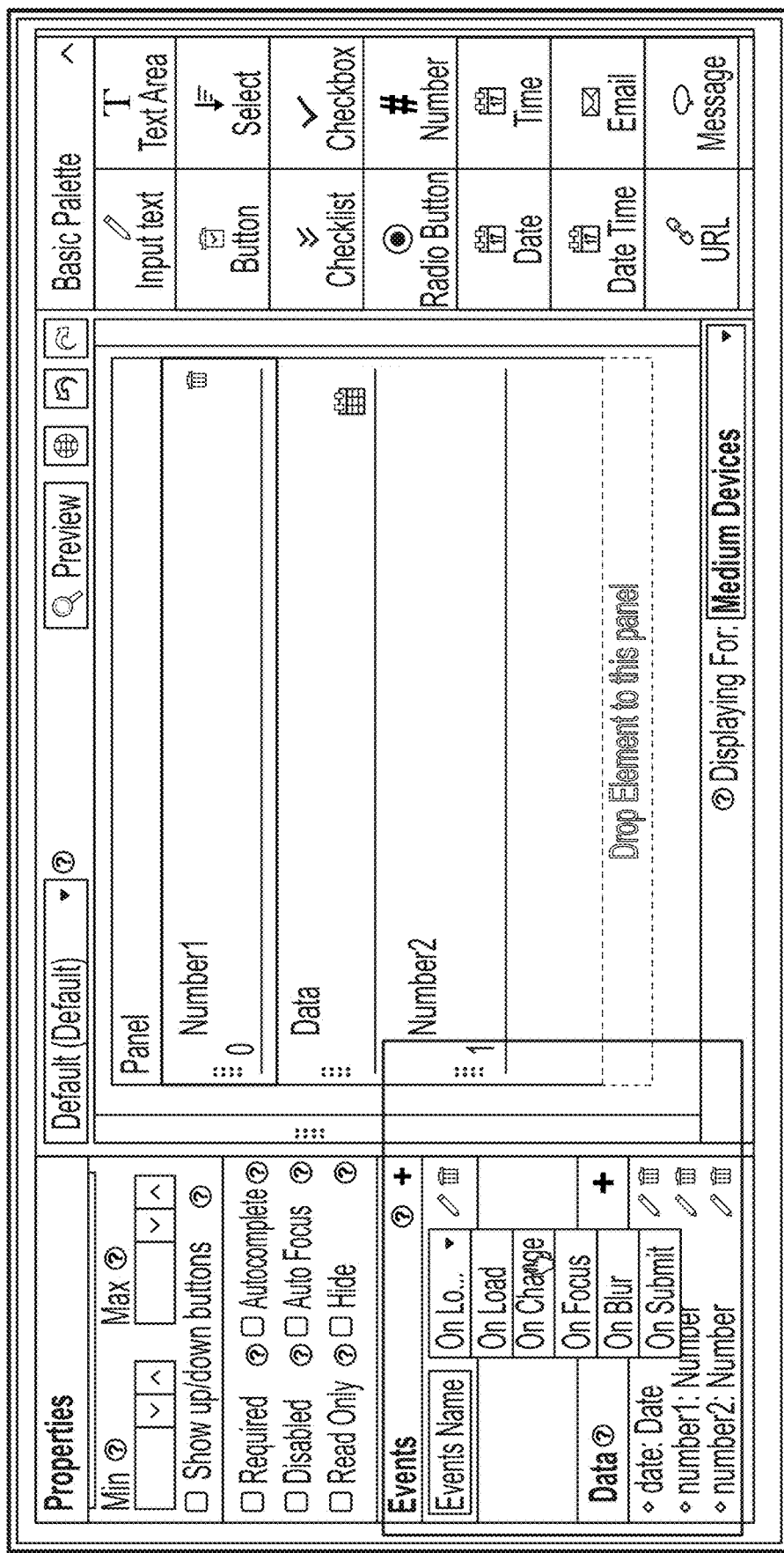
FIG. 34 illustrates an example of a form designer of a business process management system that includes an event-based declarative rules editor, in accordance with an embodiment.

FIG. 34 illustrates an example of a form designer of a business process management system that includes an event-based declarative rules editor, in accordance with an embodiment.

In accordance with an embodiment, the event-based rules editor can allow rules to be applied to controls that have been added to the form. In an example embodiment, the form designer illustrates the number control selected and the properties of the selected number control in the left-hand user interface labeled "Properties." Included in the displayed properties of the number panel is an events area where events for the number panel can be defined. In accordance with an embodiment, the events area displays a drop-down box that includes a number of events that can be applied to the chosen control. The drop-down box illustrates an example events on-load, on-change, on-focus, on-blur, and on-submit. The event area of the properties user interface enables the user to give the event a name.

Figure 35:
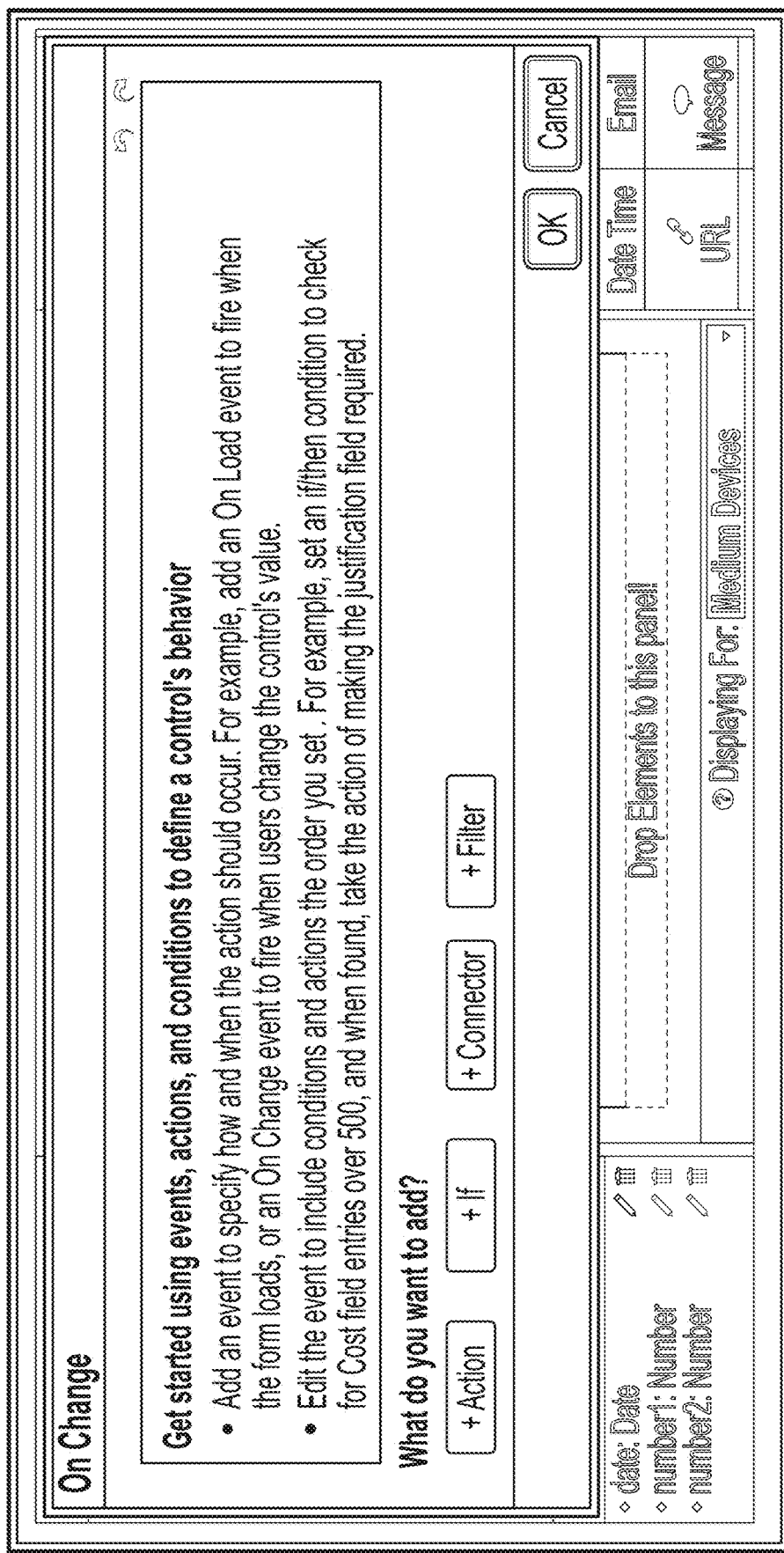
FIG. 35 illustrates an example of a rules editor user interface, in accordance with an embodiment.

FIG. 35 illustrates an example of a rules editor user interface, in accordance with an embodiment.

As illustrated in FIG. 35, in accordance with an embodiment, the rules editor user interface enables a user to define custom rules triggered at the occurrence of the selected event. As illustrated in FIG. 35, for the on-change event of the numbers control, an example rule can include an action, an "if" statement, a connector, or a filter. A user can select one or more of these an example rule configuration options and can begin to define a rule based on the selection.

Figure 36:
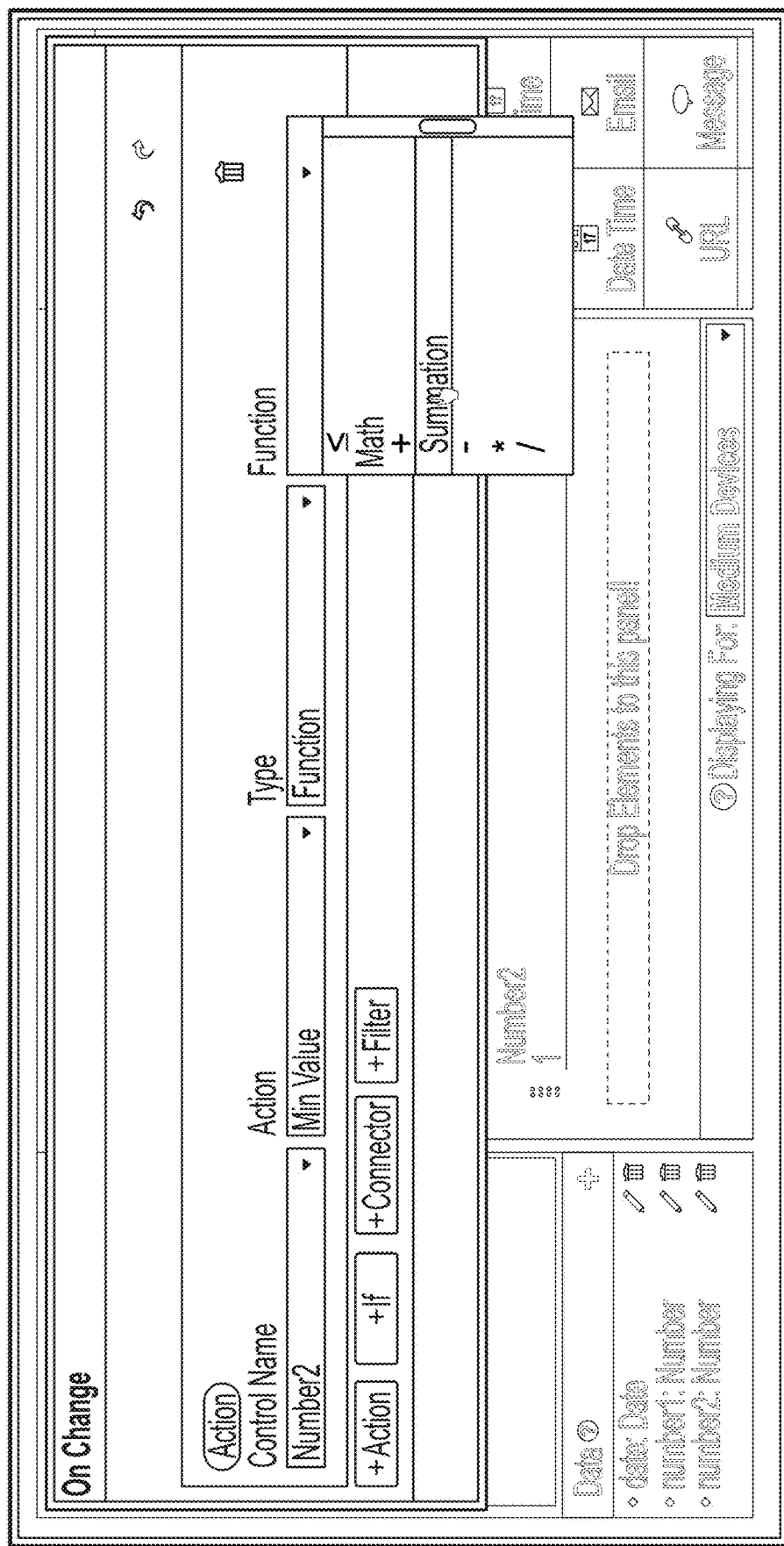
FIG. 36 illustrates an example of a rules editor user interface, in accordance with an embodiment.

FIG. 36 illustrates an example of a rules editor user interface, in accordance with an embodiment.

As illustrated in the example of FIG. 36, an action has been selected to execute at the on-change event of the selected control. The action specifies a minimum value; the minimum value configured to be the calculation of a function including certain operators as illustrated in the function drop-down box.

Figure 37:
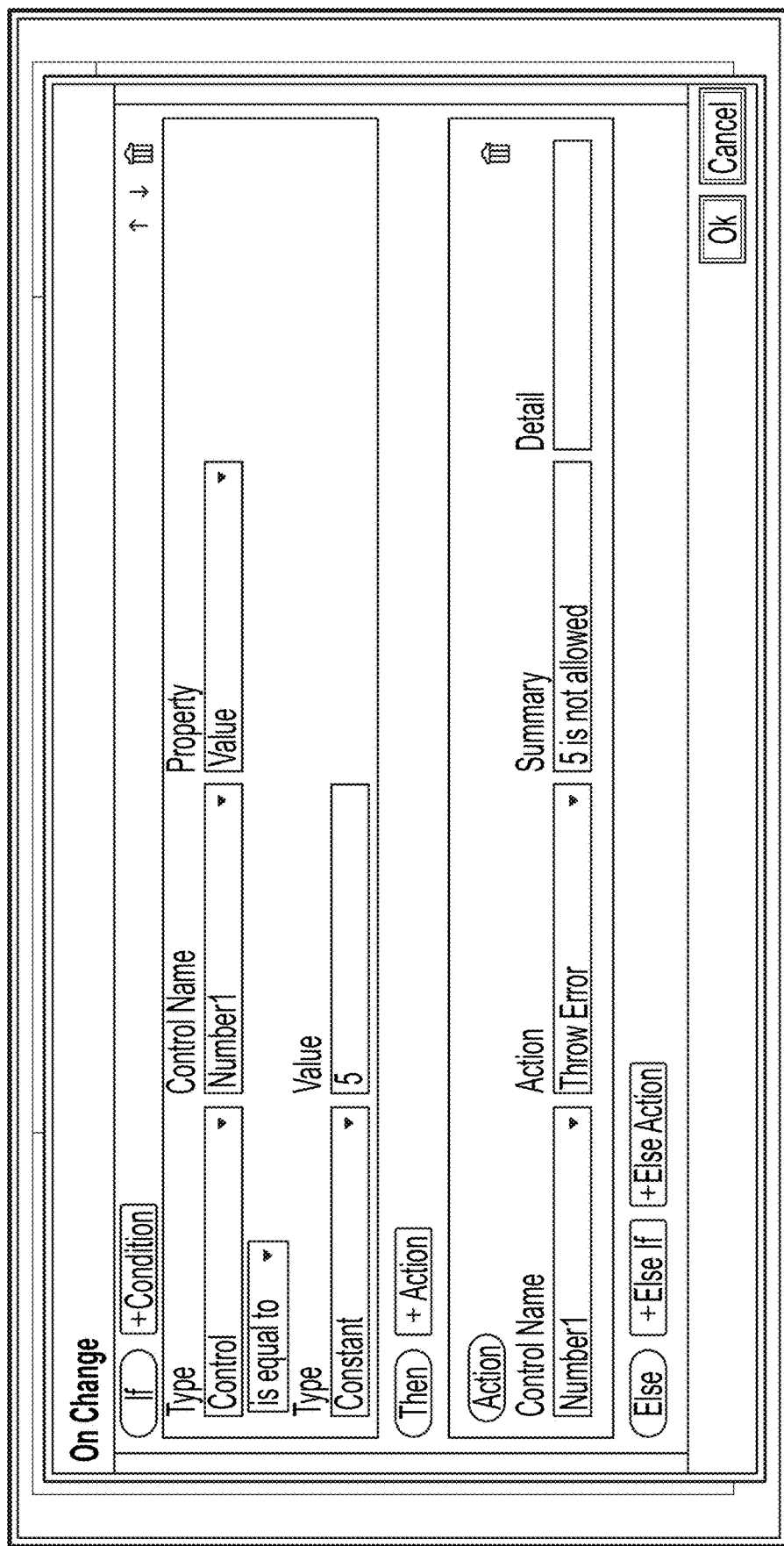
FIG. 37 further illustrates an example of a rules editor user interface, in accordance with an embodiment.

FIG. 37 further illustrates an example of a rules editor user interface, in accordance with an embodiment.

As illustrated in the example of FIG. 37, an "if" condition has been applied to the on-change event of the selected control. As further illustrated in FIG. 37, the rule has been set so that, if the value of Control 1 is equal to the constant "5", the action takes place. In the example embodiment illustrated in FIG. 37, the action is to throw an error and display the summary "5 is not allowed."

Figure 38:
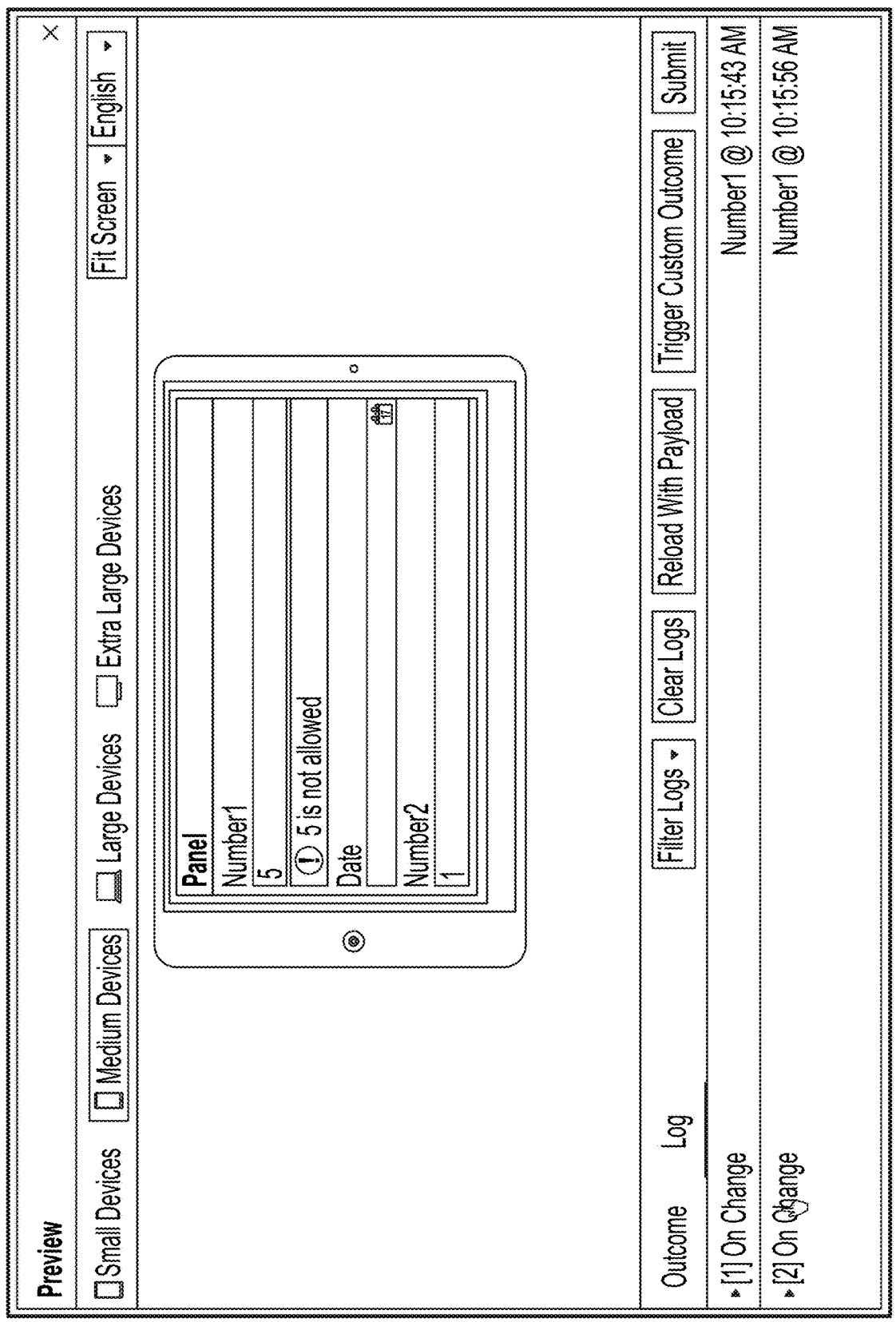
FIG. 38 illustrates an example of a form preview user interface, in accordance with an embodiment.

FIG. 38 illustrates an example of a form preview user interface, in accordance with an embodiment.

As illustrated in FIG. 38, in accordance with an embodiment, the form preview user interface illustrates the error thrown when the on-change event described in FIG. 34 (i.e., the conditional statement) is triggered by a user adding a value of "5" to the generated form.

Simple Expression to Unified Expression Language (UEL) Transformation

In accordance with an embodiment, a business process management system can support simple expression to unified expression language (UEL) transformation for case management execution. Business process management systems employ XML as an underlying data format for persisting business data for processes. When used as a data structure, such business data can be accessed through an XML path language, such as XPath. Such XML path languages, however, can have complicated and unintuitive syntaxes and, as a result, can result in errors by end users.

In accordance with an embodiment, business process management systems can provided an abstraction layer over XML path languages so that users can write their expressions for data associations, conditionals, in an easy-to-understand, dot-style notation that includes type checking. In certain business process management systems, this notation is known as "Simple Expression." The business process management system can translate the expressions to an XML path language, such as XPath, to be executed by a runtime engine of the business process management system.

In accordance with an embodiment, a business process management system can support process types, such as unstructured processes, that are not based on XML formatted data. Such processes can be based on data formatted as, e.g., JavaScript object notation ("JSON"). The engine that executes these other types of processes typically relies on an expression language known as Unified Expression Language (UEL).

In order to reduce the learning curve associated with end users learning a new expression language, a business process management system can translate expressions made in a legacy notation, such as Simple Expression, to another notation, such as Unified Expression Language, in accordance with an embodiment.

Figure 39:
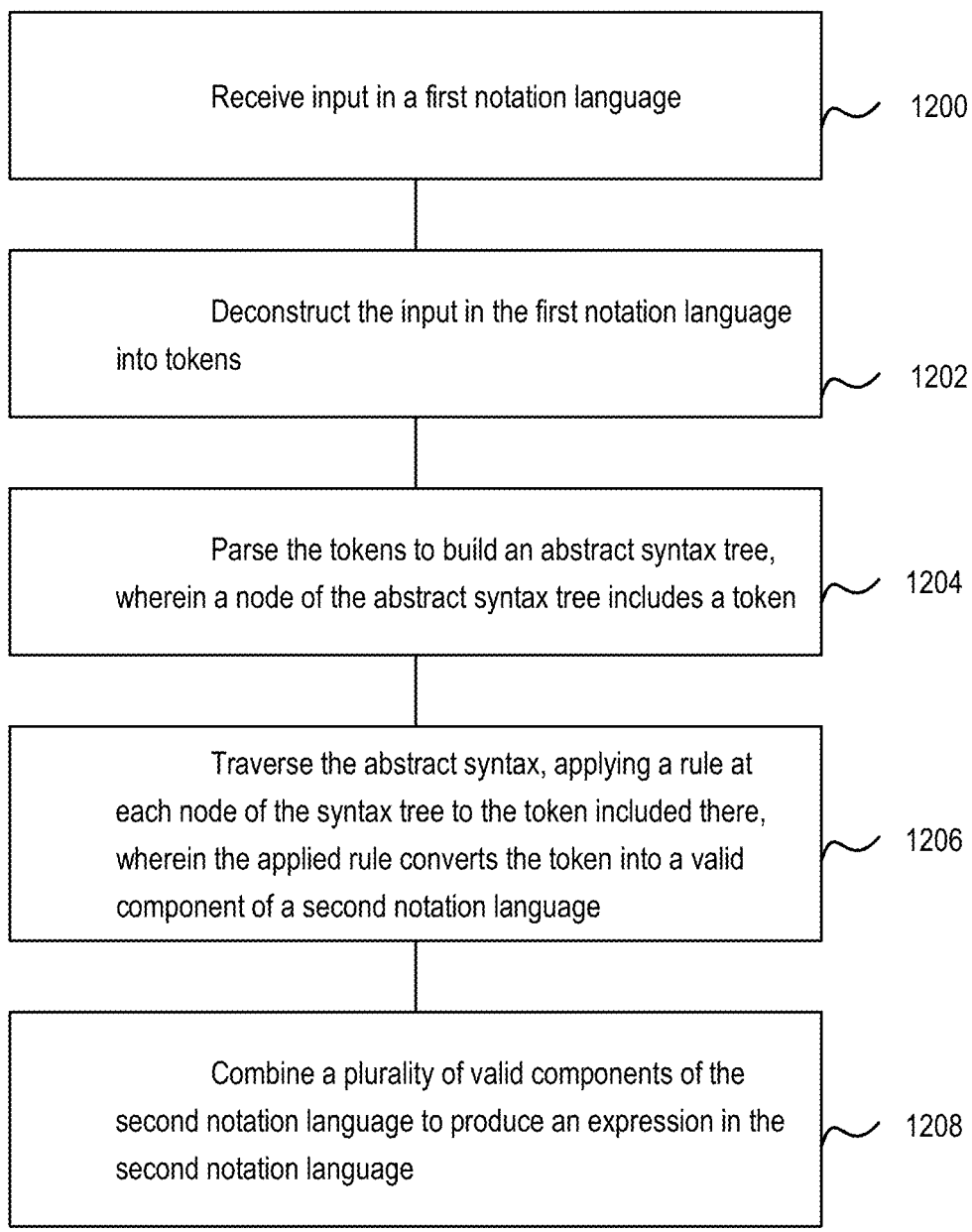
FIG. 39 is a flow chart of a process for providing simple expression to unified expression language transformation, in accordance with an embodiment.

FIG. 39 is a flow chart of a process for providing simple expression to unified expression language transformation, in accordance with an embodiment.

As illustrated in FIG. 39, in accordance with an embodiment, a first step 1200 includes receiving input in a first notation language. A next step 1202 includes deconstructing the input in the first notation language into tokens. A next step 1204 includes parsing the tokens to build an abstract syntax tree, wherein a node of the abstract syntax tree can include a token. A next step 1206 includes traversing the abstract syntax, applying a rule at each node of the syntax tree to the token included there, wherein the applied rule converts the token into a valid component of a second notation language. A next step 1208 includes combining a plurality of valid components of the second notation language to produce an expression in the second notation language.

Figure 40:
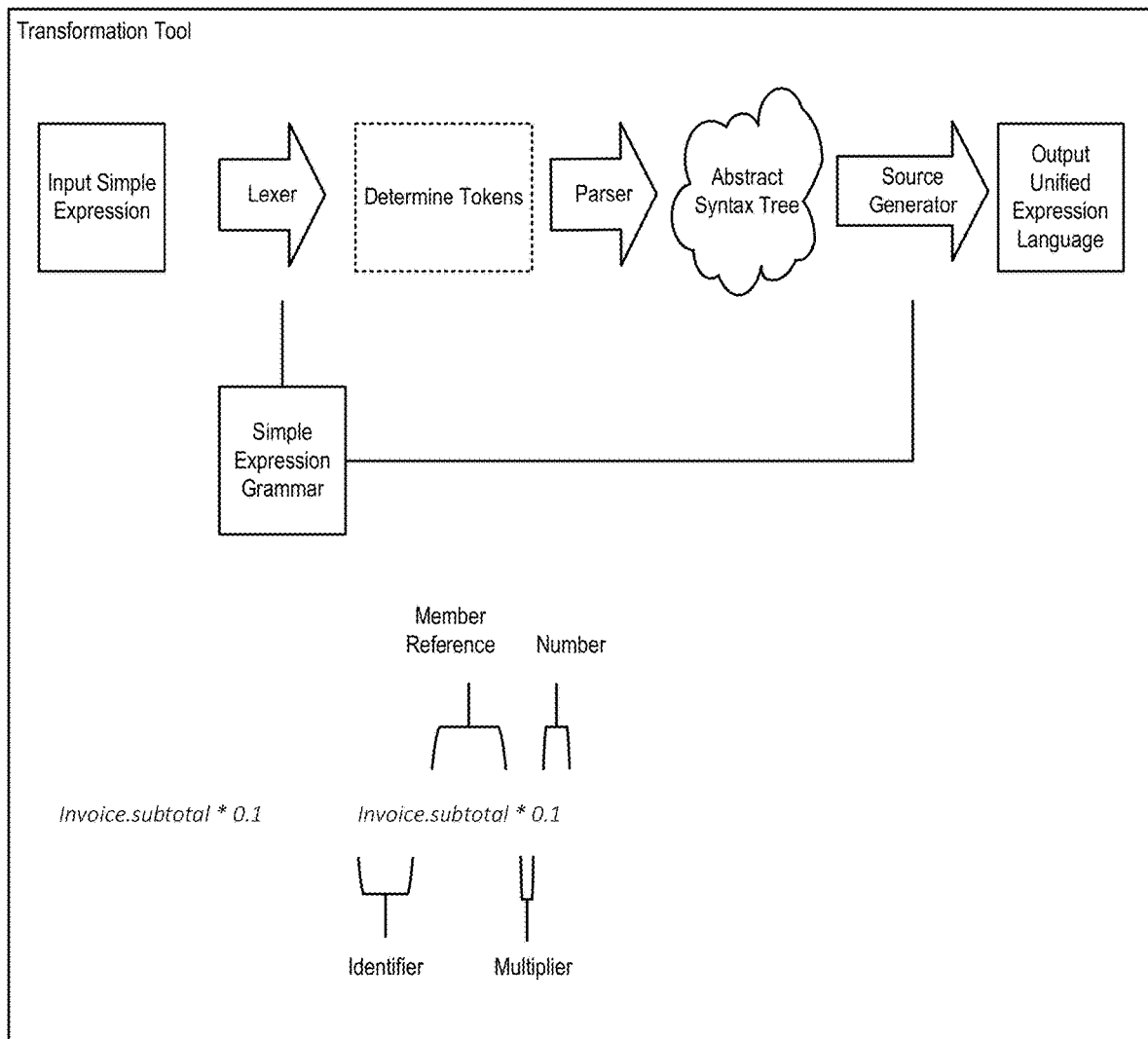
FIG. 40 is a flow chart of a process for providing simple expression to unified expression language transformation, in accordance with an embodiment.

FIG. 40 is a flow chart of a process for providing simple expression to unified expression language transformation, in accordance with an embodiment.

As illustrated in FIG. 40, in accordance with an embodiment, a token of the first notation language can include, e.g., an identifier, a member reference, an operator, a number type. The BPM system receives an input in a first notation language; deconstructs the input in the first notation language into tokens; and parses the tokens to build an abstract syntax tree.

Each node of the abstract syntax tree can include a token. The abstract syntax tree can be traversed, applying a rule at each node of the syntax tree to the token included there. The applied rule converts the token into a valid component of a second notation language. A plurality of valid components of the second notation language can be combined to produce an expression in the second notation language.

For example, wherein a token of the first notation language can include, e.g., an identifier, a member reference, an operator, and a number type:

1. As inputs of the process, a Simple Expression can be provided by the user, and a lexer/parser that is configured via a Simple Expression grammar is used to parse or otherwise understand the different constructs of the language.

2. The Simple Expression is processed by the lexer, which breaks it down into different tokens.

3. Once the system has the different tokens, the parser uses them to build an abstract syntax tree (AST).

4. Subsequently, a source generator traverses the abstract syntax tree, applying different rules to convert each of these nodes into a valid Unified Expression Language (UEL) component, which are them combined to obtain the complete UEL expression.

Dynamic Process Smart Inline Validation

In accordance with an embodiment, a column-based process editor can include a proprietary graphical column-based representation of Case Management Notation, thereby simplifying the modeling experience for the end user resulting in quicker times to execution. From within the column-based process editor the system can provide a live customizable inline validation framework, in accordance with an embodiment.

In accordance with an embodiment, the business process management system can provide a validation framework which detects complex patterns and includes can features such as infinite loop detection. Using the validation framework, the system can produce inline badge indicators that indicate live, missing and inaccurate design aspects, and display the badge indicators to users of the process editor. The inline badge indicators can, e.g., expose issues and provide a description thereof and/or a suggested solution.

Figure 41:
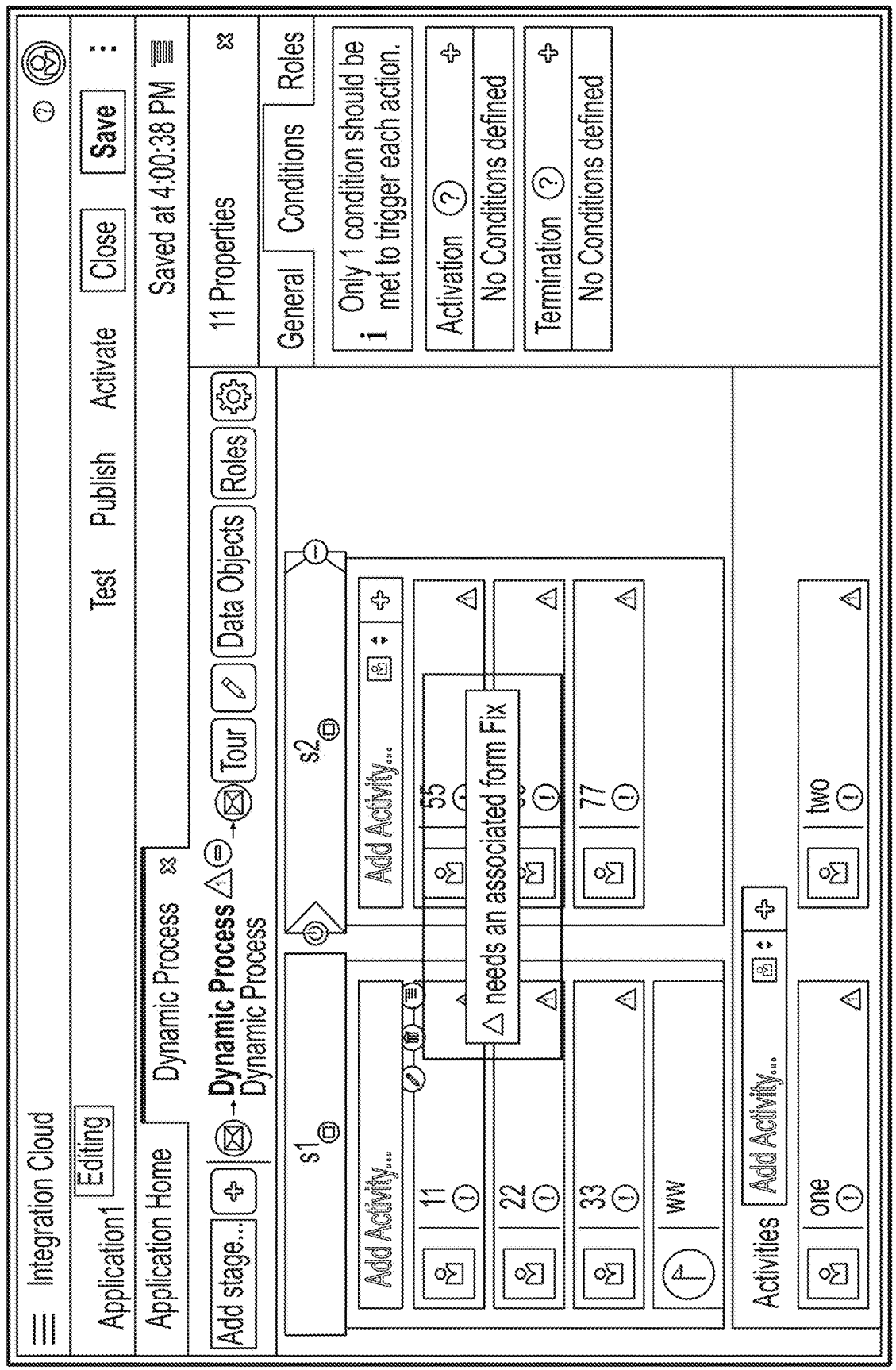
FIG. 41 illustrates an example inline badge indicator, in accordance with an embodiment.

FIG. 41 illustrates an example inline badge indicator, in accordance with an embodiment.

As illustrated in FIG. 41, in accordance with an embodiment, an activity of a process stage can be added to the column-based process editor. The system can be configured to detect an issue with the added activity and provide a visual indicator, or badge, that a user can activate to determine what the issue is. Moreover the business process management system can provide information that suggests a course of action, or fix, for the identified issue. In the example of FIG. 41, the badge indicator notes that the action added to the first process stage needs a form associated with the action.

Figure 42:
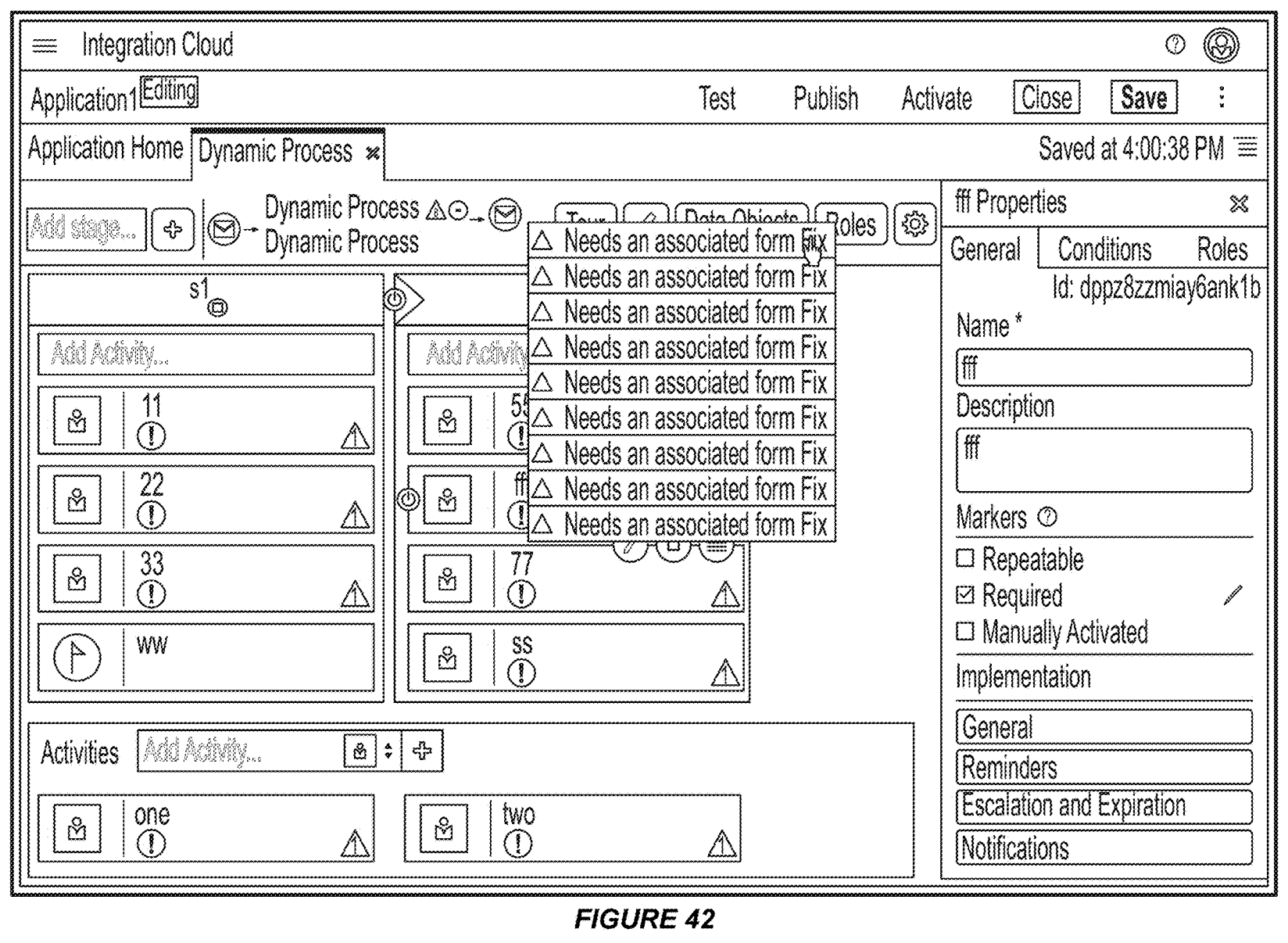

FIG. 42 illustrates an example of grouped badge indicators, in accordance with an embodiment.

As illustrated in FIG. 42, in accordance with an embodiment, inline badge indicators from a plurality of components in the process editor can be grouped together in a common location.

Figure 43:
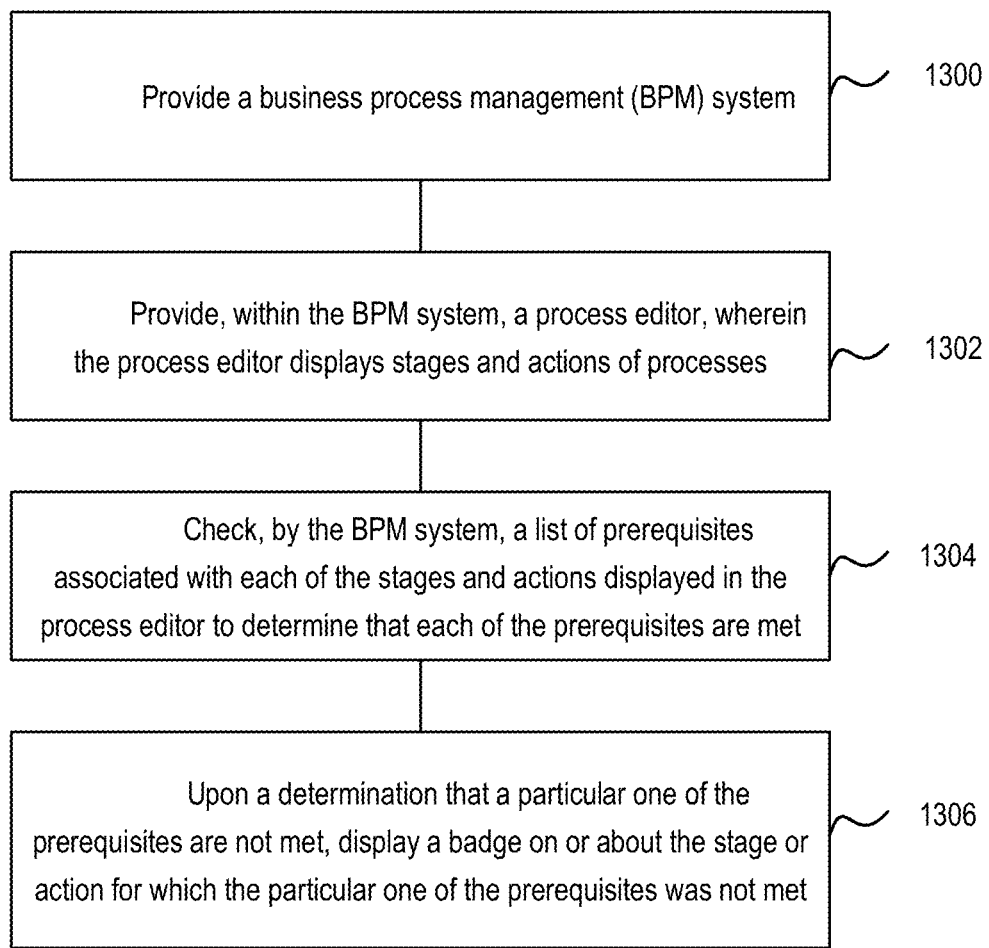
FIG. 43 is a flow chart of a process for providing dynamic process smart inline validation, in accordance with an embodiment.

FIG. 43 is a flow chart of a process for providing dynamic process smart inline validation, in accordance with an embodiment.

As illustrated in FIG. 43, in accordance with an embodiment, at a first step 1300, a business process management system is provided. At a next step 1302, a process editor is provided within the business process management system, wherein the process editor displays stages and actions of processes. At a next step 1304, the business process management system can check a list of prerequisites associated with each of the stages and actions displayed in the process editor to determine that each of the prerequisites are met. At a next step 1306, upon a determination that a particular one of the prerequisites are not met, the business process management system can display a badge on or about the stage or action for which the particular one of the prerequisites was not met.

Data Mapper Activity

In accordance with an embodiment, systems and methods can provide a type of activity in PCS (process cloud service) with the purpose of allowing users to map data. This can enable users to assign values to data objects in a certain part of their processes that would otherwise be unavailable to other activities to do so. This may be because none of the other activities is needed at that point from a modeling perspective, and adding any of them as a draft to achieve this functionality would diminish the legibility of the model to business users, as it is prone to misunderstanding.

Figure 44:
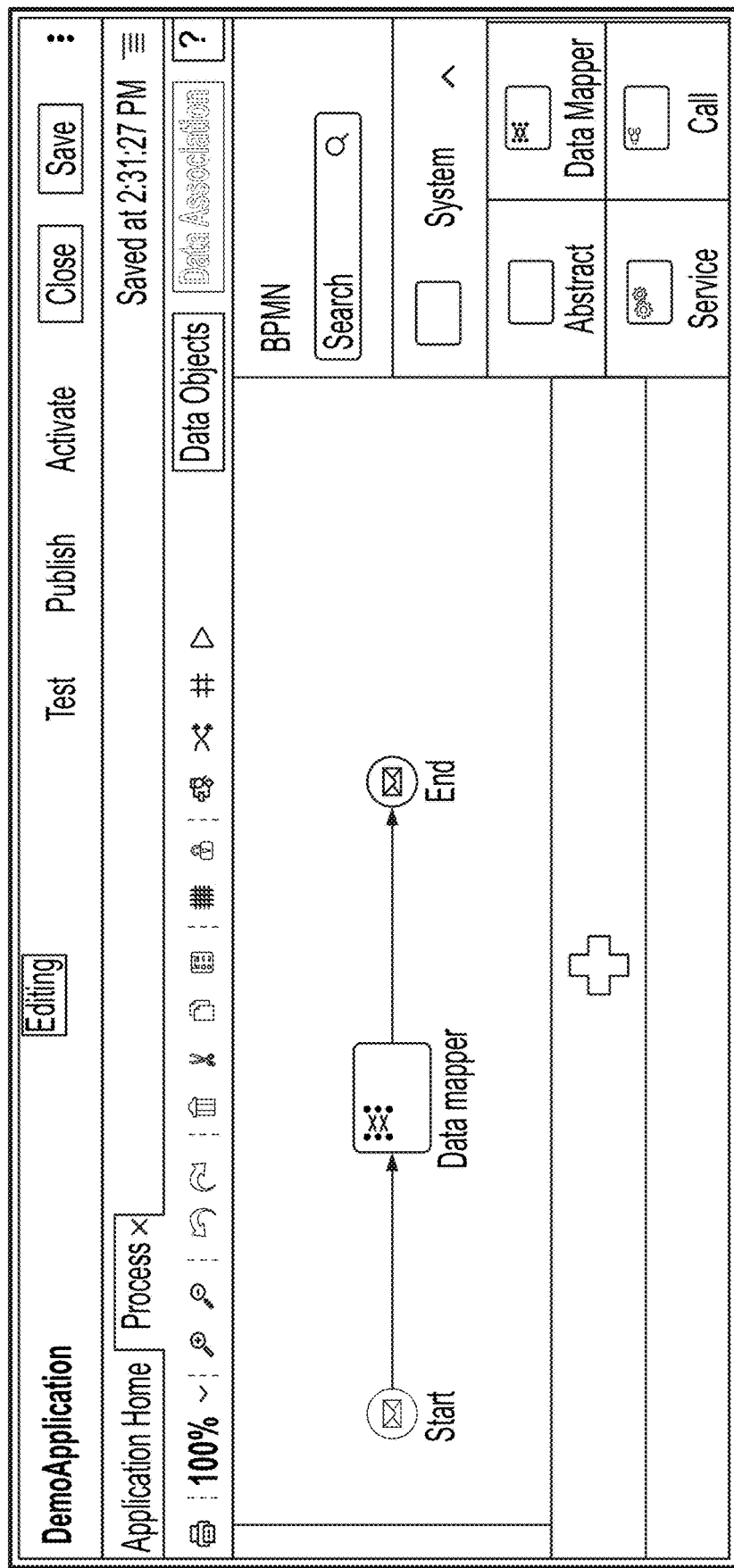
FIG. 44 illustrates an example of a system for data mapper activity, in accordance with an embodiment.

FIG. 44 illustrates an example of a system for data mapper activity, in accordance with an embodiment.

As illustrated in FIG. 44, in accordance with an embodiment, a type of activity, generally referred to as "Data Association" can be exposed in the palette for regular BPMN processes.

In accordance with an embodiment, on opening the Data Association panel, the experience is the same as in the output panel for any other activity: users will be able to select any literal, data object or predefined variable available in the context of that activity as the source for the mapping, setting that value to the data object or predefined variable (as long as it's not read-only) that's selected as target. Validation warnings or errors will appear as usual if the types do not match, and users can choose to put transformations in place to bridge them and have a valid assignment.

In accordance with an embodiment, the following functionality can be provided:

Drag-and-drop the Data Association activity in regular BPMN processes.

Select a literal, data object or predefined variable available in the context of the activity as the source of a data mapping.

Select a data object or predefined variable (as long as it's not read-only) available in the context of the activity as the target of a data mapping.

Receive feedback (validation warnings or errors) in case of type mismatches, illegal assignments, missing variables, as in any other activity.

Use a transformation to bridge association between invalid types.

See the mappings that were put in place in the activity reflected in runtime during instance execution.

Web Form Event Analyzer

In accordance with an embodiment, the system can support the use of a web form analyzer.

Figure 45:
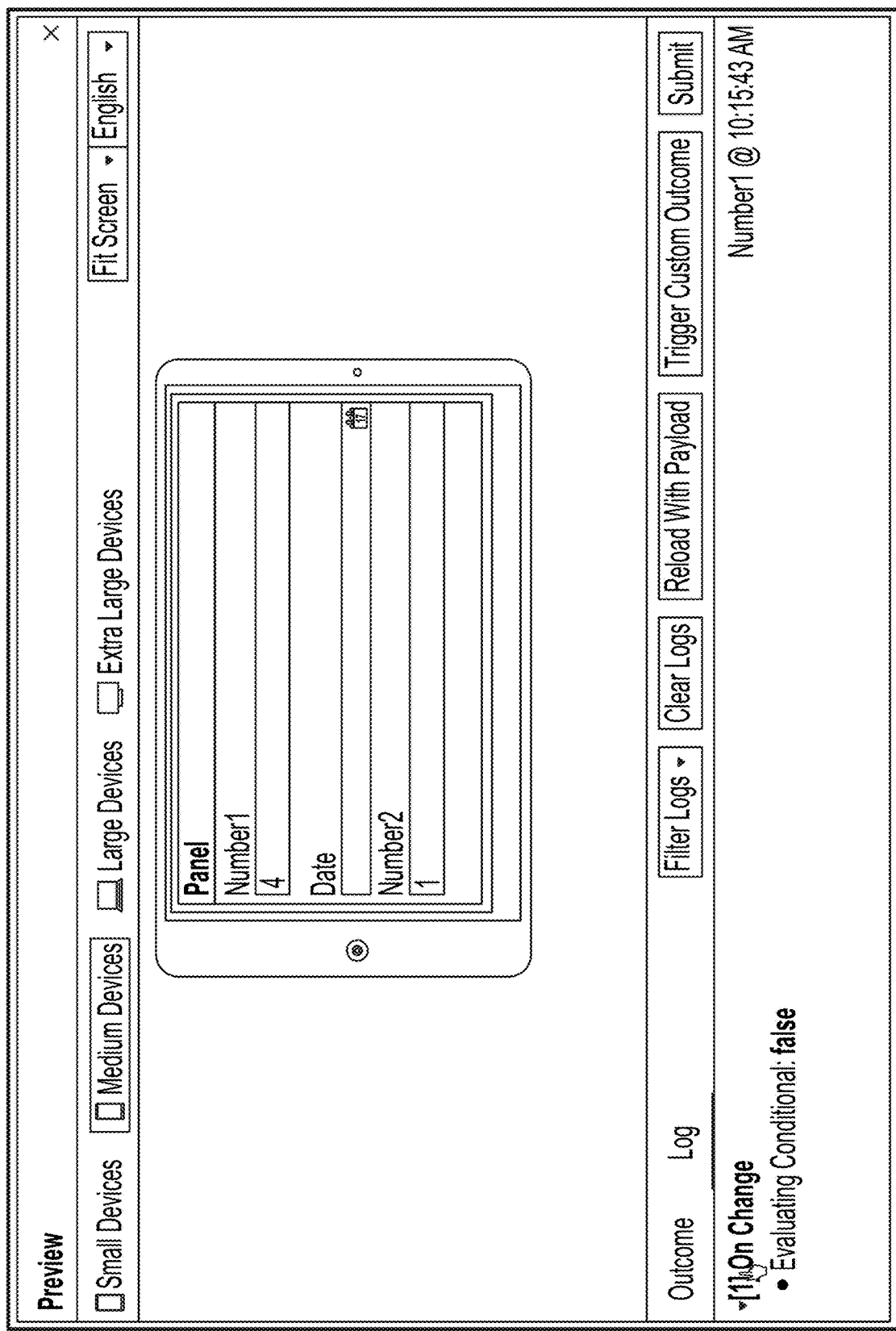
FIG. 45 illustrates an example of a web form event analyzer, in accordance with an embodiment.

FIG. 45 illustrates an example of a web form event analyzer, in accordance with an embodiment.

As illustrated in FIG. 45, in accordance with an embodiment, the environment can comprise a number of different and selectable user interface options. For example, a form preview user interface forms the main display. Additionally, the web-form analyzer can comprise an outcome tab as well as a log tab, where the system can present logged results of an event to be viewed by a user. Such logs can then be utilized to evaluate and perform an assessment of the input event's flow behavior.

For example, as illustrated in FIG. 45, when a 4 is entered into the "number1" control, the rule that is performed on occurrence of the on-change event evaluates to false, since the corresponding rule, evaluates whether the value of the control is equal to 5. Accordingly, the system presents a visual representation of the outcome of the rule. Because the if-statement rule evaluates to false, the system stops execution of the rule (i.e., the system does not go to the subsequent step of throwing the error, as the rule configuration demonstrates).

Figure 46:
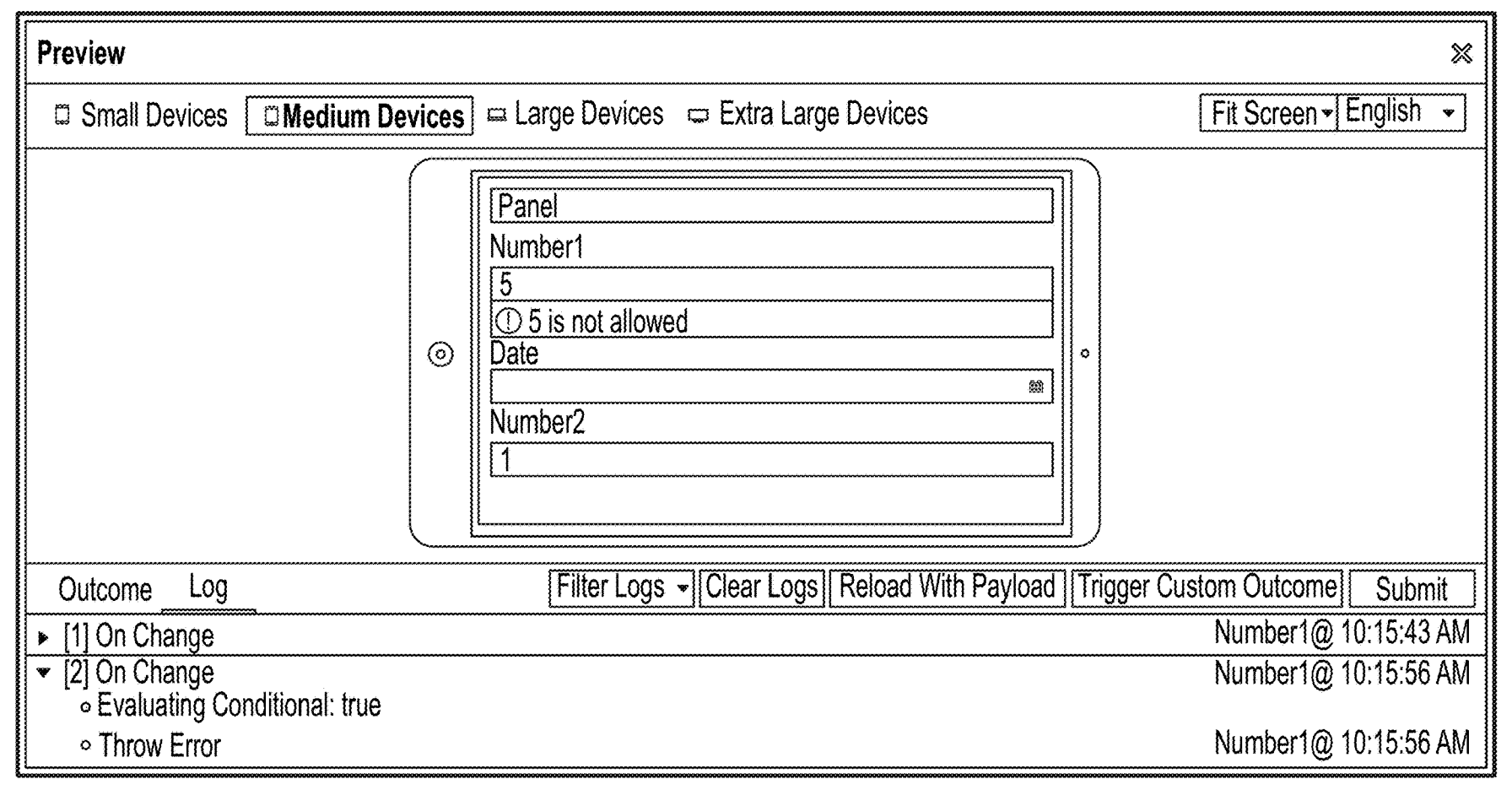

FIG. 46 further illustrates an example of a web form event analyzer, in accordance with an embodiment.

As illustrated therein, FIG. 46 depicts the web form event analyzer in the scenario in which a 5 is entered in the "number1" control. In this scenario, the web form analyzer presents a different visual representation of the outcome of the rule. In the scenario illustrated in FIG. 46, the if-statement rule evaluates to true. Accordingly, the system performs the next step of the rule (i.e., the system performs the subsequent step of throwing the error, as the rule configuration demonstrates).

FIG. 47 illustrates an example of a global connector configuration user interface, in accordance with an embodiment.

As illustrated in FIG. 47, in accordance with an embodiment, the global connection configuration user interface enables user-defined connections to be bound to the form. The system can log global connections bound to a form and display the results of the global connections in the web form analyzer. A rest call can be a Representational State Transfer (REST) web service call to a remote system, in accordance with an embodiment.

Figure 48:
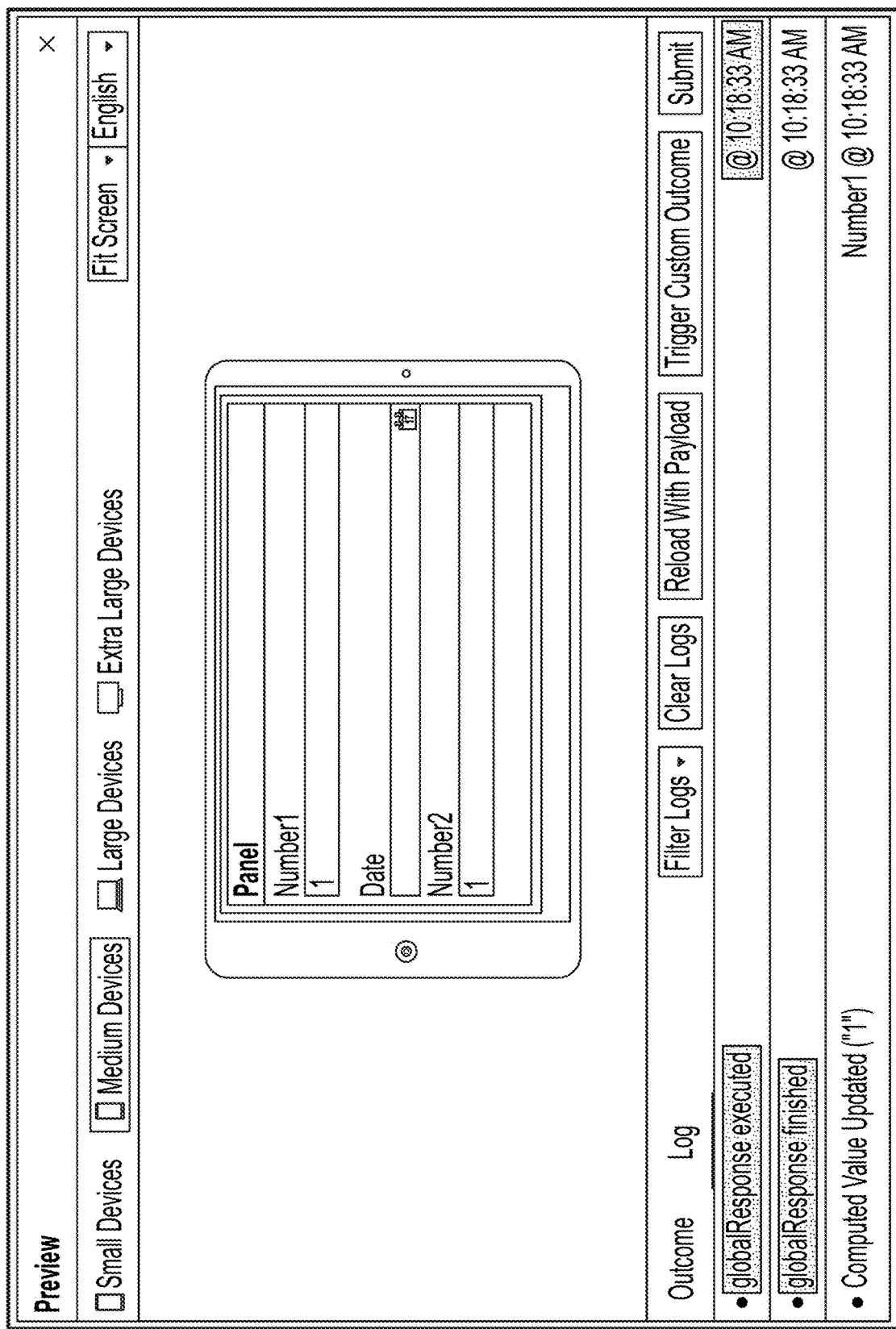
FIG. 48 illustrates an example of a web form event analyzer, in accordance with an embodiment. The web form analyzer as illustrated in FIG. 48 is displaying the system log of the connection calls made when the form is executed in a runtime environment.

FIG. 48 illustrates an example of a web form event analyzer, in accordance with an embodiment. The web form analyzer as illustrated in FIG. 48 is displaying the system log of the connection calls made when the form is executed in a runtime environment.

As illustrated in FIG. 48, in accordance with an embodiment, the system can apply a user-identified filter to the displayed items logged by the system, in accordance with an embodiment. For example, a user can interact with the Filter Logs button to apply a filter.

Additionally, in accordance with an embodiment, the system can include a Reload with Payload button. In accordance with an embodiment, the system can accept a pre-defined payload from a user and load the form in a run-time preview with the received payload.

Figure 49:
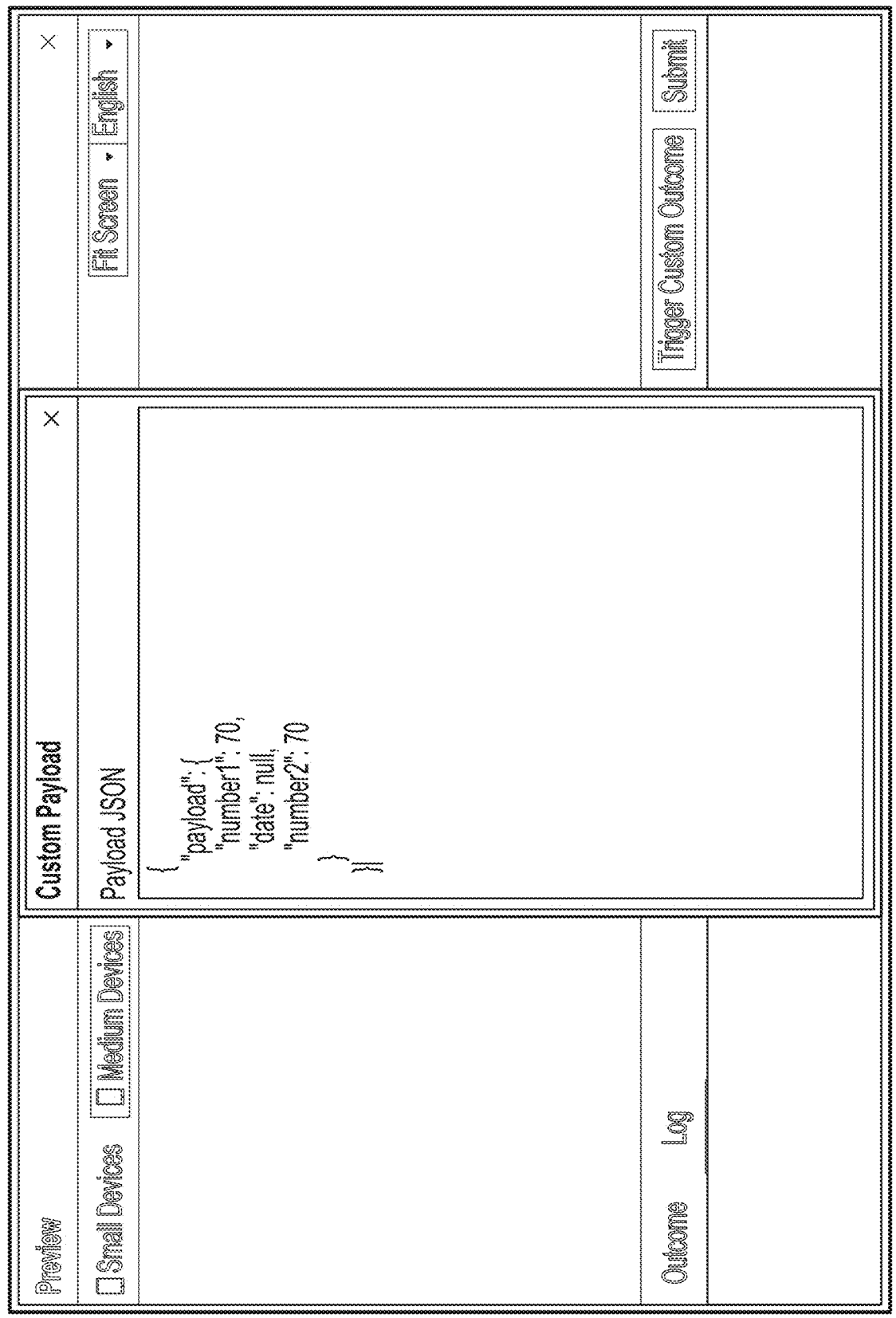
FIG. 49 illustrates an example custom payload user interface where a user can input a custom payload with which to load a form, in accordance with an embodiment.

FIG. 49 illustrates an example custom payload user interface where a user can input a custom payload with which to load a form, in accordance with an embodiment.

Figure 50:
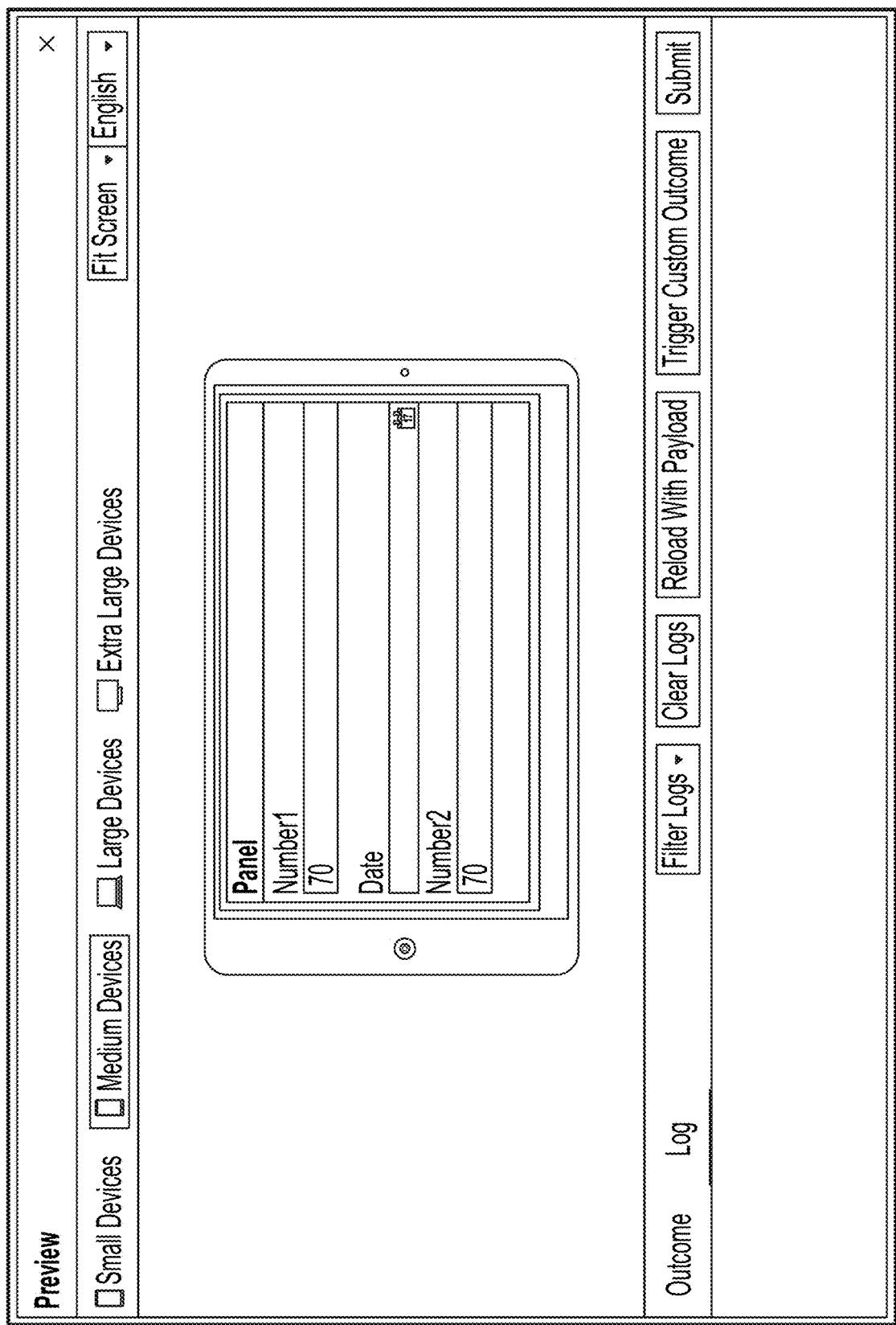
FIG. 50 illustrates an example of a form loaded by the system with the custom payload input by the user, in accordance with an embodiment.

FIG. 50 illustrates an example of a form loaded by the system with the custom payload input by the user, in accordance with an embodiment.

Dynamic Process Activated by a Web Form

In accordance with an embodiment, a business process management system can start a dynamic process instance using data coming from a web form submission. A user can submit a web form with data that will be automatically available at runtime.

Figure 51:
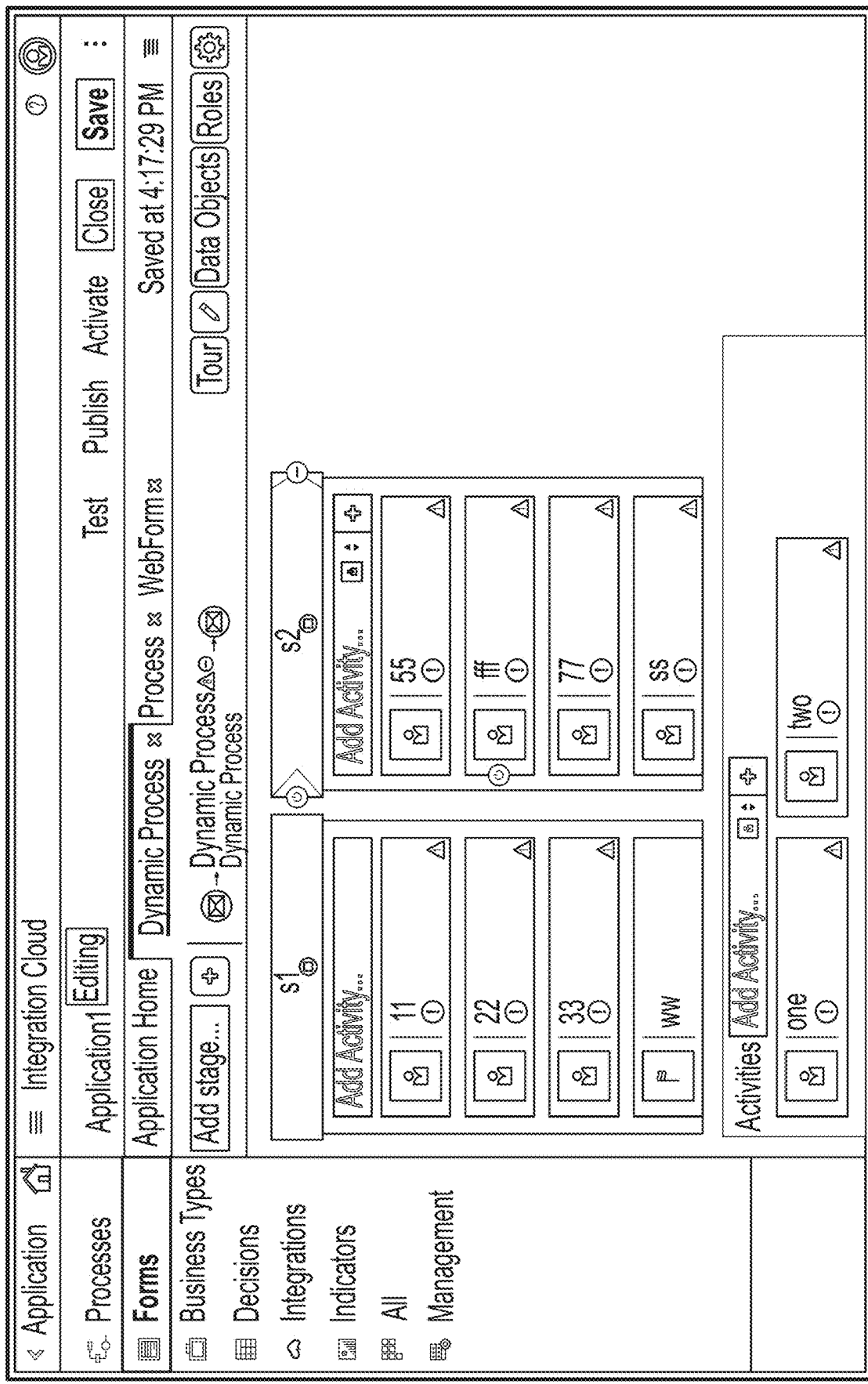
FIG. 51 illustrates an example of a process editor of a business process management system, in accordance with an embodiment.

FIG. 51 illustrates an example of a process editor of a business process management system, in accordance with an embodiment.

As illustrated in FIG. 51, in accordance with an embodiment, a process can be created in a process editor of a business process management system. The created process can be activated by an end user who has permission within the system to launch the process.

Figure 52:
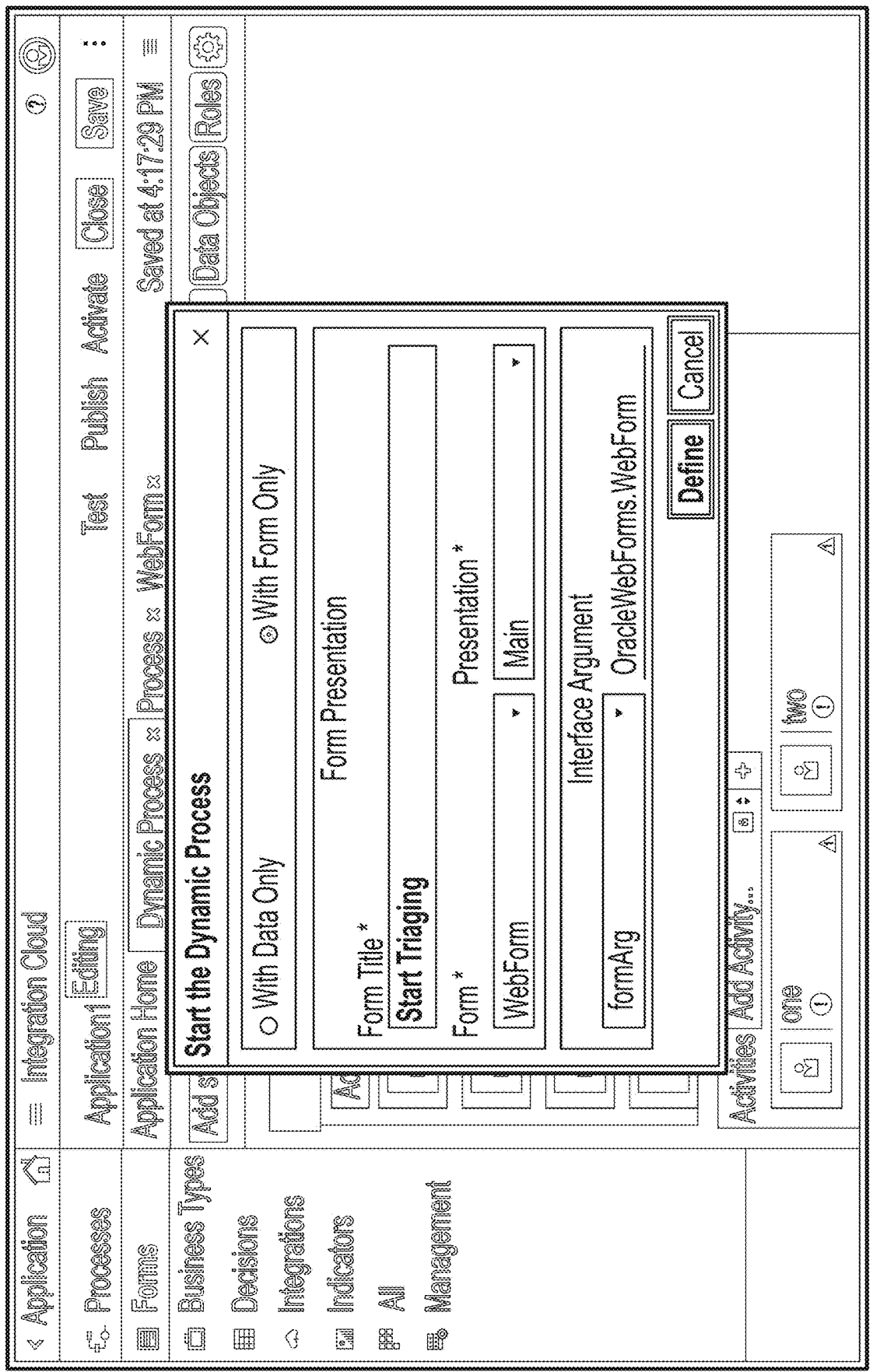
FIG. 52 illustrates an example of a user interface for defining a dynamic process with a web form, in accordance with an embodiment.

FIG. 52 illustrates an example of a user interface for defining a dynamic process with a web form, in accordance with an embodiment.

As illustrated in FIG. 52, in accordance with an embodiment, a dynamic process can be configured to be launched using a web form. For example, a process designer can indicate that the process can be activated by a web form. The designer can specify a title, a form type and a presentation type within the user interface.

In accordance with an embodiment, end users of the business process management system who have access to the dynamic process can access the process via the web form created by the designer. The process will start using the data from the web form.

Figure 53:
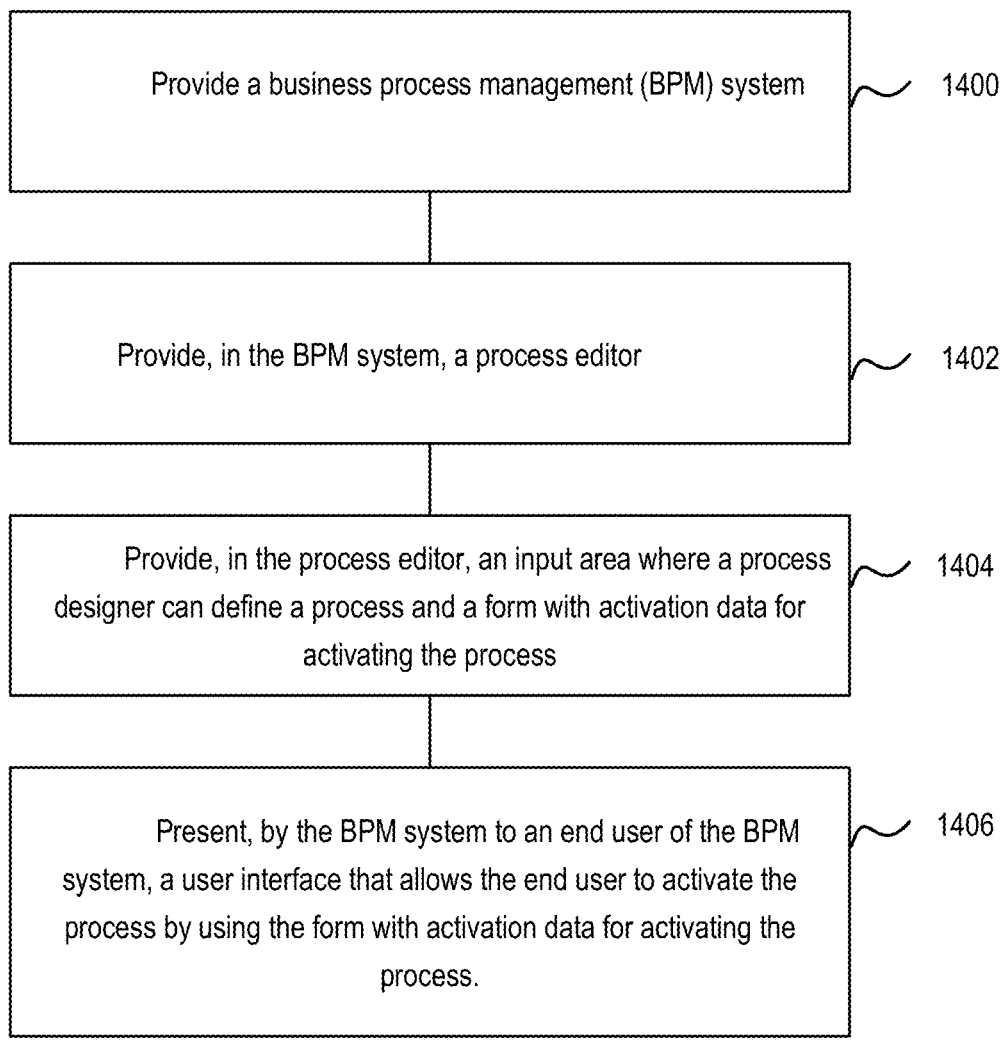
FIG. 53 is a flow chart of a process for activating a dynamic process via a web form, in accordance with an embodiment.

FIG. 53 is a flow chart of a process for activating a dynamic process via a web form, in accordance with an embodiment.

As illustrated in FIG. 53, in accordance with an embodiment, a first step 1400 includes providing a business process management system. A next step 1402 includes providing, in the business process management system, a process editor. A next step 1404 includes providing, in the process editor, an input area where a process designer can define a process and a form with activation data for activating the process. A next step 1406 includes presenting, by the business process management system to an end user of the business process management system, a user interface that allows the end user to activate the process by using the form with activation data for activating the process.

Extensible Editor Palette

In accordance with an embodiment, a process editor can include a dynamic palette that not only contains the BPMN specific elements but is extensible to contain any other element defined by a business. This can be provided through an implementation on the client and the business process management system server that can include a dynamic set of process elements, making a designed business process extensible to other specifications and business defined elements other than BPMN elements.

In accordance with an embodiment, a column-based process editor palette can expose implemented process components (such us connectors). This can provide assistance with discoverability of components while simplifying the experience to business users by hiding complexities of the implementation. Leveraging the ability to pre-load implemented components means the business process management system can provide ready-made components to be used as building blocks for user applications.

Figure 54:
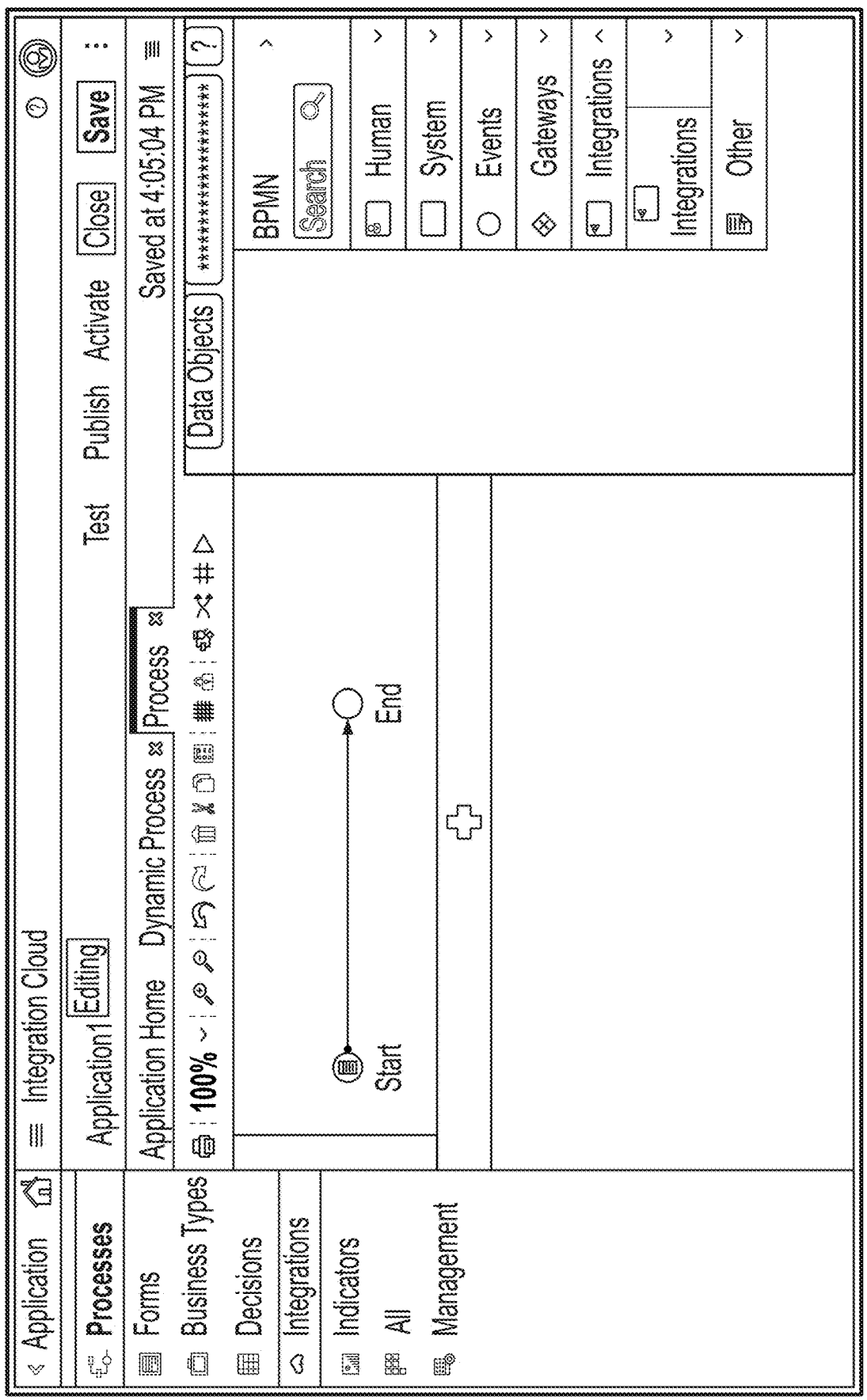
FIG. 54 illustrates an example of a process editor, including a dynamic editor palette, in accordance with an embodiment.

FIG. 54 illustrates an example of a process editor, including a dynamic editor palette, in accordance with an embodiment.

As illustrated in FIG. 54, in accordance with an embodiment, the process editor can include a canvas on which the process is visually laid out, and a column-based process editor palette. In accordance with an embodiment, the business process management system can build the column-based process editor palette based on the type of process that indicated in the process editor.

For example, if the process will include an integration with a third party service (e.g., a web service), and connectors (generally referred to as "integrations" in the process editor) have been defined, the business process management system can dynamically build the palette to include the defined connectors, or integrations, in the palette. This enables a user of the business process management system to intuitively drag-and-drop the integration onto the canvas to include the integration in the process.

Figure 55:
FIG. 55 illustrates an integration development user interface, in accordance with an embodiment.

FIG. 55 illustrates an integration development user interface, in accordance with an embodiment.

As illustrated in FIG. 55, in accordance with an embodiment, different integrations and connections can be configured with third party services. The business process management system can include such integrations in a dynamic palette when the system determines that the process can require one or more integrations.

Figure 56:
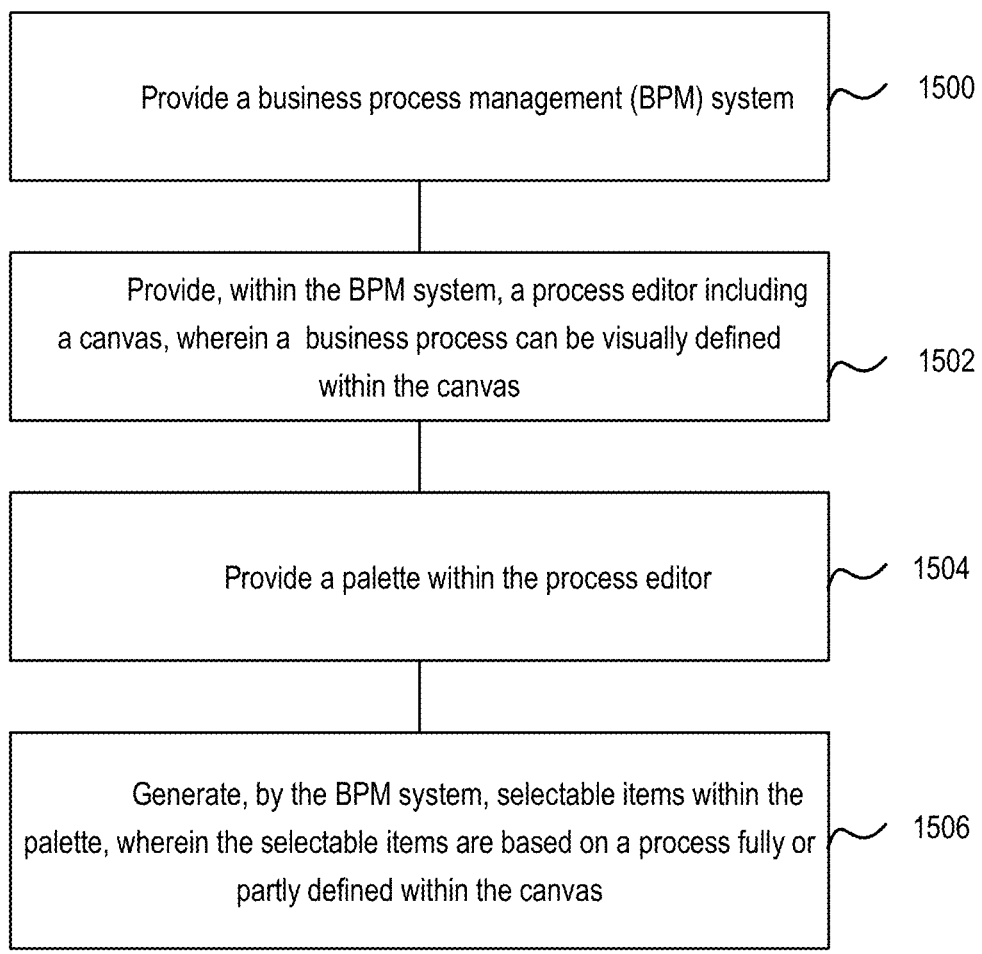
FIG. 56 is a flow chart of a process for providing a column-based process editor palette in a business process management environment, in accordance with an embodiment.

FIG. 56 is a flow chart of a process for providing a column-based process editor palette in a business process management environment, in accordance with an embodiment.

As illustrated in FIG. 56, in accordance with an embodiment, a first step 1500 includes providing a business process management system. A next step 1502 includes providing, within the business process management system, a process editor, including a canvas, wherein a business process can be visually defined within the canvas. A next step 1504 includes providing a palette within the process editor. A next step 1506 includes generating, by the business process management system, selectable items within the palette, wherein the selectable items are based on a process fully or partly defined within the canvas.

Environment-Based Customizable Project Deployment Authorization

In accordance with an embodiment, a business process management system can enable an administrator user (i.e., a user with elevated privileges) to configure the level of authorization required to activate projects based on different environments. This enables a process editor to run a complete lifecycle of a project process on a certain environment without further interaction with the administrator user.

Figure 57:
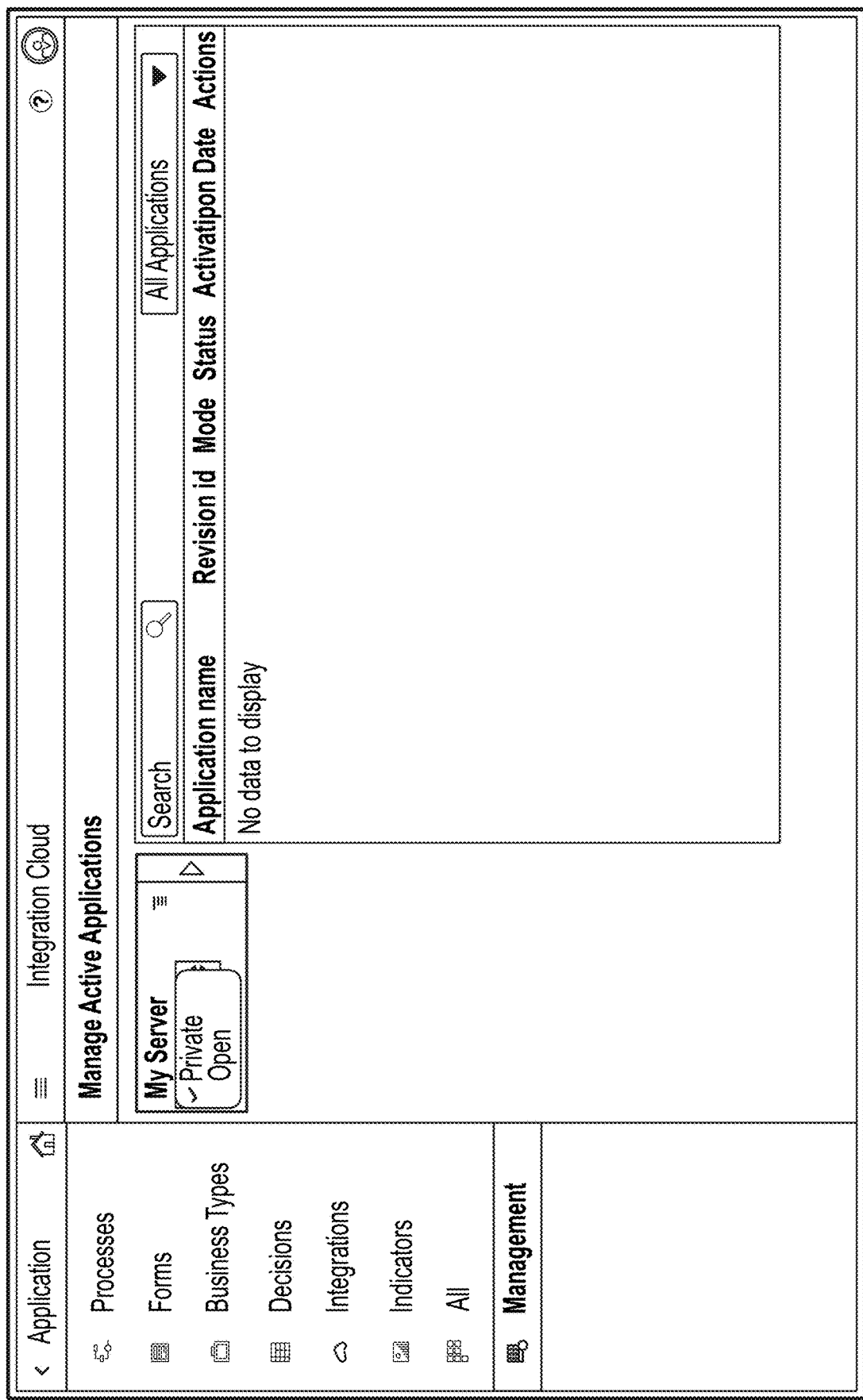
FIG. 57 illustrates an example of a user interface for managing active applications in a business process management system, in accordance with an embodiment.

FIG. 57 illustrates an example of a user interface for managing active applications in a business process management system, in accordance with an embodiment.

As illustrated in FIG. 57, in accordance with an embodiment, the system can display different servers in a column of a management user interface. The different servers can house and/or reflect different environments, respectively, of a process. For example, a first server in the column can represent a development environment. Another server in the column can represent a production environment.

In accordance with an embodiment, the business process management system can define groups of users. For example, one group can comprise development users. Development users can be users that work on designing process applications. Development users can be responsible for designing and developing a process before the process is ready for a production environment.

Another example group of users can be end users, or production users. Production users can be users for whom the process application was designed. These users can use the process application, e.g., in the course of their employment.

As noted above these two an example types of users can be represented in separate groups in the business process management system. As illustrated in FIG. 57, the system can provide an administrative interface at which an administrative user can toggle different environments from "open" to "private". In accordance with an embodiment, when an environment is toggled to "open", users from all groups can access the environment. That is, development users from a development group can access the environment, and production users from a production group can access the environment.

Conversely, when an environment is toggled to private, users from only certain groups can access the environment. For example, only development users from a development group may be able to access the environment. Different environments can be administratively isolated from certain groups, so that, e.g., a non-production environment cannot be accessed by production users, but can be accessed by development users.

Figure 58:
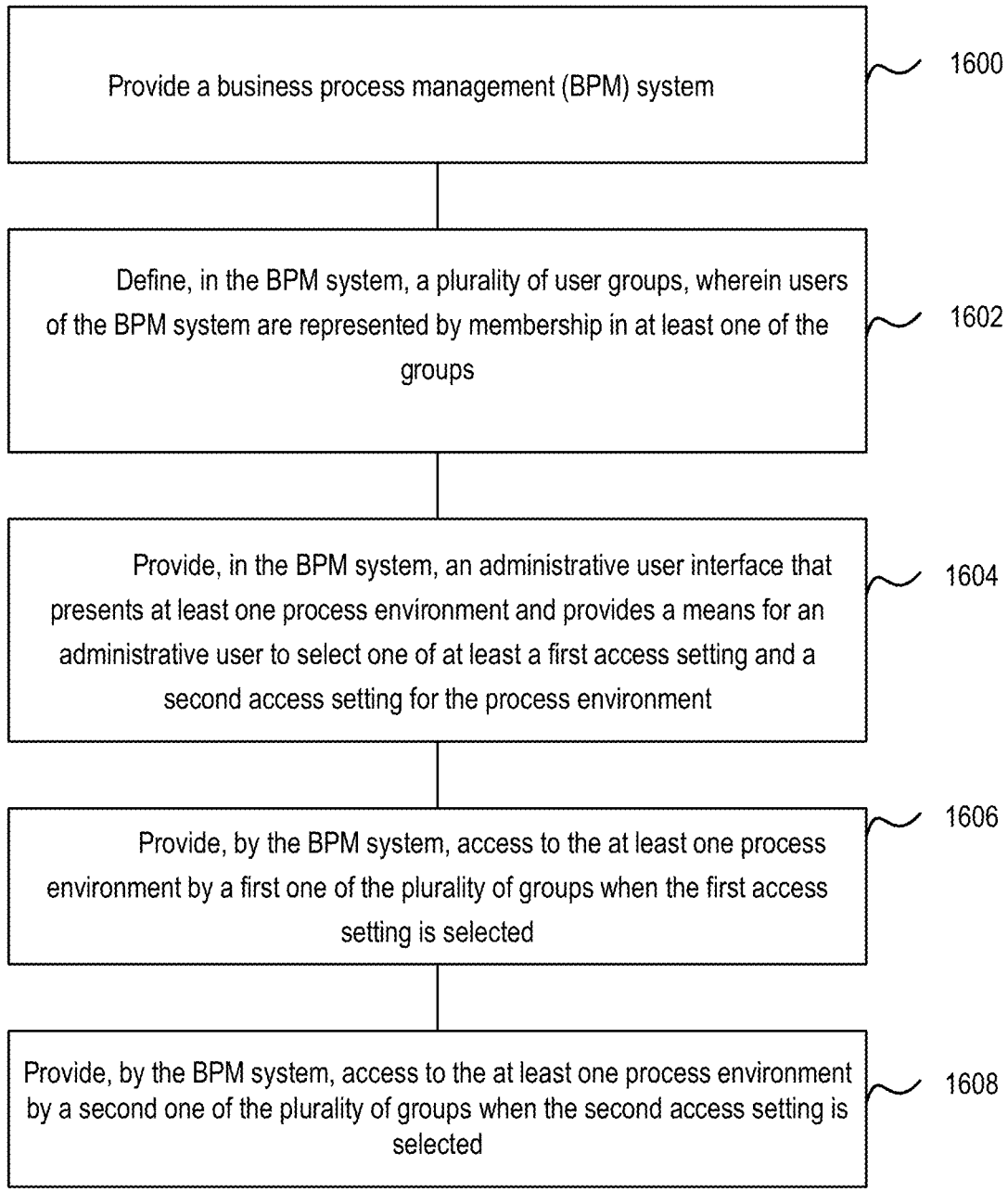
FIG. 58 is a flow chart of a process for providing an environment-based customizable project deployment authorization strategy in a business process management system, in accordance with an embodiment.

FIG. 58 is a flow chart of a process for providing an environment-based customizable project deployment authorization strategy in a business process management system, in accordance with an embodiment.

As illustrated in FIG. 58, in accordance with an embodiment, a first step 1600 includes providing a business process management system. A next step 1602 includes defining, in the business process management system, a plurality of user groups, wherein users of the business process management system are represented by membership in at least one of the groups. A next step 1604 includes providing, in the business process management system, an administrative user interface that presents at least one process environment and provides a means for an administrative user to select one of at least a first access setting and a second access setting for the process environment. A next step 1606 includes providing, by the business process management system, access to the at least one process environment by a first one of the plurality of groups when the first access setting is selected. A next step 1608 includes providing, by the business process management system, access to the at least one process environment by a second one of the plurality of groups when the second access setting is selected.

Decision Model and Notation Service Integration

In accordance with an embodiment, the systems and methods provided herein provide a seamless integration with a decision model and notation service (DMN).

Figure 59:
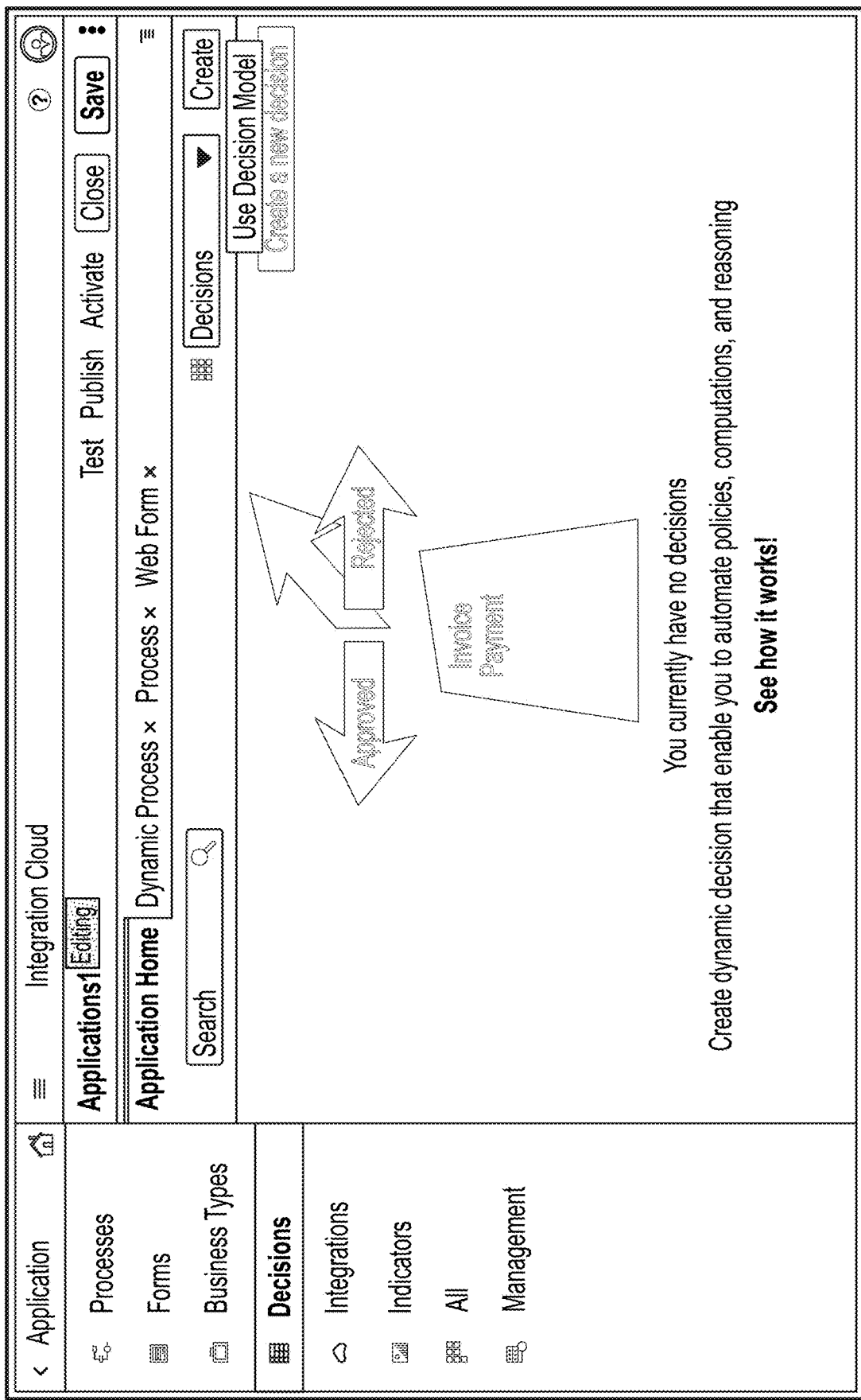
FIG. 59 illustrates an example of a system for supporting decision model and notation service integration, in accordance with an embodiment.

FIG. 59 illustrates an example of a system for supporting decision model and notation service integration, in accordance with an embodiment.

As illustrated in FIG. 59, in accordance with an embodiment, a decision model can be linked within the process cloud service (PCS) environment.

In accordance with an embodiment, the system can allow a user to introspect an existing decision model within the PCS environment by utilizing a DMN service integration.

In accordance with an embodiment, the system can allow a user to build a decision model by utilizing an integration with a DMN service integration.

Figure 60:
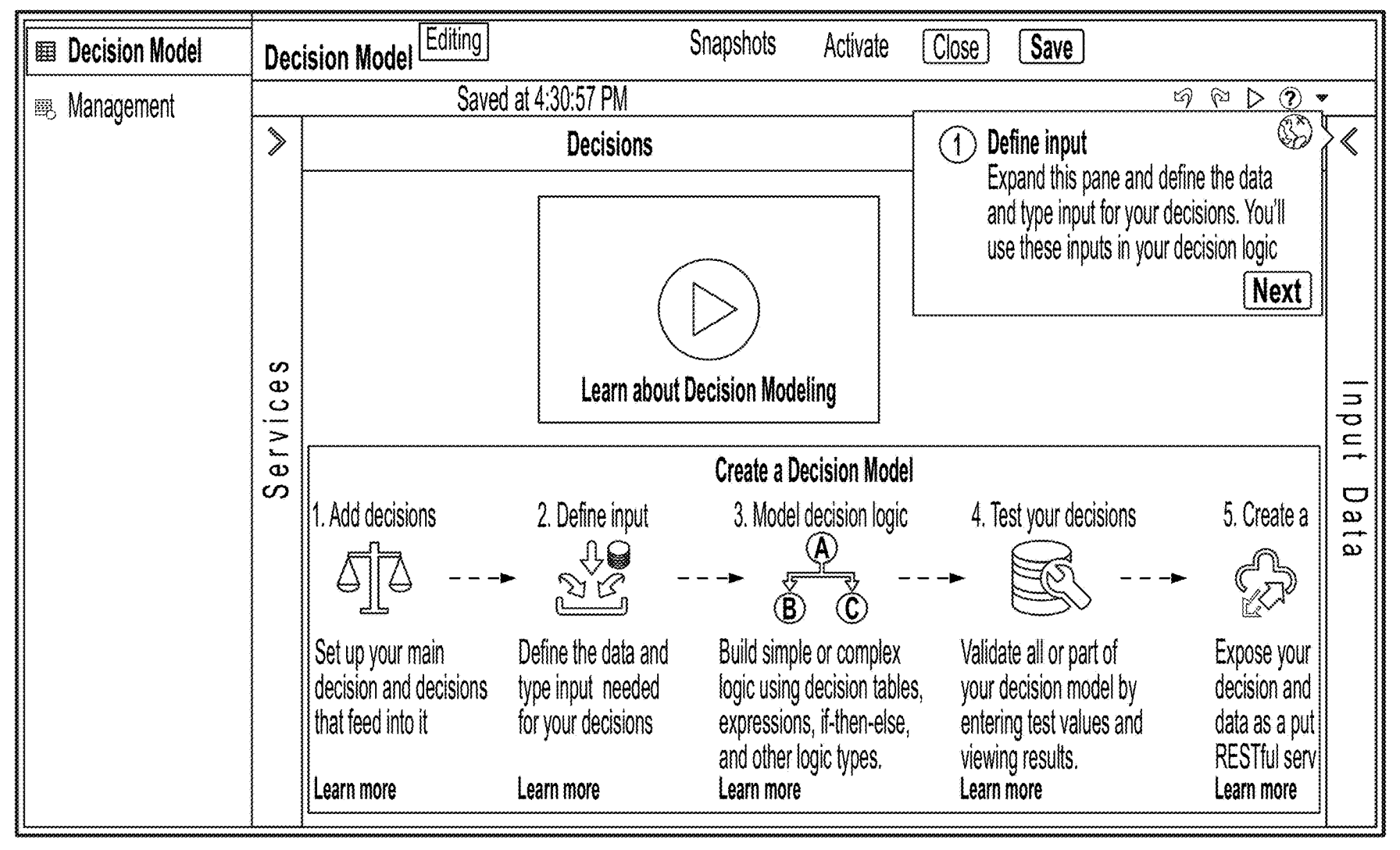

FIG. 60 further illustrates system for supporting decision model and notation service integration, in accordance with an embodiment.

As illustrated in FIG. 60, in accordance with an embodiment, a configured or built decision model can be exposed via a REST endpoint (REST API). In order to simplify, the systems and methods support native integration.

Figure 61:
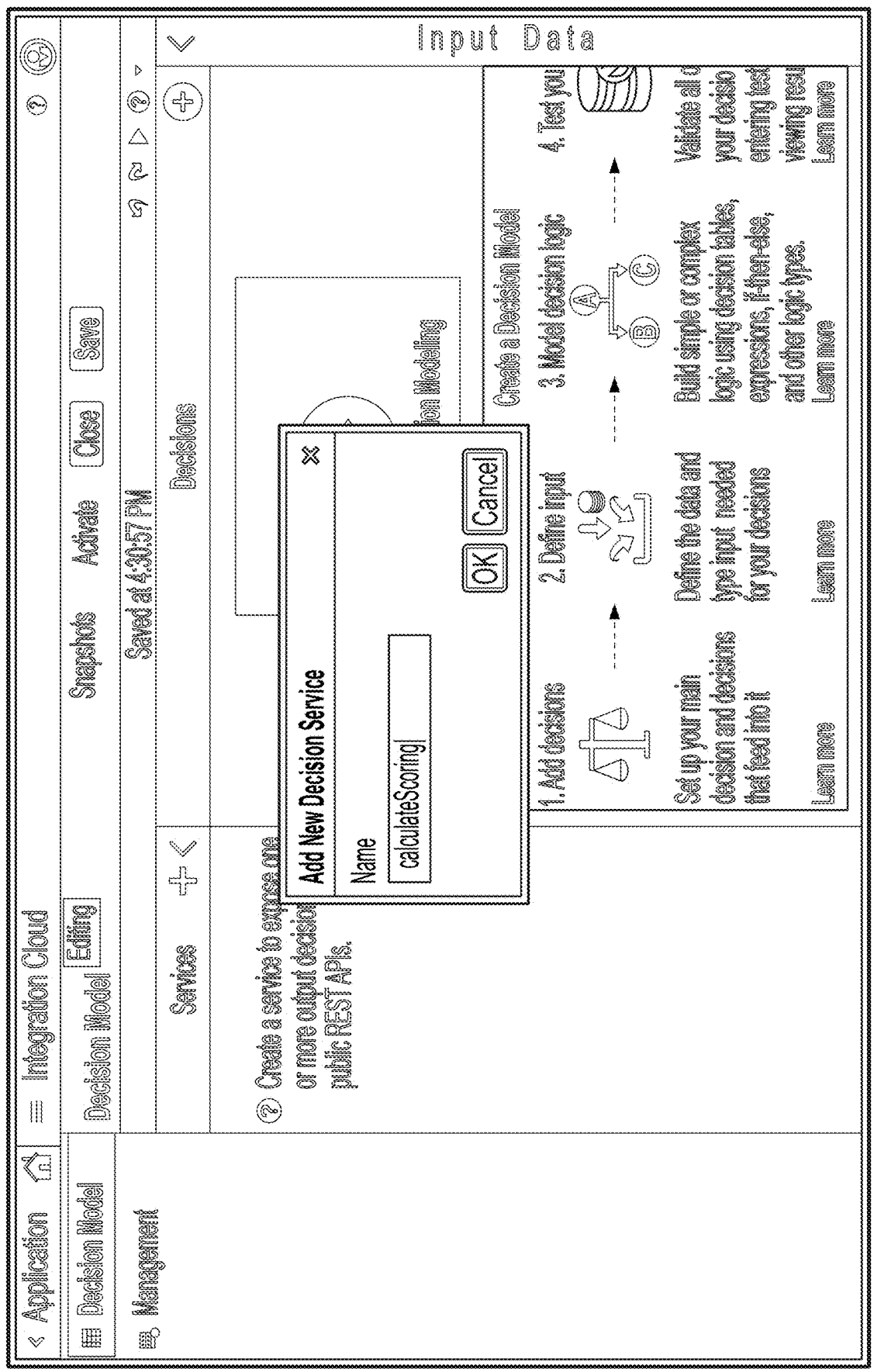
FIG. 61 further illustrates an example of a system for supporting decision model and notation service integration, in accordance with an embodiment.

FIG. 61 further illustrates an example of a system for supporting decision model and notation service integration, in accordance with an embodiment.

As illustrated therein, FIG. 61 illustrates an example of a native integration of a DMN service that enables a user to directly access and construct a decision service within the PCS environment.

Figure 62:
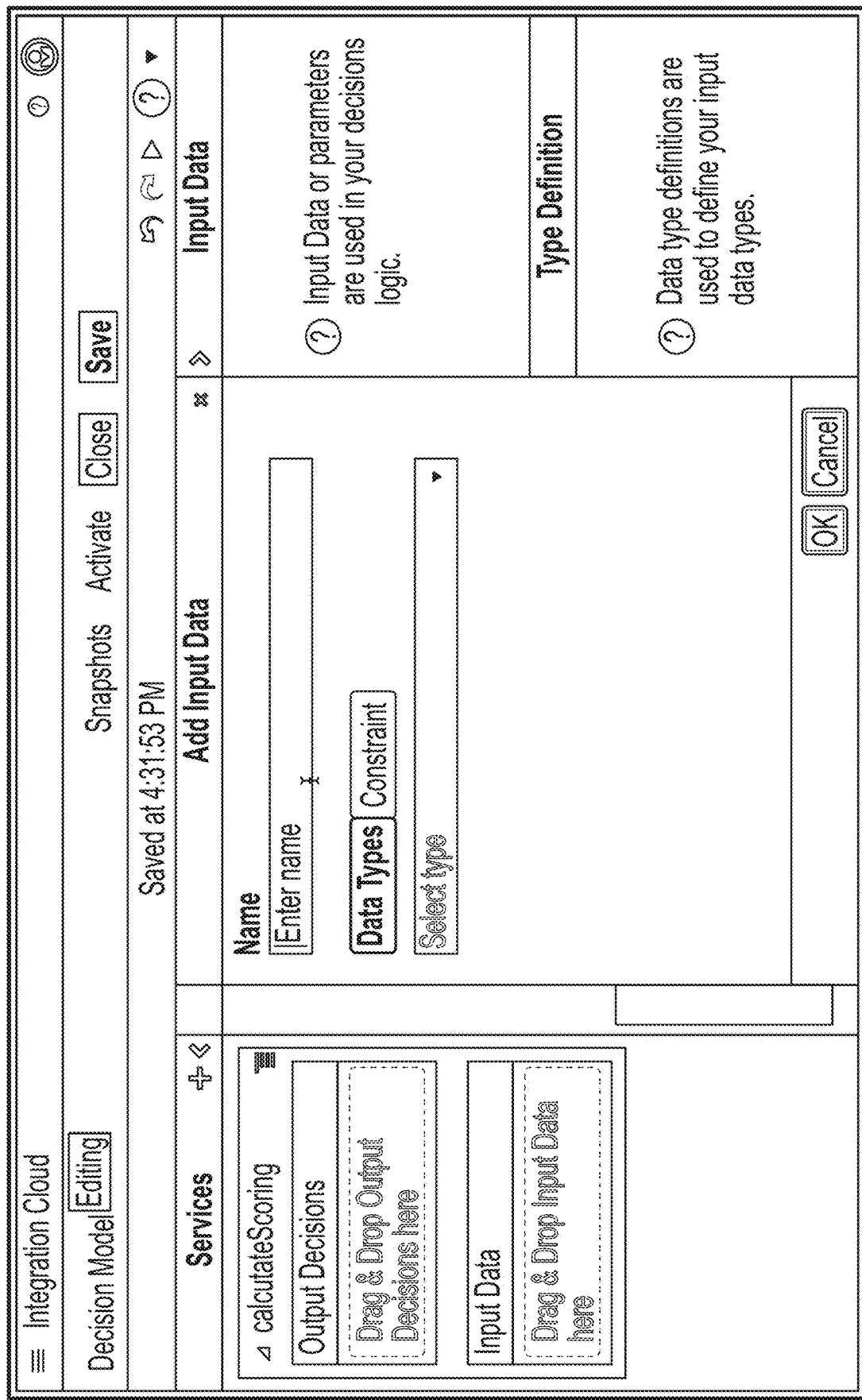
FIG. 62 further illustrates an example of a system for supporting decision model and notation service integration, in accordance with an embodiment.

FIG. 62 further illustrates an example of a system for supporting decision model and notation service integration, in accordance with an embodiment.

As illustrated in FIG. 62, in accordance with an embodiment, the system supports a drag-and-drop approach to building a decision service within the PCS environment, supporting native integration. In accordance with an embodiment, the decision model can support input type, type definition, output decisions, and input data. Users are able to define and activate a decision model utilizing a DMN service via native integration.

In accordance with an embodiment, the system enables creation of one or a plurality of decision models. The systems and methods also enable for importing of one or a plurality of pre-existing decision models. The systems and methods perform all the back end setup and connections required for such integration. The systems and methods also enable for editing of pre-existing or premade decision models; and for the editing of decision models made within the integrated service. This can all be performed without reliance upon building a REST API to integrate the DMN service and instead the service is integrated natively.

Integration with Integration Cloud Service

In accordance with an embodiment, it can be useful to provide a simple and smooth integration from PCS (process cloud service) to ICS (integration cloud service) in order to give users access to all of the benefits that the ICS offers, and offer ICS users the possibility to orchestrate their processes or connect their integrations through a PCS process.

In accordance with an embodiment, ICS platforms enable users to integrate between diverse systems or endpoints. Such flows can be generally referred to as integrations. An integration can comprise multiple connections, such as the source and the target, and a mapping set between the types used by the distinct systems. The target connection can the endpoint system which is going to be generally referred to as and is implemented by one of the adapters that ICS provisions. The source connection is the entry point to the ICS Integration from PCS. It is represented by a source system or endpoint which will trigger the integration execution.

In accordance with an embodiment, integrations which PCS can invoke from a process are ones that contain a source connection exposed with SOAP or REST interfaces, as well as other interfaces.

In accordance with an embodiment, from the design time point of view, the ICS integration can be part of a component of the integrations (previously known as connectors) framework, exposing them with the same life-cycles that the users already use for other types. Users will then be able to select an ICS integration and use it to implement a service task on any process. The ICS integration will finally be invoked by our runtime in the same way we are already doing for other REST or SOAP invocation.

Figure 63:
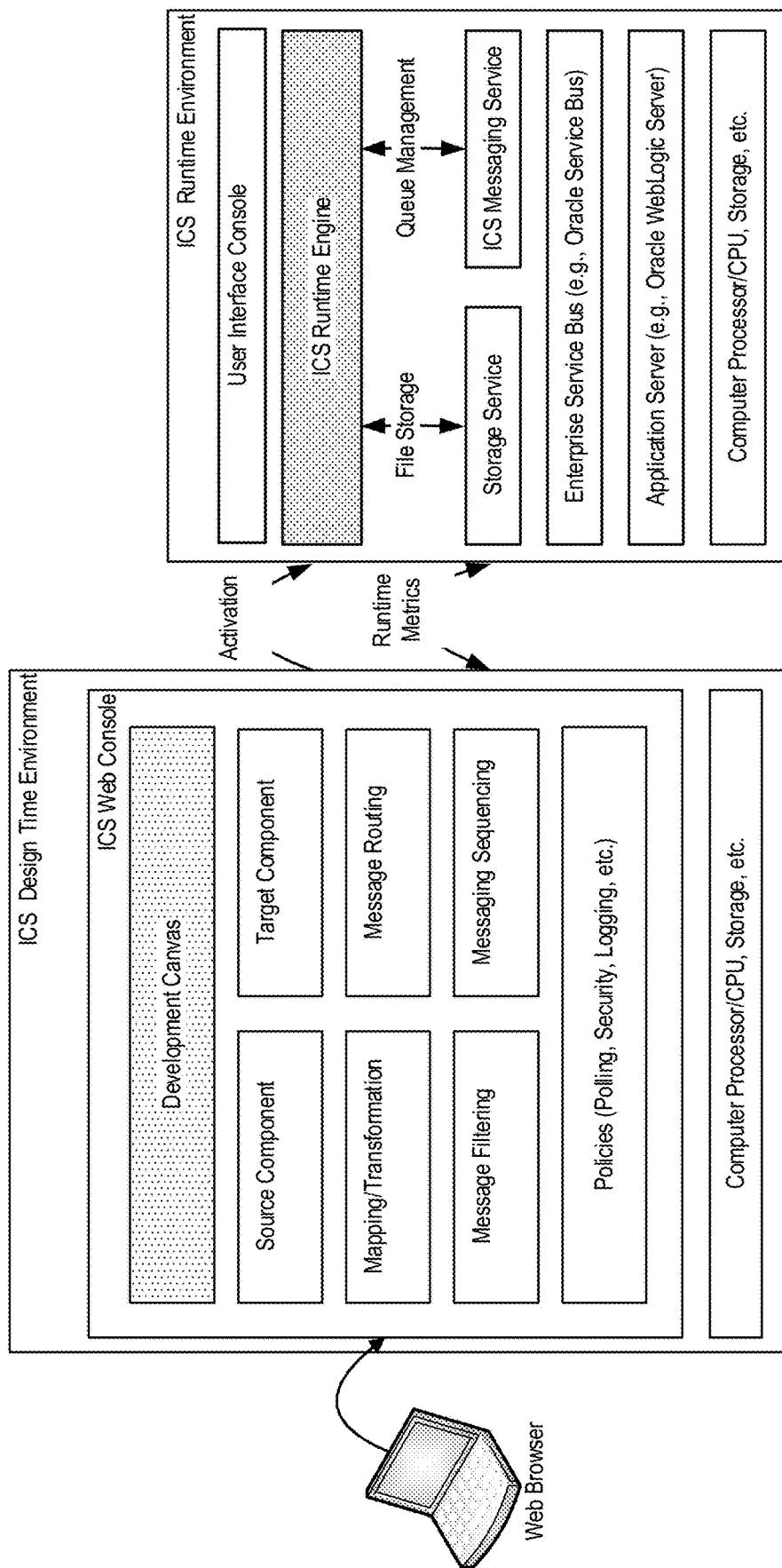
FIG. 63 illustrates an example integration cloud service in accordance with an embodiment.

FIG. 63 illustrates an example integration cloud service in accordance with an embodiment.

As illustrated in FIG. 63, in accordance with an embodiment, an integration cloud service (ICS) can provide a cloud-based integration service for designing, executing, and managing ICS integration flows. For example, in accordance with an embodiment the ICS can include a web application and an ICS runtime executing on an application server in an enterprise cloud environment (for example, Oracle Public Cloud). The web application can provide a design time that exposes a plurality of user interfaces for a user to design, activate, manage, and monitor an ICS integration flow. An activated ICS integration flow can be deployed and executed on the ICS runtime.

In accordance with an embodiment, a plurality of application adapters can be provided to simplify the task of configuring connections to a plurality of applications, by handling the underlying complexities of connecting to those applications. The applications can include enterprise cloud applications of the ICS vendor (for example, Oracle Right-Now), third-party cloud applications, and on-premises applications. The ICS can expose simple object access protocol (SOAP) and representational state transfer (REST) endpoints to these applications for use in communicating with these applications.

In accordance with an embodiment, an ICS integration flow (or ICS integration) can include a source connection, a target connection, and field mappings between the two connections. Each connection can be based on an application adapter, and can include additional information required by the application adapter to communicate with a specific instance of an application.

In accordance with an embodiment, an ICS integration flow and a plurality of other required artifacts (for example, JCA and WSDL files) can be compiled into an ICS project, which can be deployed and executed in the ICS runtime. A plurality of different types of integration flow patterns can be created using the web user interface application, including data mapping integration flows, publishing integration flows, and subscribing integration flows. To create a data mapping integration flow, an ICS user can use an application adapter or an application connection to define a source application and a target application in the development interface, and define routing paths and data mappings between the source and target application. In a publishing integration flow, a source application or a service can be configured to publish messages to the ICS through a pre-defined messaging service. In a subscribing integration flow, a target application or service can be configured to subscribe to messages from the ICS through the messaging service.

Figure 64:
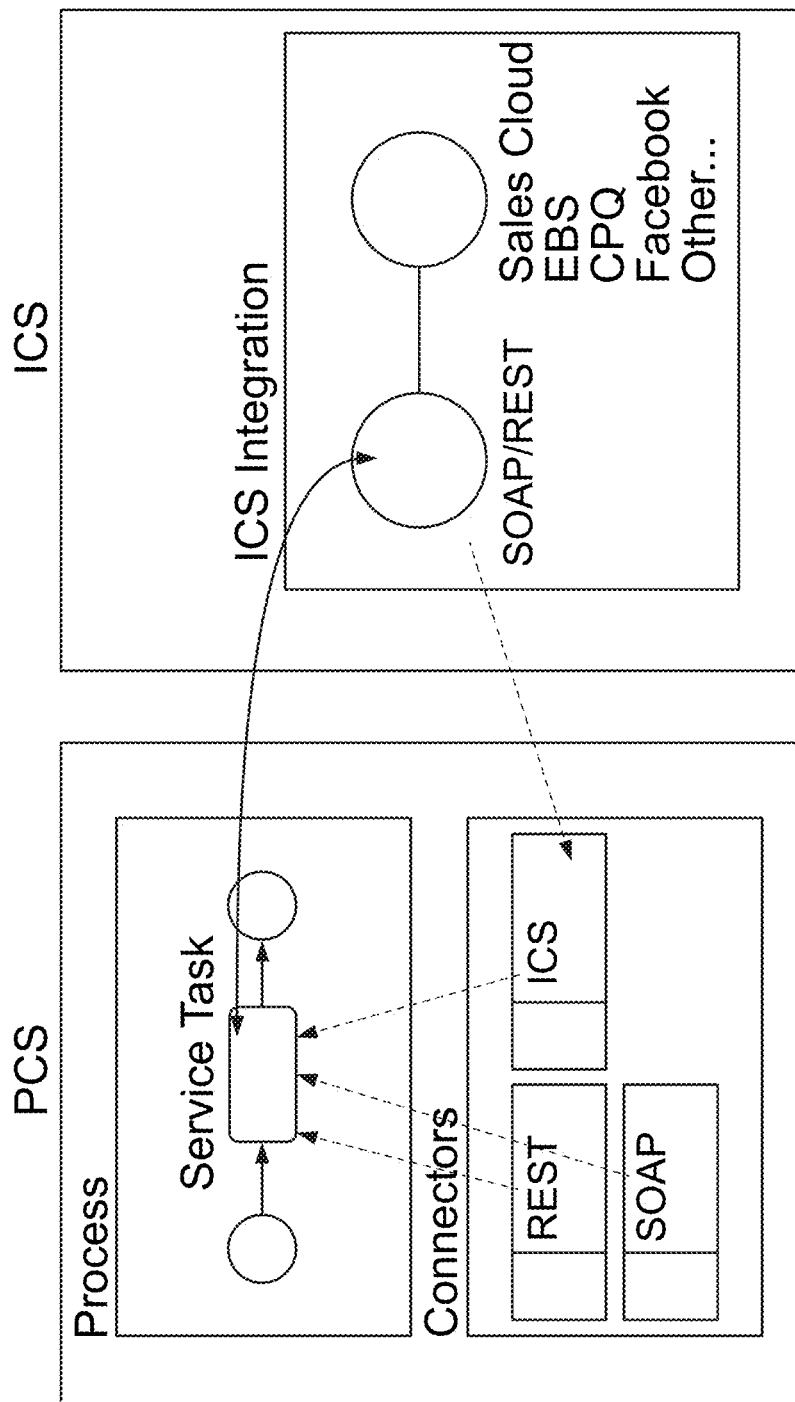
FIG. 64 illustrates an example of a system for integrating a process cloud service with an integration cloud service, in accordance with an embodiment FIG. 65 further illustrates an example of a user interface for integrating a process cloud service with an integration cloud service, in accordance with an embodiment.
Figure 65:
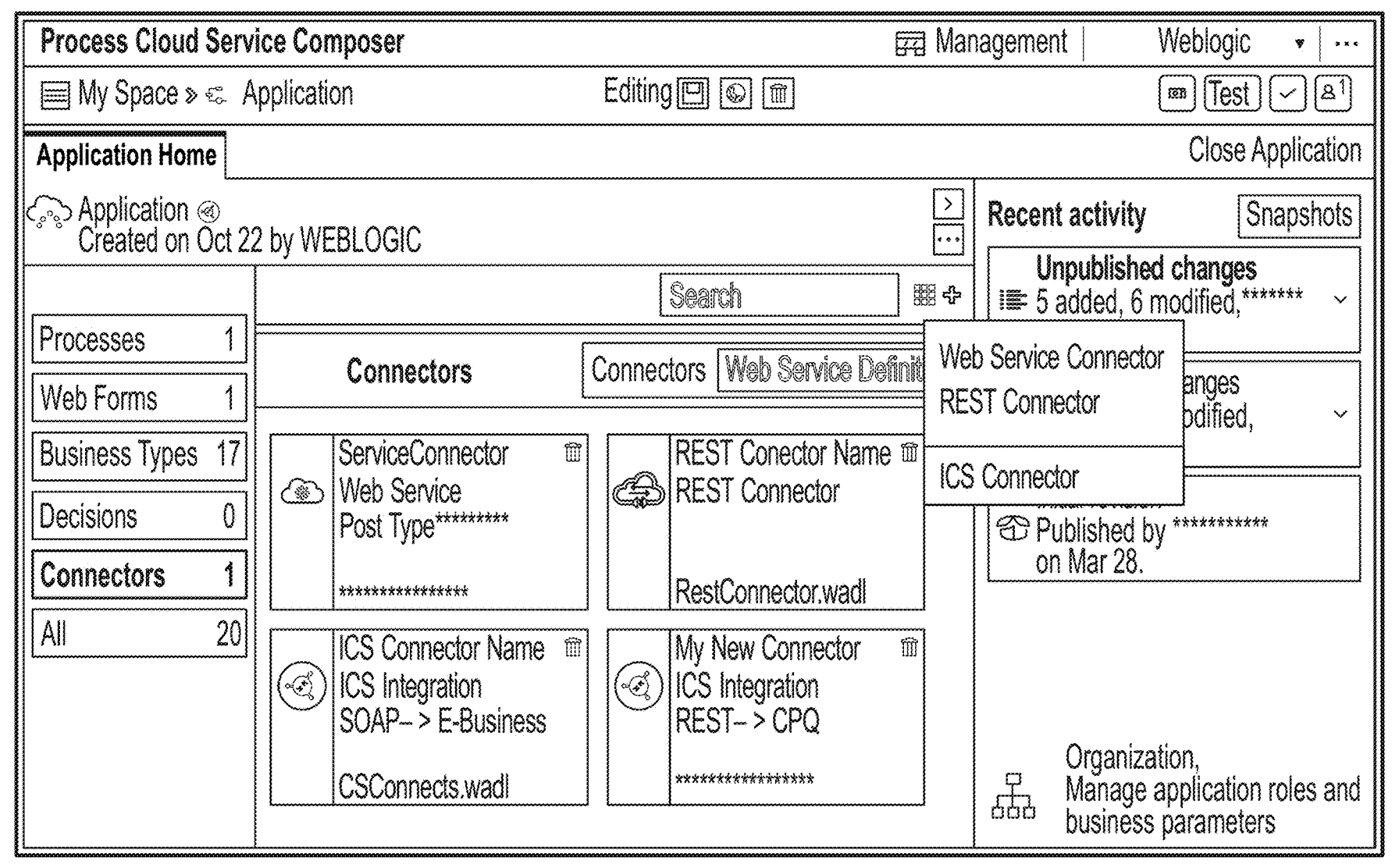

FIG. 64 illustrates an example of a system for integrating a process cloud service with an integration cloud service, in accordance with an embodiment; while FIG. 65 illustrates an example of a user interface for integrating a process cloud service with an integration cloud service, in accordance with an embodiment.

In accordance with an embodiment, ICS integrations are provided as part of a Connectors Framework; and can be created with an option on the menu. In accordance with an embodiment, connectors can be considered integrations to be aligned with ICS and make ICS users easier to find the point of contact within both applications. A navigation mode can be supplied to navigate from one application on to the other; or on the ICS side to navigate to PCS. A common application switcher can be defined and used by the different applications of the same portfolio to be able to easily switch from one to the other.

Figure 66:
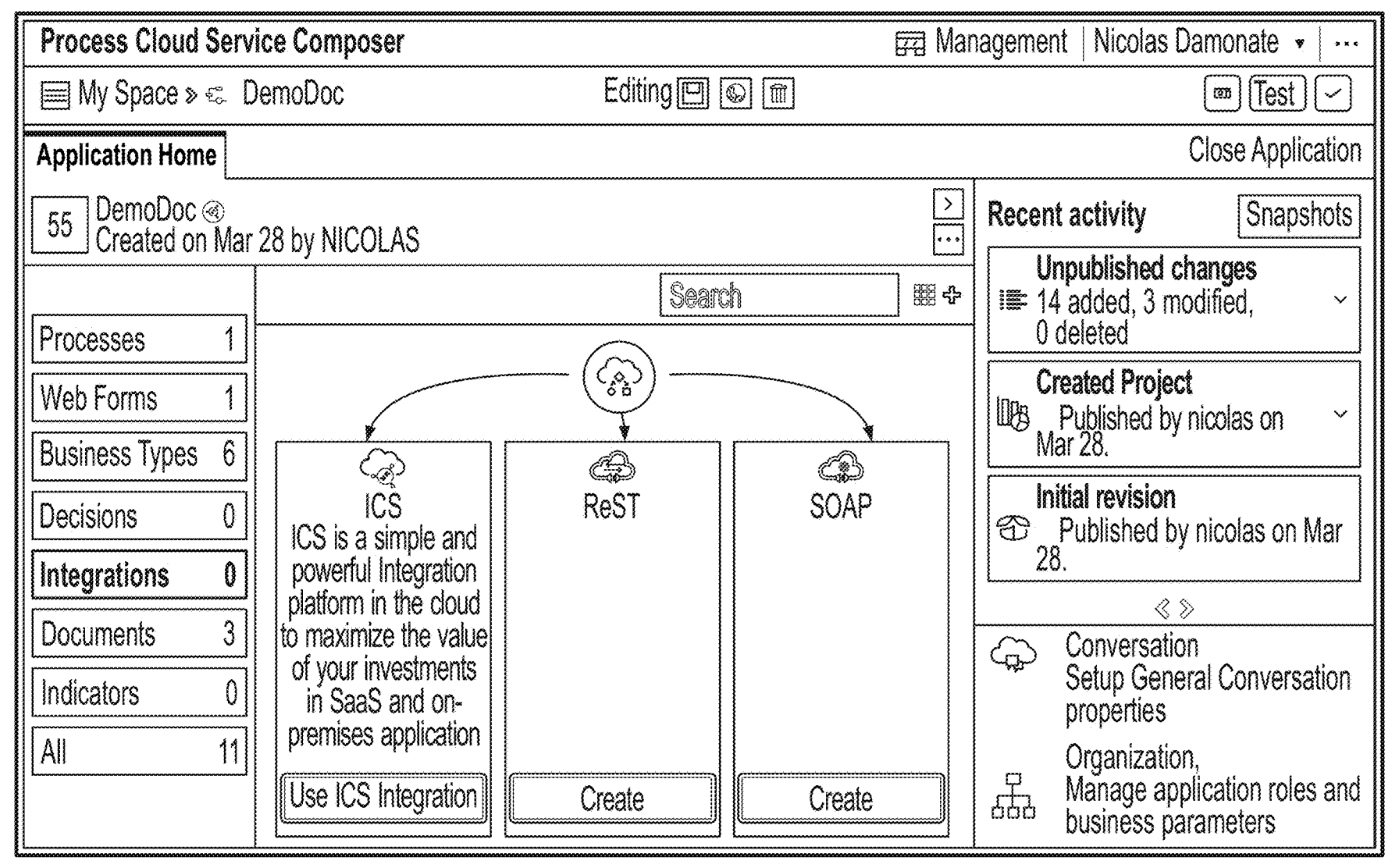

FIG. 66 further illustrates an example of a user interface for integrating a process cloud service with an integration cloud service, in accordance with an embodiment. As illustrated in FIG. 66, in accordance with an embodiment, a PCS integration base on an ICS base can be supplied. This is similar to providing a REST or SOAP exposure procedure where the integration is exposed as SOAP or as REST.

In accordance with an embodiment, systems and methods can include a PCS connection type in order to build native integrations that can be used on PCS. This provides the ability to hide even more complexity to the user, for example on the security perspective.

Figure 67:
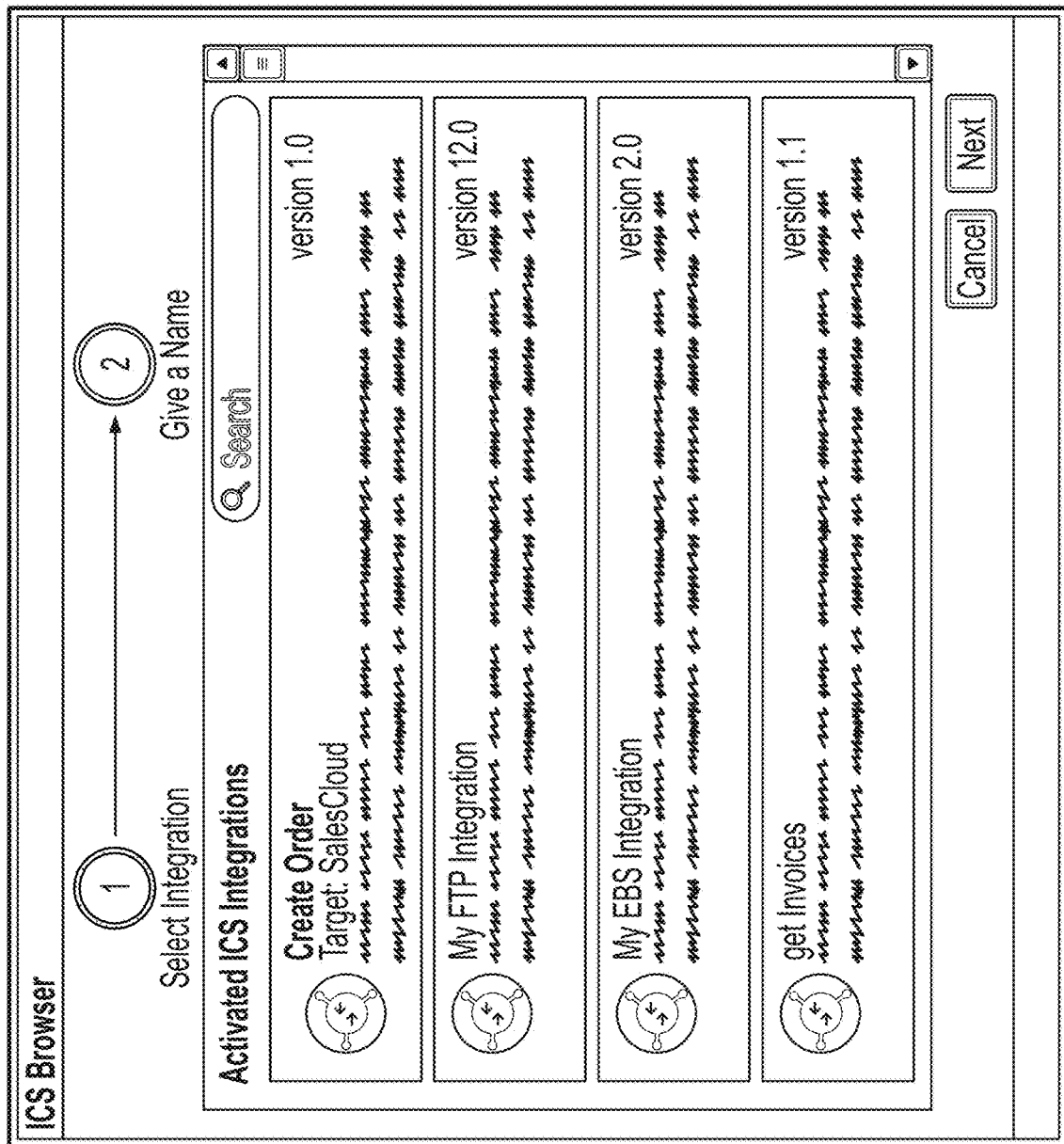
FIG. 67, which illustrates an example of a user interface of a description list, in accordance with an embodiment.

In accordance with an embodiment, for example, a user can interact with a wizard which guides the user to provide the information to create the ICS Integration. First the systems and methods offer a list of all the active ICS integrations exposing SOAP or REST interfaces. Entries on this list can contain a description given on ICS side, for example as illustrated in FIG. 67, which illustrates an example of a user interface of a description list, in accordance with an embodiment.

Figure 68:
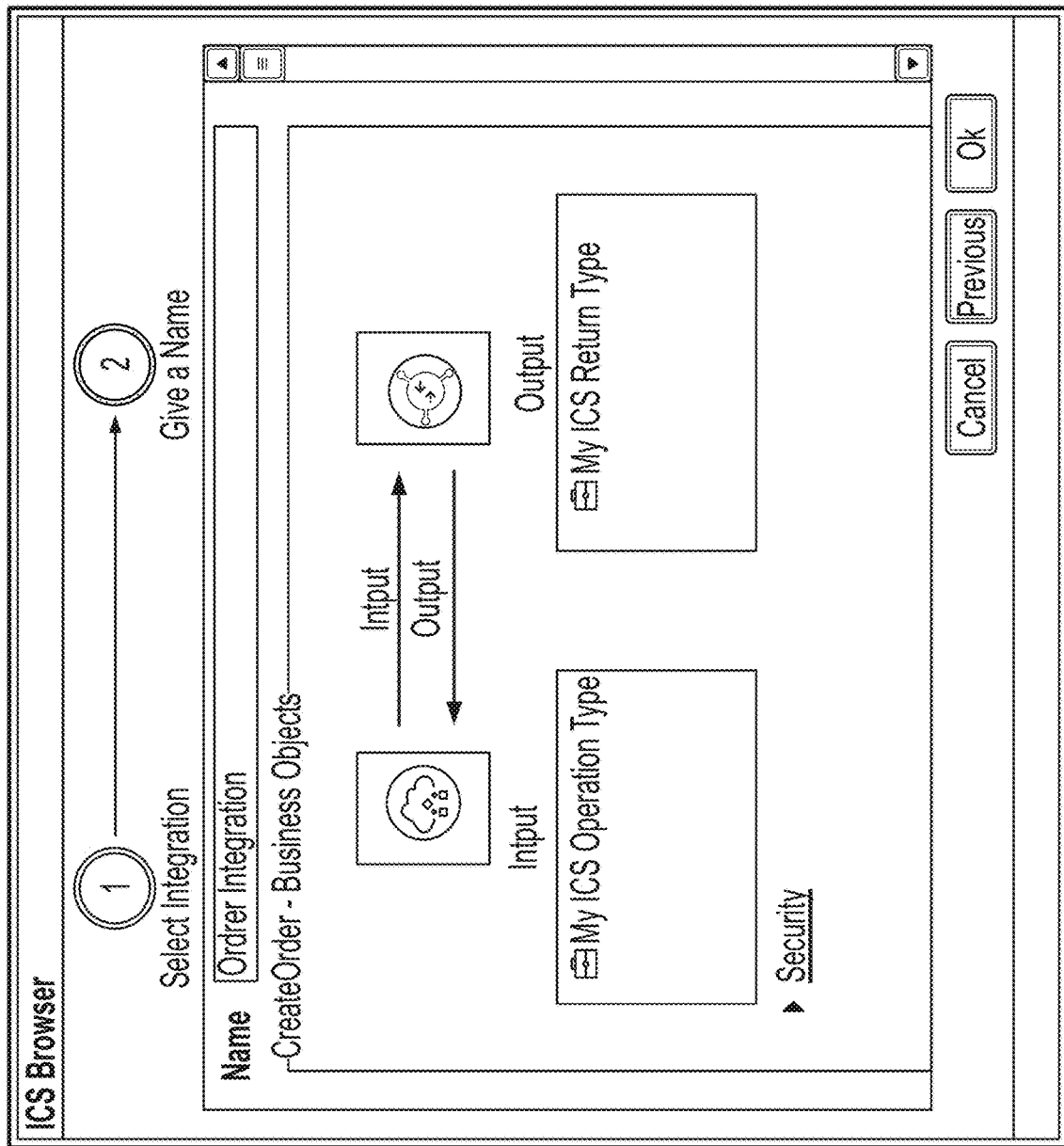
FIG. 68, which illustrates an example of a user interface for integration cloud service integration, in accordance with an embodiment.

In accordance with an embodiment, when an ICS integration is created, a metadata can be imported into the PCS application and all the types required will be added to the catalog. As a second step the user can enter a name for the integration and the systems and methods can provide some basic information about the types that will involve this call, as illustrated in FIG. 68, which illustrates an example of a user interface for integration cloud service integration, in accordance with an embodiment.

In accordance with an embodiment, a third step can ask for the security required to make a connection to this service. This can be provided so that the user can provide any required security information.

In accordance with an embodiment, once ICS integrations are created they are part of the integrations view and can be treated in the same way regardless the interface they expose. The metadata can be updated with a compatible definition. They can also be removed if they are not needed in the application.

In accordance with an embodiment, the integration assists the user in that it avoids requests that can be deduced and performed automatically. This is why once the integration is chosen to implement a service task, the systems and methods can recommend the user to create a data object to hold the information to be sent/received as a payload and we will automatically do the corresponding mappings.

In accordance with an embodiment, once a designer is implementing a process, the ICS Integrations can be used on any service task. The ICS Integrations are presented on a list with all the available Integrations. The Integration can also be created from the implementation panel to satisfy bottom-up use cases.

In accordance with an embodiment, an administrator can customize the service configuration (security policy) during deployment time, so as to be consistent with the connectors life-cycle, isolate development and production security data, and support use cases where customers can be associated with different servers for testing and production.

Smart Auto Data Association Based on Type Inference

In accordance with an embodiment, the design-time environment can include a process editor and graphical user interface (e.g., a data mapper or data association tool) which displays data associations that enable business process (payload) objects to be associated with data objects, for use in creating a business process application.

For example, the system can determine (a) a name of a business process (payload) object, for use with a business process application, and a data type that the business process (payload) object accepts; and (b) one or more data objects of a same data type, and the names of those data objects.

Based on the determination of data types and object names, the system can infer and display within the user interface a suggested data mapping or association between the various objects; which association can then be incorporated into a business process application, as an object assignment.

During data association, the system can retain current (pre-existing) data mappings between business process (payload) objects and data objects.

For those mappings between business process (payload) objects and data objects that do not (yet) exist, the data association tool can find/determine and display possible assignments/mappings between data objects and business process (payload) objects, for example up to a fixed depth.

Possible assignments can include associations between an element or attribute that have the same, or an assignable, data type (e.g., Integer Double).

The possible assignments can be ordered by the data association tool, first by depth, and then by edit distance.

For example, in order to measure edit distance, a string metric can be used (e.g., based on calculation of a Levenshtein distance).

After the possible assignments are ordered, a mapping between data object and payload object can be applied, wherein the mapping follows a set of rules, for example:

(1) If a payload object, or any of its parents, are already mapped, the discard the suggested mapping, association, or assignment.

(2) If neither the payload, nor any of its parents, are mapped already, the assignment passes to following stage:

(a) If a data object of an assignment is not mapped already, then a new mapping is created using the calculated assignment;

(b) If a data object of the assignment is already mapped, and it is the last possible mapping for a particular source (meaning that there is no other mapping for the current payload object), then a new mapping is created using the most relevant mapping for the payload object (e.g., having a shortest edit distance);

(c) If a data object is already mapped, and it is not the last possible mapping, then the assignment is discarded.

Such automatic mapping can be performed until the business process (payload) objects are fully mapped, or until all possible mappings are applied (if the payload cannot be fully mapped).

Figure 69:
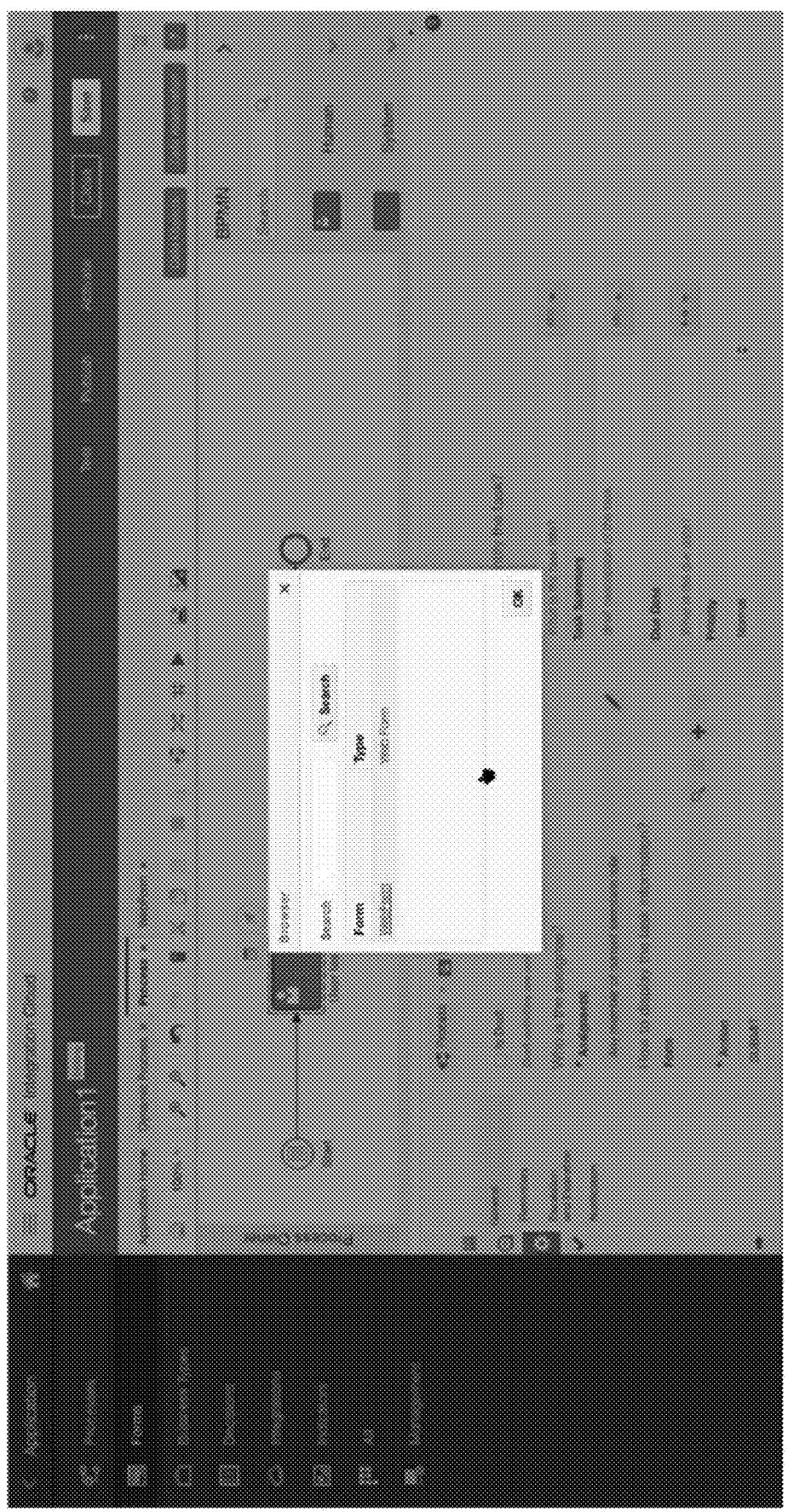
FIG. 69 illustrates an example wherein a form can include fields for data input, and can be added to a business process, in accordance with an embodiment.

FIG. 69 illustrates an example wherein a form can include fields for data input, and can be added to a business process, in accordance with an embodiment.

As illustrated in FIG. 69, in accordance with an embodiment, the system can determine the type of data that a business process (payload) object accepts or requires; and then determine the types of data objects that are available.

In accordance with an embodiment, the system can filter the data objects that are available by considering only those data objects of a type that matches the type of data that the business process (payload) object can accept as possible associations.

In accordance with an embodiment, the system can then determine the name of a business process (payload) object, and further determine the name of available data objects; and then determine those data objects with names that are the same or similar to the name of the business process (payload) object.

In this example, once the form has been created and added to a process, the system can attempt to determine which data objects should be associated with which business process (payload) objects.

For example, a web form business process (payload) object can be associated with a name, e.g., web form.

Available data objects include a data object web form-DataObject, which is of type Web form.

Accordingly, in this example, the system can: determine that the web form business process (payload) object accepts a Web form data type; and that the web formDataObject data object is of type Web form; and that the web formDataObject data object can be associated with the web form business process (payload) object (e.g., because their types match).

Additionally, in this example, the system can evaluate the names of the objects to determine that web formDataObject has a similar name as web form (e.g., they both include the words "web" and Form").

Based on this information, the system can automatically populate of the data object field with web formDataObject, and the User Task field with web form.

Figure 70:
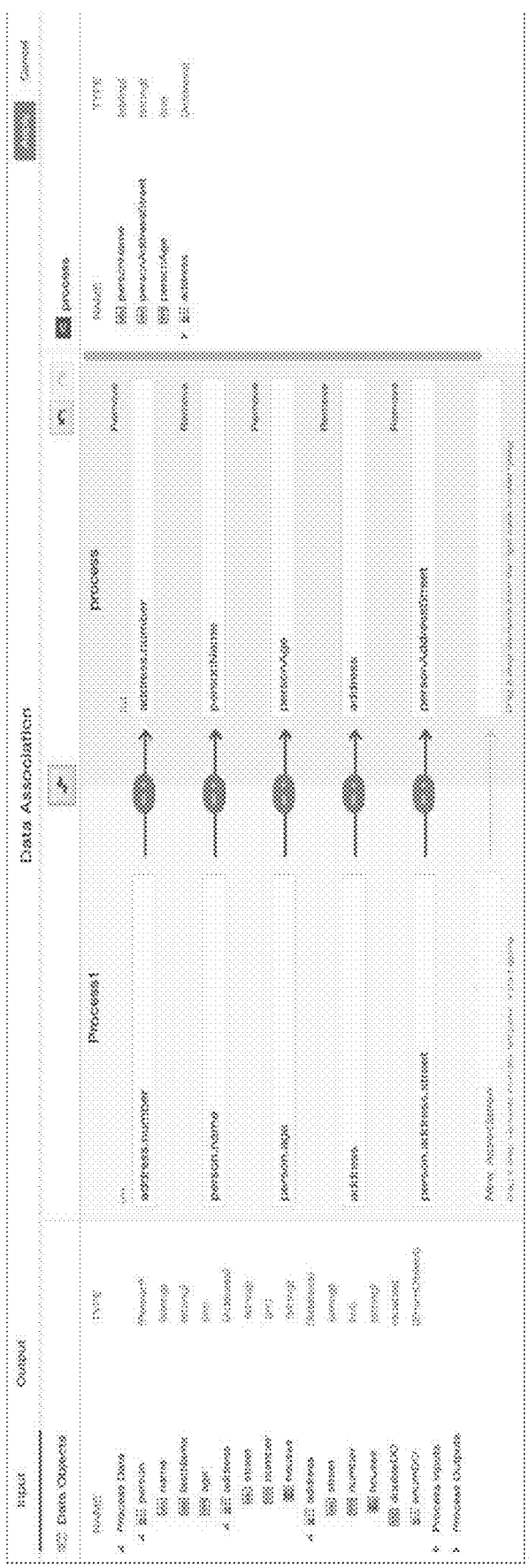
FIG. 70 illustrates another example wherein a form can include fields for data input, and can be added to a business process, in accordance with an embodiment.

FIG. 70 illustrates another example wherein a form can include fields for data input, and can be added to a business process, in accordance with an embodiment.

As illustrated in FIG. 70, in accordance with an embodiment:

1. The mapping address.number→address.number existed before the auto-mapping was triggered and as such it was retained.

2. The possible sources for the targets are grouped and ordered, e.g., by descending Levenshtein distance:

(a) personName (String): person.name (1), person.lastName (5), enumDO (8), address.street (11), person.address.street (13);

(b) personAddressStreet (String): person.address.street (2), address.street (7), person.lastName (11), person.name (12), enumDO (16);

(c) personAge (Integer): person.age (1), address.number (10), person.address.number (13);

(d) address (Address): address (0), person.address (7).

3. The system can apply various mappings to choose ones with smaller edit distance from source to target:

(a) person.name→personName (It's not being used by another mapping);

(b) person.age→personAge (It's not being used by another mapping);

(c) address→address (It's not being used by another mapping);

(d) person.address.street→personAddressStreet (It's not being used by another mapping.

In accordance with an embodiment, in the above example, if person.address.street was already mapped to another target, then the system will attempt to create a mapping using address.street as the source because it is the remaining source in the list that has the smaller edit distance to the target string. Following review by a software developer, the determined mappings can be used in creating a business process application.

JSON Support

In accordance with an embodiment, while using the forms designer and graphical user interface, to create a web form or business process application, the software developer can upload or otherwise access a JSON instance, for use with the web form.

In response to such upload, the system can automatically generate a JSON to business process object mapping or schema, based upon an inspection of the input JSON instance; and display, via the user interface, the automatically generated business process object for inspection by the software developer.

Figure 71:
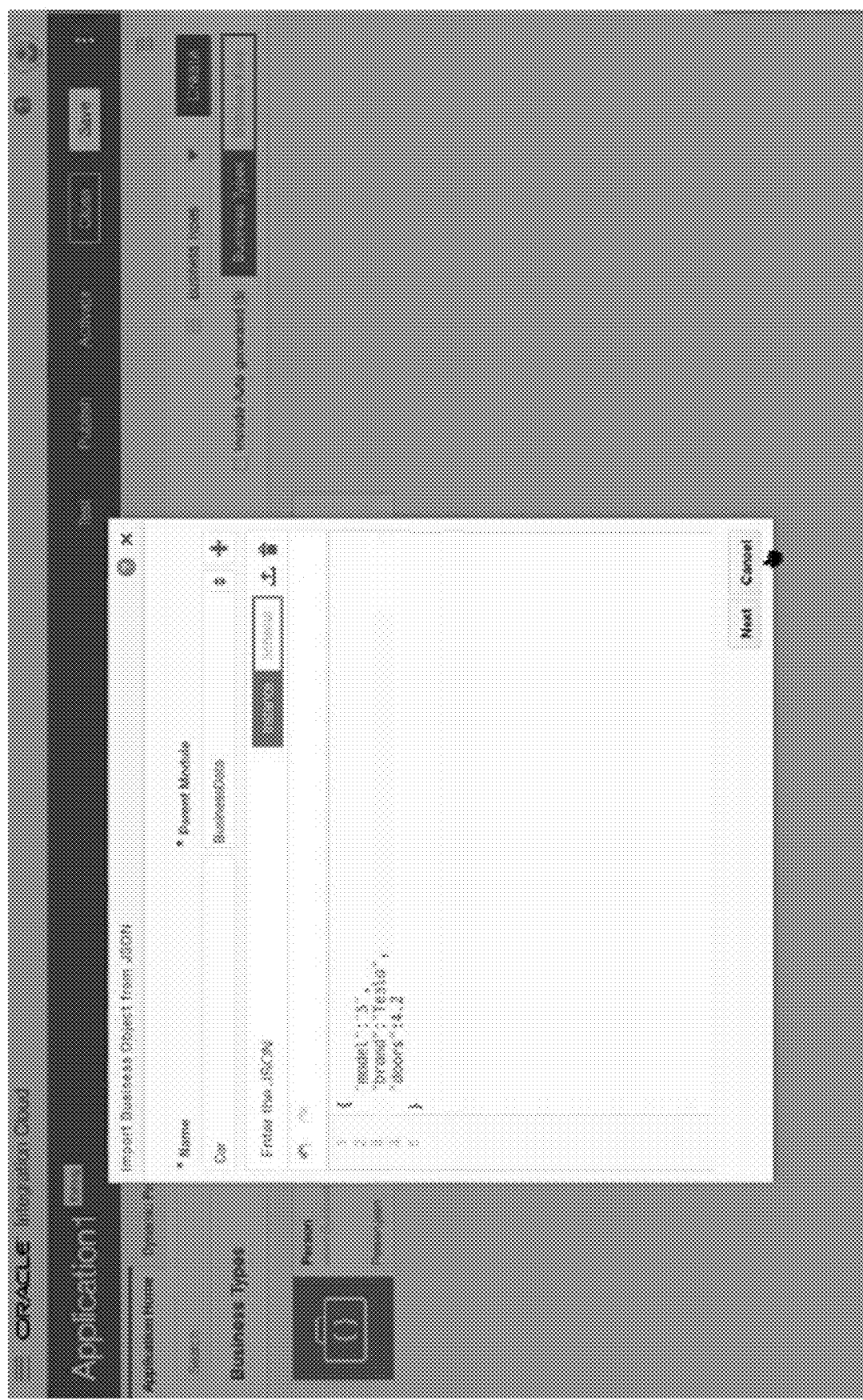
FIG. 71 illustrates an example support for JSON with a business process management system, in accordance with an embodiment.
Figure 72:
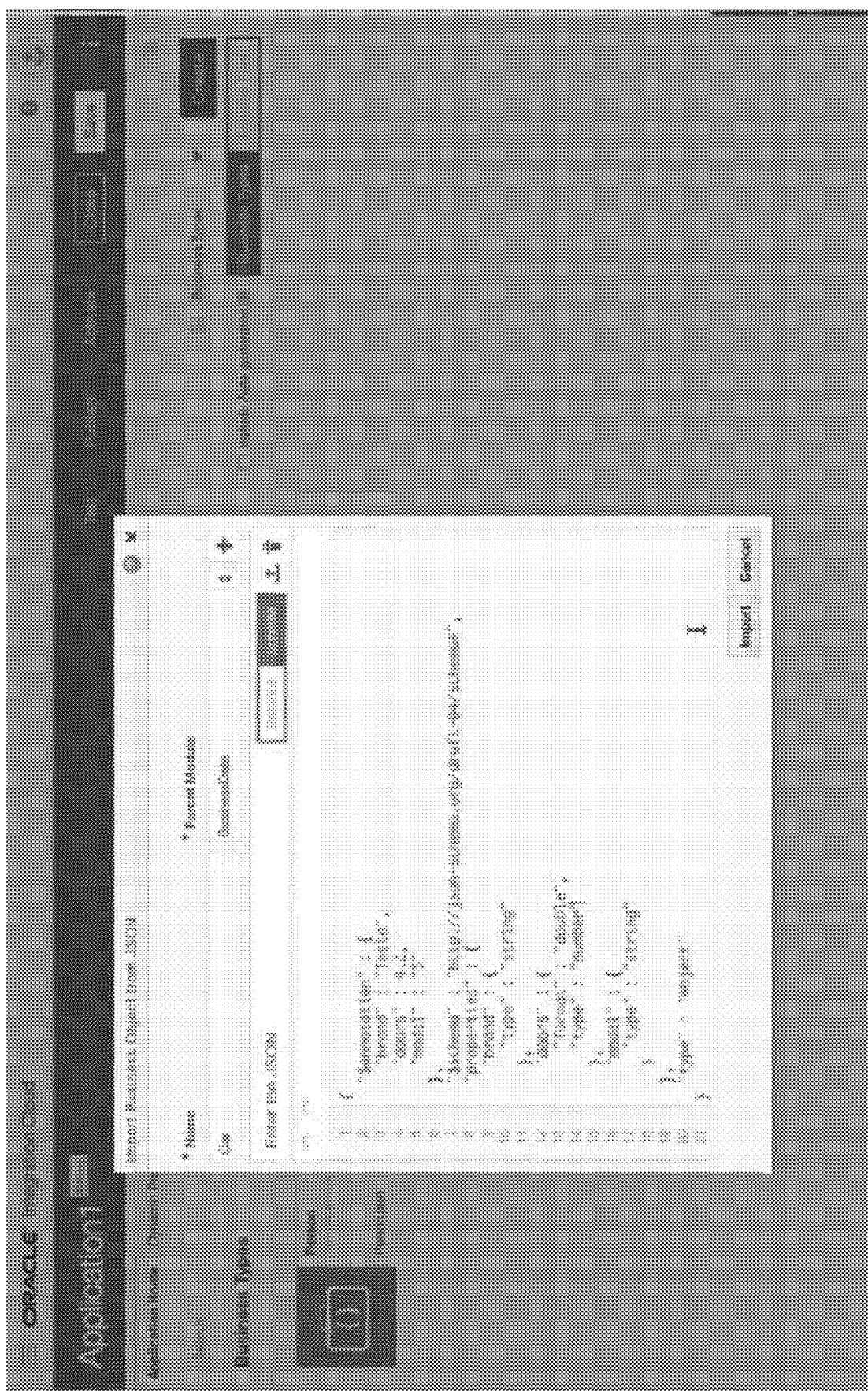
FIG. 72 further illustrates an example support for JSON with a business process management system, in accordance with an embodiment.

FIGS. 71 and 72 illustrate an example support for JSON with a business process management system, in accordance with an embodiment.

As illustrated in FIG. 71, in accordance with an embodiment, the user interface can initially display a definition of a JSON instance, including fields and corresponding data values; and can parse the values of the fields provided in the JSON instance, to determine data types associated with those values.

As illustrated in FIG. 72, in accordance with an embodiment, the display can then be switched (by selecting one of the "Instance" or "Schema" icons) to display as an intermediate step, the generated business process object schema associated with the JSON instance.

In accordance with an embodiment, the display of the schema associated with the JSON instance allows for correction of errors during the automatic generation of the business process object via interaction with the user interface, prior to the business process object being imported and used as part of a business process. Following review by a software developer, the determined data types and schema can be used as the data types of corresponding fields in a business process object definition, for use in creating a business process application.

For example, in the example illustrated in FIG. 71, a JSON instance that includes fields for describing a vehicle including: "model", "brand," and "doors") is uploaded/imported; wherein the JSON instance include values for "model"="5"; "brand"="Tesla"; and "doors"="4.2."

In accordance with an embodiment, in response to such upload/import, the system can automatically generate a JSON to business process object mapping or schema; and display, via the user interface, the automatically generated business process object schema for inspection by the software developer.

In accordance with an embodiment, the system parses the values of the fields provided in the JSON instance, to determine a data type of the values, which determined data type can then be used as the data type of the corresponding field in the business process object definition.

Incorrect values entered in the JSON instance can produce erroneous data types in the business process object definition. For example, as illustrated in FIG. 72, the automatic generation of the data type for the "doors" field generated a format of "double", and a type of "number".

Since these values are incorrect, in accordance with an embodiment, the display as an intermediate step of the schema associated with the JSON instance allows the software developer to review and further customize the schema—for example to change the "double" format to "integer" format, which is a more appropriate format for indicating a number of doors of a vehicle. Following review by a software developer, the determined data types and schema can be used as the data types of corresponding fields in a business process object definition, for use in creating a business process application.

Embodiments described herein can be conveniently implemented using one or more conventional general purpose or specialized digital computer, computing device, machine, or microprocessor, or other type of computer, including one or more processors, memory and/or computer-readable storage media programmed according to the teachings of the present disclosure. Appropriate software coding can readily be prepared by skilled programmers based on the teachings of the present disclosure, as will be apparent to those skilled in the software art.

In accordance with some embodiments, features described herein can be implemented, in whole or in part, in a cloud environment, as part of, or as a service of, a cloud computing system which enables on-demand network access to a shared pool of configurable computing resources (e.g., networks, servers, storage, applications, and services), and which can include characteristics, for example, as defined by the National Institute of Standards and Technology, such as: on-demand self-service; broad network access; resource pooling; rapid elasticity; and measured service. Example cloud deployment models can include: public cloud, private cloud, and hybrid cloud; while example cloud service models can include Software as a Service (SaaS), Platform as a Service (PaaS), Database as a Service (DBaaS), and Infrastructure as a Service (IaaS). In accordance with an embodiment, unless otherwise specified, a cloud, as used herein, can encompass public cloud, private cloud, and hybrid cloud embodiments, and all cloud deployment models including, but not limited to, cloud SaaS, cloud DBaaS, cloud PaaS, and cloud IaaS.

In accordance with some embodiments, a computer program product can be provided which is a non-transitory computer-readable storage medium (media) having instructions stored thereon/in, which can be used to program a computer to perform any of the processes described herein. Examples of such storage mediums can include, but are not limited to, hard disk drives, hard disks, hard drives, fixed disks, or other electromechanical data storage devices, floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems, or other types of storage media or devices suitable for non-transitory storage of instructions and/or data.

The foregoing description has been provided for the purposes of illustration and description. It is not intended to be exhaustive or to limit the invention to the precise forms disclosed. Many modifications and variations will be apparent to the practitioner skilled in the art.

For example, while many of the embodiments described herein illustrate the use of a business process management (BPM) environment (such as Oracle Process Cloud Service, or Oracle Integration), in accordance with various embodiments the components, features, and methods described herein can be used with other types of process-based or BPM computing environments.

The embodiments were chosen and described in order to best explain the principles of the present teachings and their practical application, thereby enabling others skilled in the art to understand the various embodiments and with various modifications that are suited to the particular use contemplated. It is intended that the scope be defined by the following claims and their equivalents.

What is claimed is:

1. A system for use with a cloud environment for developing integrated processes, comprising:
one or more computing devices having a cloud environment operating thereon; and
a process environment provided within and operating as part of the cloud environment that integrates and executes processes associated with a plurality of applications;
wherein the process environment:
communicates with the applications via integrations that provide a source connection to a first application operating as a source of data, a target connection associated with a second application operating as a target for receiving the data, and a data map that links data fields between the first and second applications having different data structures to integrate the applications; and stores a definition of the integrations in an integration database; and wherein a design-time environment provides a user interface that allows a user to create, manage, and monitor the integrations, including:

receiving user input directed to development of a dynamic process including the first and second applications and a mapping of data associated therewith, generating a graphical representation of the dynamic process including stages and tasks, for further interaction and modification by the user, and updating the dynamic process based on the user input received.

2. The system of claim 1, wherein the process environment includes a notation translation engine operable to receive a data input in a first notation language; parse input tokens to build an abstract syntax tree; and traverse the abstract syntax applying rules to convert the tokens and produce an expression in a second notation language.

3. The system of claim 1, wherein the process environment operates to determine data objects of a same data type, and determine names of the data objects, and populate, based on a determined same type of data and the determined names, a data object field in the user interface with the data object; and a process object field with a process object.

4. The system of claim 1, wherein the process environment operates to receive a JSON instance including fields and corresponding values, and parse the data values to determine one or more data types, which data types are then be used as the data type of the corresponding field in a process object definition.

5. The system of claim 1, wherein the process environment provides a process hierarchy that defines a hierarchy of parts of a dynamic process including stages and tasks, and which is use by a column-based process editor to generate a graphical representation of the dynamic process.

6. A method for use with a cloud environment for developing integrated processes, comprising:

providing a process environment within and operating as part of the cloud environment that integrates and executes processes associated with a plurality of applications, wherein the process environment:

communicates with the applications via integrations that provide a source connection to a first application operating as a source of data, a target connection associated with a second application operating as a target for receiving the data, and a data map that links data fields between the first and second applications having different data structures to integrate the applications; and stores a definition of the integrations in an integration database; and wherein a design-time environment provides a user interface that allows a user to create, manage, and monitor the integrations, including:

receiving user input directed to development of a dynamic process including the first and second applications and a mapping of data associated therewith, generating a graphical representation of the dynamic process including stages and tasks, for further interaction and modification by the user, and updating the dynamic process based on the user input received.

7. The method of claim 6, wherein the process environment includes a notation translation engine operable to receive a data input in a first notation language; parse input tokens to build an abstract syntax tree; and traverse the abstract syntax applying rules to convert the tokens and produce an expression in a second notation language.

8. The method of claim 6, wherein the process environment operates to determine data objects of a same data type, and determine names of the data objects, and populate, based on a determined same type of data and the determined names, a data object field in the user interface with the data object; and a process object field with a process object.

9. The method of claim 6, wherein the process environment operates to receive a JSON instance including fields and corresponding values, and parse the data values to determine one or more data types, which data types are then be used as the data type of the corresponding field in a process object definition.

10. The method of claim 6, wherein the process environment provides a process hierarchy that defines a hierarchy of parts of a dynamic process including stages and tasks, and which is use by a column-based process editor to generate a graphical representation of the dynamic process.

11. A non-transitory computer readable storage medium, including instructions stored thereon which when read and executed by one or more computers cause the one or more computers to perform the method comprising:

providing a process environment within and operating as part of the cloud environment that integrates and executes processes associated with a plurality of applications, wherein the process environment:

communicates with the applications via integrations that provide a source connection to a first application operating as a source of data, a target connection associated with a second application operating as a target for receiving the data, and a data map that links data fields between the first and second applications having different data structures to integrate the applications; and stores a definition of the integrations in an integration database; and wherein a design-time environment provides a user interface that allows a user to create, manage, and monitor the integrations, including:

receiving user input directed to development of a dynamic process including the first and second applications and a mapping of data associated therewith, generating a graphical representation of the dynamic process including stages and tasks, for further interaction and modification by the user, and updating the dynamic process based on the user input received.

12. The non-transitory computer readable storage medium of claim 11, wherein the process environment includes a notation translation engine operable to receive a data input in a first notation language; parse input tokens to build an abstract syntax tree; and traverse the abstract syntax applying rules to convert the tokens and produce an expression in a second notation language.

13. The non-transitory computer readable storage medium of claim 11, wherein the process environment operates to determine data objects of a same data type, and determine names of the data objects, and populate, based on a determined same type of data and the determined names, a data object field in the user interface with the data object; and a process object field with a process object.

14. The non-transitory computer readable storage medium of claim 11, wherein the process environment operates to receive a JSON instance including fields and corresponding values, and parse the data values to determine one or more data types, which data types are then be used as the data type of the corresponding field in a process object definition.

15. The non-transitory computer readable storage medium of claim 11, wherein the process environment provides a process hierarchy that defines a hierarchy of parts of a dynamic process including stages and tasks, and which is use by a column-based process editor to generate a graphical representation of the dynamic process.

* * * * *